(12) United States Patent
Shen et al.

(10) Patent No.: US 12,299,570 B2
(45) Date of Patent: May 13, 2025

(54) STAIN-FREE DETECTION OF EMBRYO POLARIZATION USING DEEP LEARNING

(71) Applicants: California Institute of Technology, Pasadena, CA (US); Cambridge Enterprise Limited, Cambridge (GB)

(72) Inventors: Cheng Shen, Pasadena, CA (US); Changhuei Yang, Pasadena, CA (US); Adiyant Lamba, Cambridge (GB); Magdalena D. Zernicka-Goetz, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 497 days.

(21) Appl. No.: 17/859,500

(22) Filed: Jul. 7, 2022

(65) Prior Publication Data

US 2023/0027723 A1     Jan. 26, 2023

Related U.S. Application Data

(60) Provisional application No. 63/219,285, filed on Jul. 7, 2021.

(51) Int. Cl.
*G06N 3/08*      (2023.01)
*G06N 3/045*     (2023.01)
*G06T 7/00*      (2017.01)
*G06V 10/82*     (2022.01)

(52) U.S. Cl.
CPC .............. *G06N 3/08* (2013.01); *G06N 3/045* (2023.01); *G06T 7/0012* (2013.01); *G06V 10/82* (2022.01); *G06T 2207/20076* (2013.01); *G06T 2207/20081* (2013.01); *G06T 2207/20084* (2013.01); *G06T 2207/30044* (2013.01)

(58) Field of Classification Search
CPC .......... G06N 3/08; G06N 3/045; G06V 10/82; G06T 7/0012
See application file for complete search history.

(56) References Cited

U.S. PATENT DOCUMENTS

| | | |
|---|---|---|
| 2004/0268445 A1 | 12/2004 | Carlson et al. |
| 2018/0143001 A1 | 5/2018 | Popescu et al. |
| 2020/0226750 A1 | 7/2020 | Shafiee et al. |
| 2024/0312560 A1* | 9/2024 | Casper ................ G06V 20/698 |

FOREIGN PATENT DOCUMENTS

| | | |
|---|---|---|
| CN | 1576779 A | 2/2005 |
| WO | WO2019113643 | 6/2019 |

OTHER PUBLICATIONS

Anani et al., "Initiation of Hippo signaling is linked to polarity rather than to cell position in the pre-implantation mouse embryo," Development 2014, 141, 2813-2824.
Bormann et al., "Performance of a deep learning based neural network in the selection of human blastocysts for implantation," eLife 2020, 9, 1-14.

(Continued)

*Primary Examiner* — David Bilodeau
(74) *Attorney, Agent, or Firm* — Dickinson Wright PLLC

(57) ABSTRACT

Disclosed herein include systems, devices, and methods for detecting embryo polarization from a 2D image generated from a 3D image of an embryo that is not fluorescently labeled using a convolutional neural network (CNN), e.g., deep CNN.

25 Claims, 23 Drawing Sheets

(56) References Cited

OTHER PUBLICATIONS

Christiansen et al., "In silico labeling: predicting fluorescent labels in unlabeled images," Cell 2018, 173(3), 792-803.
Cicconet et al., "Label free cell-tracking and division detection based on 2D time-lapse images for lineage analysis of early embryo development," Computers in Biology and Medicine 2014, 51, 24-34.
Dard et al., "In vivo functional analysis of ezrin during mouse blastocyst formation," Developmental Biology 2001, 233(1), 161-173.
Deng et al., "ImageNet: A large-scale hierarchical image database," 2009 IEEE Conference on Computer Vision and Pattern Recognition 2009, in 8 pages.
Fleming et al., "The cytoskeleton, endocytosis and cell polarity in the mouse preimplantation embryo," Developmental Biology 1986, 113, 406-419.
Forster et al., "Complex wavelets for extended depth-of- field: A new method for the fusion of multichannel microscopy images," Microscopy Research and Technique 2004, 65, 33-42.
Gerri et al., "Initiation of a conserved trophectoderm program in human, cow and mouse embryos," Nature 2020, 587, 443-447.
He et al., "Deep residual learning for image recognition," Proceedings of the IEEE Conference on Computer Vision and Pattern Recognition 2016, 770-778.
Hu et al., "Squeeze-and-Excitation Networks," Proceedings of the IEEE Conference on Computer Vision and Pattern Recognition 2018, 7132-7141.
Huang et al., "Densely Connected Convolutional Networks," Proceedings of the IEEE Conference on Computer Vision and Pattern Recognition 2017, 4700-4708.
International Search Report and Written Opinion dated Oct. 26, 2022 in PCT Patent Application No. PCT/US2022/036337.
Ioannidou et al., "Deep Learning Advances in Computer Vision with 3D Data: A Survey," ACM Computing Surveys (CSUR) 2017, 50(2), in 38 pages.
Johnson & Ziomek, "The Foundation of Two Distinct Cell Lineages within the Mouse Morula," Cell 1981, 24(1), 71-80.
Khan et al., "Deep Convolutional Neural Networks for Human Embryonic Cell Counting," Computer Vision—ECCV 2016 Workshops: Amsterdam, The Netherlands 2016, 339-348.
Khosravi et al., "Deep learning enables robust assessment and selection of human blastocysts after in vitro fertilization," NPJ Digital Medicine 2019, 2(1), 1-9.
Leahy et al., "Automated Measurements of Key Morphological Features of Human Embryos for IVF," Medical Image Computing and Computer Assisted Intervention—MICCAI 2020: 23rd International Conference 2020, 25-35.
Louvet et al., "Ezrin Becomes Restricted to Outer Cells Following Asymmetrical Division in the Preimplantation Mouse Embryo," Developmental Biology 1996, 177(2), 568-579.
Ounkomol et al., "Label-free prediction of three-dimensional fluorescence images from transmitted-light microscopy," Nature Methods 2018, 15(11), 917-920.
Plusa et al., "Downregulation of Par3 and aPKC function directs cells towards the ICM in the preimplantation mouse embryo," Journal of Cell Science 2005, 118(3), 505-515.
Poplin et al., "Prediction of cardiovascular risk factors from retinal fundus photographs via deep learning," Nature Biomedical Engineering 2018, 2(3), 158-164.
Rad et al., "Blastomere Cell Counting and Centroid Localization in Microscopic Images of Human Embryo," 2018 IEEE 20th International Workshop on Multimedia Signal Processing (MMSP) 2018, 1-6.
Reeve, "Cytoplasmic polarity develops at compaction in rat and mouse embryos," Journal of Embryology and Experimental Morphology, 1981, 62(1), 351-367.
Samarage et al., "Cortical tension allocates the first inner cells of the mammalian embryo," Developmental Cell 2015, 34(4), 435-447.
Shen et al., "Stain-free detection of embryo polarization using deep learning," Scientific Reports 2022, 12, 1-11.
Singh et al., "3D Deep Learning on Medical Images: A Review," Sensors 2020, 20(18), in 24 pages.
Tran et al., "Deep learning as a predictive tool for fetal heart pregnancy following time-lapse incubation and blastocyst transfer," Human Reproduction 2019, 34(6), 1011-1018.
Vinot et al., "Asymmetric distribution of PAR proteins in the mouse embryo begins at the 8-cell stage during compaction," Developmental Biology 2005, 282(2), 307-319.
Weiss et al., "A survey of transfer learning," Journal of Big Data 2016, 3(9), in 40 pages.
Zenker et al., "Expanding Actin Rings Zipper the Mouse Embryo for Blastocyst Formation," Cell 2018, 173(3), 776-791.
Zernicka-Goetz et al., "Following cell fate in the living mouse embryo," Development 1997, 124(6), 1133-1137.
Zhou et al., "Learning Deep Features for Discriminative Localization," Proceedings of the IEEE Conference on Computer Vision and Pattern Recognition 2016, 2921-2929.
Zhu et al., "Actomyosin polarisation through PLC-PKC triggers symmetry breaking of the mouse embryo," Nature Communications 2017, 8(921), 1-16.
Zhu et al., "Developmental clock and mechanism of de novo polarization of the mouse embryo," Science 2020, 370(6522), in 13 pages.
Zhu et al., "Mechanism of cell polarisation and first lineage segregation in the human embryo," BioRxiv 2020, in 26 pages. doi: https://doi.org/10.1101/2020.09.23.310680.

* cited by examiner

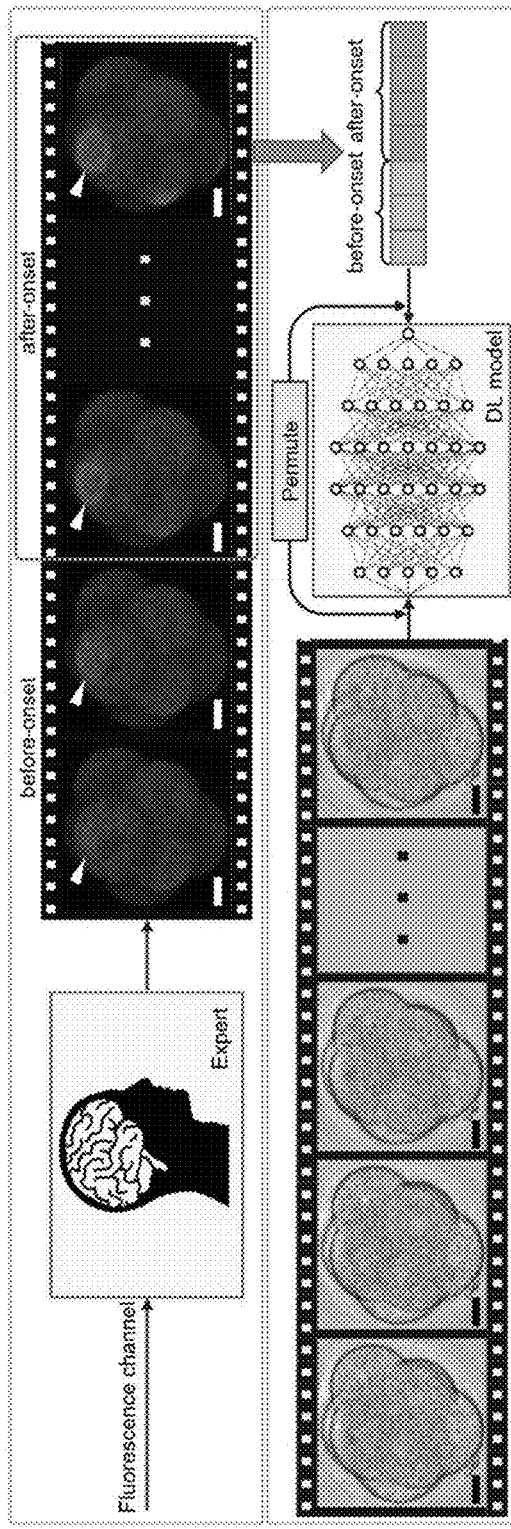

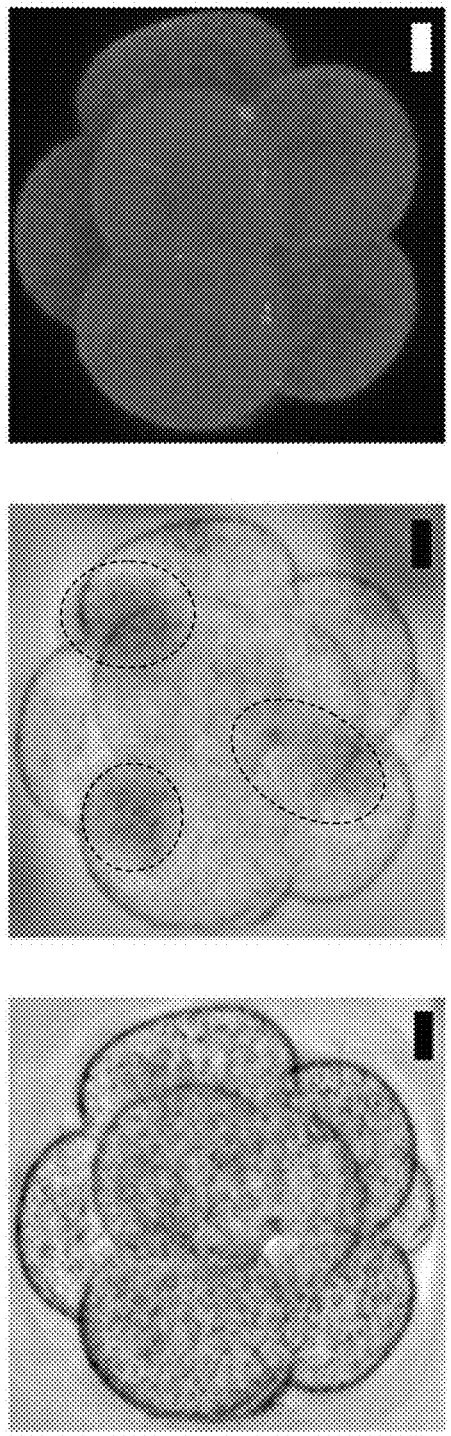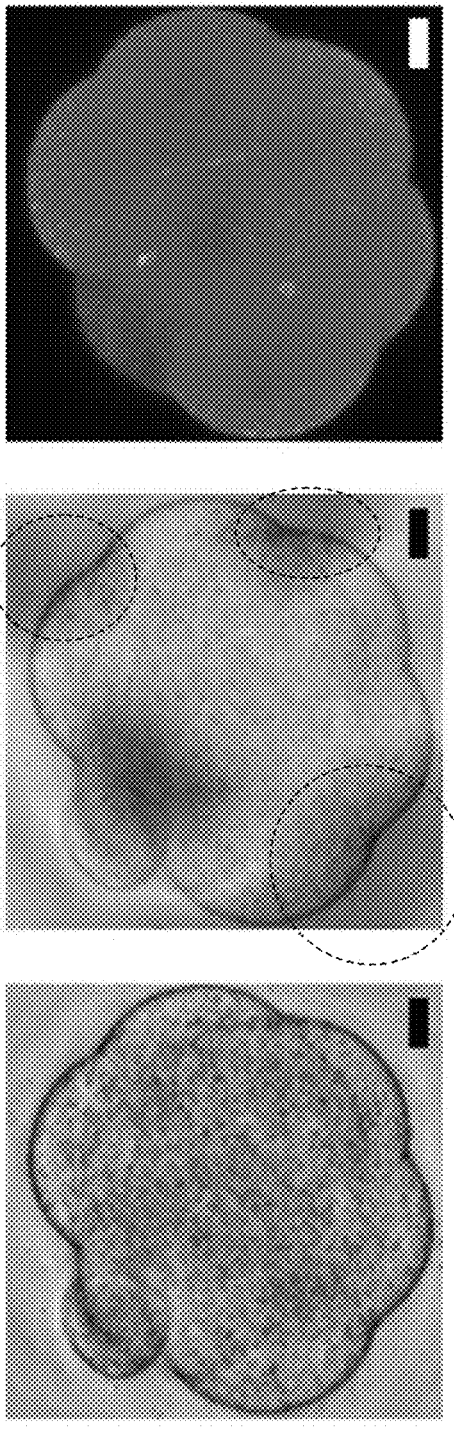
FIG. 4A
FIG. 4B

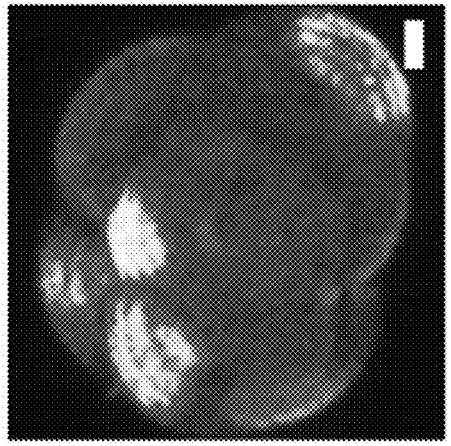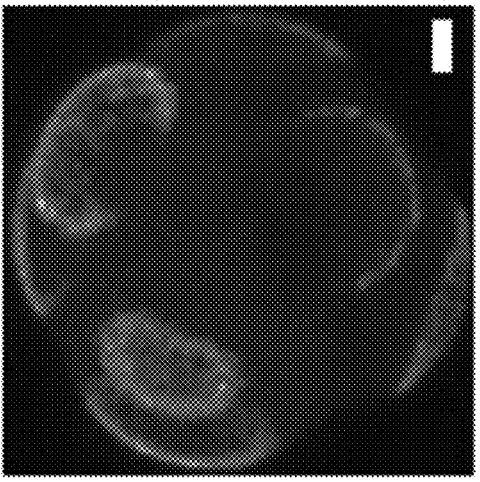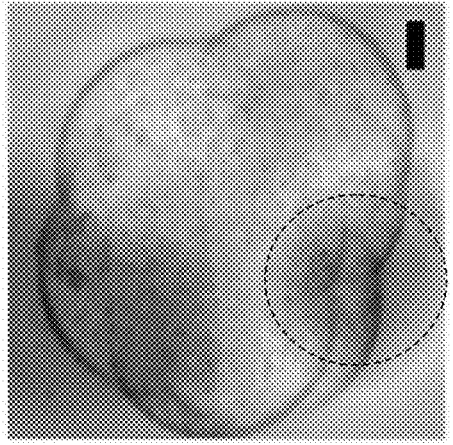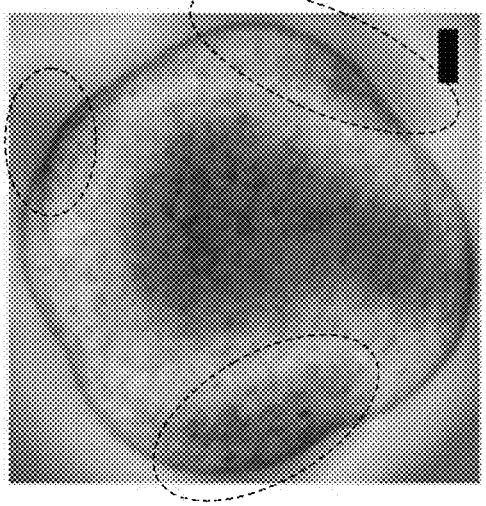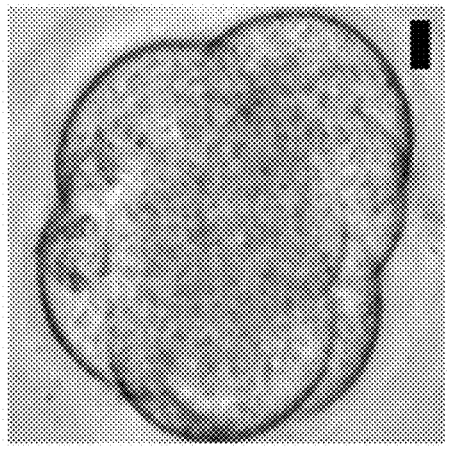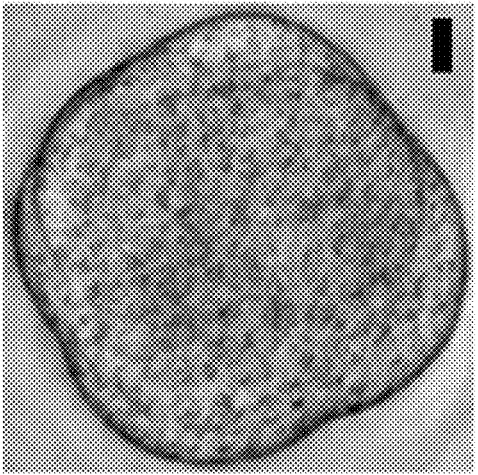
FIG. 4C
FIG. 4D

STAIN-FREE DETECTION OF EMBRYO POLARIZATION USING DEEP LEARNING

RELATED APPLICATIONS

This application claims the benefit under 35 U.S.C. § 119(e) of U.S. Provisional Patent Application Ser. No. 63/219,285, filed Jul. 7, 2021, the content of this related application is incorporated herein by reference in its entirety for all purposes.

STATEMENT REGARDING FEDERALLY SPONSORED R&D

This invention was made with government support under Grant No. HD100456 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field

The present disclosure relates generally to the field of machine learning, for example computer vision.

Description of the Related Art

Polarization is the process by which all individual cells of the embryo establish an apical domain on the cell-cell contact-free surface. Embryo polarization is key to the first bifurcation of cell fates in the mammalian embryo, and establishment of cell lineages in the blastocyst, which is crucial for implantation and a successful pregnancy. There is a need to be able to predict embryo polarization status when embryos are alive, as this would enable the determination of embryo developmental potential. There is a need for tracking of polarization without the use of fluorescence.

SUMMARY

Disclosed herein include methods of determining (or detecting) embryo polarization. In some embodiments, a method of determining embryo polarization can be under control of a processor (e.g., a hardware processor or a virtual processor). The method can comprise: receiving a three-dimensional (3D) image of an embryo (e.g., an embryo with markers of cell polarization not strained). The method can comprise: generating a two-dimensional (2D) image representing the 3D image of the embryo. The method can comprise: determining a before-onset probability that the embryo is before onset of polarization in the 3D image and an after-onset probability that the embryo is after onset of polarization in the 3D image using a machine learning model, such as a convolutional neural network (CNN), e.g., a CNN binary classification model, with the 2D image as input. The CNN can comprise two output nodes. The two output nodes can output the before-onset probability and the after-onset probability. For example, the two output nodes can output a probability vector comprising the before-onset probability and the after-onset probability. For example, a before-onset probability output node of the two output nodes of the CNN outputs the before-onset probability, and an after-onset probability output node of the two output nodes outputs the after-onset probability. The method can comprise: determining a label (or status) of the embryo as being before or after the onset of polarization in the 3D image using the before-onset probability and the after-onset probability.

In some embodiments, the embryo is a 8-cell-stage embryo, a 8-16-cell-stage embryo, a 16-cell stage embryo, or a combination thereof. The embryo can comprise about or at least 8 cells, 8-16 cells, 16 cells, or a combination thereof. In some embodiments, the embryo is about 200 μm is diameter. In some embodiments, the embryo is a mammalian embryo (e.g., a human embryo). In some embodiments, the embryo is unstained. Markers of polarization can be not stained in the embryo.

In some embodiments, receiving the 3D image comprises: capturing the 3D image of the embryo. In some embodiments, the 3D image comprises a bright-field 3D image of the embryo, a differential interference contrast (DIC) 3D image of the embryo, or a combination thereof. In some embodiments, the 3D image comprises a 3D image stack comprising a plurality of z-slice 2D images of the embryo (e.g., at least 8 z-slice 2D images of the embryo). In some embodiments, the 3D image has a size of at least 512 pixels in a x-dimension and/or at least 512 pixels a y-dimension. The 2D image has a size of at least 512 pixels in a x-dimension and/or at least 512 pixels in a y-dimension.

In some embodiments, generating the 2D image representing the 3D image comprises: determining a value of each pixel of the 2D image from one, one or more, or each pixel corresponding to the pixel in the 3D image of the embryo (e.g., the corresponding pixel in each of the plurality of z-slice 2D images of the embryo). In some embodiments, the 2D image comprises an informative 2D representation of the 3D image. The 2D image can comprise a maximally informative 2D representation of the 3D image. In some embodiments, generating the 2D image representing the 3D image comprises: generating the 2D image representing the 3D image using a variance metric algorithm or an all-in-focus (AIF) algorithm. The AIF algorithm can be based on wavelet transform. The wavelet transform can comprise complex wavelet transform. The complex wavelet transform can comprise dual-tree complex wavelet transform (DTCWT).

In some embodiments, the CNN comprises a deep CNN. The CNN can comprise one or more convolutional layers, one or more batch normalization layers, one or more activation layers (e.g., ReLu layers), and/or one or more pooling layers (e.g., max pooling, min pooling, or average pooling). The CNN can comprise at least 50 convolutional layers. In some embodiments, the CNN comprises a plurality of dense layers. The CNN can comprise two dense layers. A first dense layer of the plurality of dense layers can be connected to a last layer of the CNN that is not a dense layer. A first dense layer of the plurality of dense layers can be connected to a last convolutional layer of the CNN or a layer subsequent to the last convolutional layer of the CNN. A (or any) dense layer other than the last dense layer can be connected with an immediate subsequent dense layer. A (or any) dense layer other than a first dense layer can be connected with an immediate prior dense layer. A last dense layer of the plurality of dense layers can comprise the two output nodes.

In some embodiments, the CNN comprises a dense convolutional network (DenseNet), a squeeze-and-excitation network (SENet), a residual neural network (ResNet), or a combination thereof.

In some embodiments, the CNN uses inter-blastomere angle as a cue. The CNN can use compaction as a cue. The CNN can be based on more than the inter-blastomere angle. The CNN can be based on more than the compaction. The CNN can have a higher accuracy, sensitivity, and/or specificity for determining the embryo as being before or after the onset of polarization in the 3D image than that determined using just the inter-blastomere angle and/or compaction. In some embodiments, the CNN has an accuracy of at least 80%. The CNN can have a sensitivity of at least 80%. The CNN can have a specificity of at least 80%. The CNN can have an area under the receiver operating characteristic curve is at least 0.8.

In some embodiments, determining the before-onset probability and the after-onset probability using the CNN comprises: determining the before-onset probability and the after-onset probability using an ensemble model, e.g., a plurality of CNNs. In some embodiments, determining the before-onset probability and the after-onset probability using the plurality of CNNs comprises: determining a first before-onset probability that the embryo is before the onset of polarization in the 3D image and a first after-onset probability that the embryo is after the onset of polarization in the 3D image using each of the plurality of CNNs. Determining the before-onset probability and the after-onset probability using the plurality of CNNs can comprises: determining a measure of the first before-onset probabilities and a measure of the first after-onset probabilities as the before-onset probability that the embryo is before onset of polarization in the 3D image and the after-onset probability that the embryo is after onset of polarization in the 3D image, respectively. The measure can comprise a minimum, an average, a medium, a maximum, or a combination thereof.

In some embodiments, the plurality of CNNs comprises 6 CNNs. At least two of the plurality of CNNs can comprise an identical architecture with different weights. In some embodiments, two of the plurality of CNNs are trained using different initializations and/or different optimizers. Two of the plurality of CNNs can be trained using identical initializations and/or identical optimizers. The optimizers can comprise a stochastic gradient descent (SGD) optimizer, an Adam optimizer, or a combination thereof. Half of the plurality of CNNs can be trained with one optimizer. The other half of the plurality of CNNs can be trained with another optimizer. In some embodiments, two or more of the plurality of CNNs are trained for an identical number of epochs (or iterations), e.g., 40 epochs.

In some embodiments, the method comprises: receiving the CNN. In some embodiments, the method comprises: training the CNN. Training the CNN can comprise: training the CNN for at least 20 epochs. Training the CNN can comprise: training the CNN with transfer learning. Training the CNN can comprise: training the CNN using data augmentation. In some embodiments, training the CNN can comprise: training the CNN using a stochastic gradient descent (SGD) optimizer, an Adam optimizer, or a combination thereof.

In some embodiments, training the CNN comprises: training the CNN using a plurality of 2D training images, representing a plurality of 3D images of embryos, and associated annotated polarization labels (an annotated polarization label for each 2D training image or corresponding 3D training image) of before or after the onset of polarization. The associated annotated polarization labels can comprise the ground truth for each of the 2D training image or corresponding 3D training image. The plurality of 2D training images can comprise at least 1000 2D training images representing 1000 3D training images of embryos. The plurality of training images can comprise at least 20 2D training images representing 20 3D training images of each of at least 50 embryos. The embryos can comprise at least 50 embryos. In some embodiments, at least 50% of the plurality of 2D training images comprise 2D images representing 3D images of embryos before the onset of polarization. At least 50% of the plurality of 2D training images can comprise 2D images representing 3D images of embryos after the onset of polarization. In some embodiments, the plurality of 2D training images represents a plurality of 3D training images of a plurality of embryos captured between the 2-cell-stage and the 16-cell-stage. In some embodiments, the method comprises: receiving the associated annotated polarization labels.

In some embodiments, the method comprises: receiving a 3D fluorescent image of the embryo corresponding to the 3D image of the embryo. The method can comprise: generating a 2D fluorescent image representing the 3D fluorescent image of the embryo. The method can comprise: determining the associated annotated polarization label of the 2D image of the embryo using the corresponding 2D fluorescent image.

In some embodiments, generating the 2D fluorescent image representing the 3D fluorescent image comprises: determining a value of each pixel of the 2D fluorescent image from one, one or more, or each pixel corresponding to the pixel in the 3D fluorescent image of the embryo. In some embodiments, generating the 2D fluorescent image representing the 3D fluorescent image comprises: generating the 2D image fluorescent representing the 3D fluorescent image using an z-projection algorithm. The z-projection algorithm can comprise a minimum intensity, an average intensity, a medium intensity, and/or a maximum intensity z-projection algorithm.

In some embodiments, the plurality of embryos are fluorescently labeled on or after the 2-cell-stage. One or more markers of cell polarization in the plurality of embryos can be fluorescently labeled. The one or more markers of cell polarization can comprise Ezrin. The one or more markers for cell polarization can be labeled with red fluorescence protein (RFP). mRNA for the one or more markers of cell polarization can be injected into the plurality of embryos. mRNA for fluorescently labeled Ezrin can be injected into the plurality of embryos.

In some embodiments, determining the label of the embryo as being before or after the onset of polarization in the 3D image comprises: determining the before-onset probability is smaller than the after-onset probability. Determining the label of the embryo as being before or after the onset of polarization in the 3D image can comprise: determining the label of the embryo as being after the onset of polarization in the 3D image. In some embodiments, determining the label of the embryo is before or after the onset of polarization in the 3D image comprises: determining the before probability is greater than the after probability. Determining the label of the embryo is before or after the onset of polarization in the 3D image can comprise: determining the label of the embryo as being before the onset of polarization in the 3D image. In some embodiments, determining the label of the embryo as being before or after the onset of polarization in the 3D image comprises: determining the before-onset probability is between 0.45 and 0.55 and/or the after-onset probability is between 0.55 and 0.45. Determining the label of the embryo as being before or after the onset of polarization in the 3D image can comprise: determining the label of the embryo as being undetermined.

In some embodiments, the method comprises: using the label of the embryo for embryo selection, accessing embryo health, or a combination thereof. In some embodiments, the method comprises: generating a user interface (UI) comprising a UI element representing, or a file comprising, the label of the embryo as being before or after the onset of polarization in the 3D image determined.

In some embodiments, receiving the 3D image of an embryo comprises: receiving a plurality of 3D images of the embryo comprising time-lapsed 3D images of the embryo. The time-lapsed 3D images of the embryo can comprise at least 16 time-lapsed 3D images of the embryo. Two consecutive time-lapsed 3D images (or any two consecutive time-lapsed 3D images) of the embryo are captured at least 1 hour apart. Generating the 2D image representing the 3D image of the embryo can comprise: generating a 2D image representing each of the plurality of 3D images of the embryo. In some embodiments, determining the before-onset probability and the after-onset probability comprises: determining a before-onset probability that the embryo is before onset of polarization and an after-onset probability that the embryo is before or after, respectively, the onset of polarization in each of the plurality of 3D images using the CNN with the 2D image representing the 3D image of the plurality of 3D images an input. In some embodiments, determining the label of the embryo comprises: determining a label of the embryo as being before or after the onset of polarization in each of the plurality of 3D images using the before-onset probability and the after-onset probability determined for the 3D image of the plurality of 3D images. The method can further comprise: performing majority voting of the labels determined for the plurality of 3D images, optionally wherein performing majority voting comprises: performing majority voting using a window of three. In some embodiments, the method further comprises: updating the label of each 3D image subsequent to a 3D image, with the label of the embryo being after the onset of polarization, to the label of the embryo being after the onset of polarization.

Disclosed herein include systems of determining embryo polarization. In some embodiments, a system of determining embryo polarization, for example, of an embryo that is unstained or an embryo with markers for cell polarization unstained. The system can comprise: non-transitory memory configured to store executable instructions. The non-transitory memory can be configured to store a machine learning model, such as a convolutional neural network (CNN). The CNN can comprise two output nodes which output a before-onset probability and an after-onset probability. The CNN can be trained using a plurality of 2D training images, representing a plurality of 3D training images of embryos, and associated annotated polarization labels. The associated annotated polarization label of each 2D training image can be determined using a corresponding 2D fluorescent image. The system can comprise: a processor (e.g., a hardware processor or a virtual processor) in communication with the non-transitory memory. The processor can be programmed by the executable instructions to perform: receiving a 3D image (e.g., a non-fluorescent image) of an embryo (e.g., an embryo that is unstained or an embryo with markers for cell polarization unstained). The processor can be programmed by the executable instructions to perform: generating a 2D image representing the 3D image of the embryo. The processor can be programmed by the executable instructions to perform: determining a before-onset probability that the embryo is before onset of polarization in the 3D image and an after-onset probability that the embryo is after onset of polarization in the 3D image using the CNN with the 2D image generated as input. The processor can be programmed by the executable instructions to perform: determining a label (or status) of the embryo as being before or after the onset of polarization in the 3D image using the before-onset probability and the after-onset probability.

In some embodiments, the embryo is a 8-cell-stage embryo, a 8-16-cell-stage embryo, a 16-cell stage embryo, or a combination thereof. The embryo can comprise about or at least 8 cells, 8-16 cells, 16 cells, or a combination thereof. In some embodiments, the embryo is about 200 µm is diameter. In some embodiments, the embryo is a mammalian embryo (e.g., a human embryo). In some embodiments, the embryo is unstained. Markers of polarization can be not stained in the embryo.

In some embodiments, receiving the 3D image comprises: capturing the 3D image of the embryo. In some embodiments, the 3D image comprises a bright-field 3D image of the embryo, a differential interference contrast (DIC) 3D image of the embryo, or a combination thereof. In some embodiments, the 3D image comprises a 3D image stack comprising a plurality of z-slice 2D images of the embryo (e.g., at least 8 z-slice 2D images of the embryo). In some embodiments, the 3D image has a size of at least 512 pixels in a x-dimension and/or at least 512 pixels a y-dimension. The 2D image has a size of at least 512 pixels in a x-dimension and/or at least 512 pixels in a y-dimension.

In some embodiments, generating the 2D image representing the 3D image comprises: determining a value of each pixel of the 2D image from one, one or more, or each pixel corresponding to the pixel in the 3D image of the embryo (e.g., the corresponding pixel in each of the plurality of z-slice 2D images of the embryo). In some embodiments, the 2D image comprises an informative 2D representation of the 3D image. The 2D image can comprise a maximally informative 2D representation of the 3D image. In some embodiments, generating the 2D image representing the 3D image comprises: generating the 2D image representing the 3D image using a variance metric algorithm or an all-in-focus (AIF) algorithm. The AIF algorithm can be based on wavelet transform. The wavelet transform can comprise complex wavelet transform. The complex wavelet transform can comprise dual-tree complex wavelet transform (DTCWT).

In some embodiments, wherein the CNN comprises a deep CNN. The CNN can comprise one or more convolutional layers, one or more batch normalization layers, one or more activation layers (e.g., ReLu layers), and/or one or more pooling layers (e.g., max pooling, min pooling, or average pooling). The CNN can comprise at least 50 convolutional layers. In some embodiments, the CNN comprises a plurality of dense layers. The CNN can comprise two dense layers. A first dense layer of the plurality of dense layers can be connected to a last layer of the CNN that is not a dense layer. A first dense layer of the plurality of dense layers can be connected to a last convolutional layer of the CNN or a layer subsequent to the last convolutional layer of the CNN. A (or any) dense layer other than the last dense layer can be connected with an immediate subsequent dense layer. A (or any) dense layer other than a first dense layer can be connected with an immediate prior dense layer. A last dense layer of the plurality of dense layers can comprise the two output nodes. In some embodiments, the CNN comprises a dense convolutional network (DenseNet), a squeeze-and-excitation network (SENet), a residual neural network (ResNet), or a combination thereof.

In some embodiments, the CNN uses inter-blastomere angle as a cue. The CNN can use compaction as a cue. The CNN can be based on more than the inter-blastomere angle. The CNN can be based on more than the compaction. The CNN can have a higher accuracy, sensitivity, and/or specificity for determining the embryo as being before or after the onset of polarization in the 3D image than that determined using just the inter-blastomere angle and/or compaction. In some embodiments, the CNN has an accuracy of at least 80%. The CNN can have a sensitivity of at least 80%. The CNN can have a specificity of at least 80%. The CNN can have an area under the receiver operating characteristic curve is at least 0.8.

In some embodiments, determining the before-onset probability and the after-onset probability using the CNN comprises: determining the before-onset probability and the after-onset probability using an ensemble model, e.g., a plurality of CNNs. In some embodiments, determining the before-onset probability and the after-onset probability using the plurality of CNNs comprises: determining a first before-onset probability that the embryo is before the onset of polarization in the 3D image and a first after-onset probability that the embryo is after the onset of polarization in the 3D image using each of the plurality of CNNs. Determining the before-onset probability and the after-onset probability using the plurality of CNNs can comprises: determining a measure of the first before-onset probabilities and a measure of the first after-onset probabilities as the before-onset probability that the embryo is before onset of polarization in the 3D image and the after-onset probability that the embryo is after onset of polarization in the 3D image, respectively. The measure can comprise a minimum, an average, a medium, a maximum, or a combination thereof.

In some embodiments, the plurality of CNNs comprises 6 CNNs. At least two of the plurality of CNNs can comprise an identical architecture with different weights. In some embodiments, two of the plurality of CNNs are trained using different initializations and/or different optimizers. Two of the plurality of CNNs can be trained using identical initializations and/or identical optimizers. The optimizers can comprise a stochastic gradient descent (SGD) optimizer, an Adam optimizer, or a combination thereof. Half of the plurality of CNNs can be trained with one optimizer. The other half of the plurality of CNNs can be trained with another optimizer. In some embodiments, two or more of the plurality of CNNs are trained for an identical number of epochs (or iterations), e.g., 40 epochs.

In some embodiments, the processor is programmed by the executable instructions to perform: training the CNN. Training the CNN can comprise: training the CNN for at least 20 epochs. Training the CNN can comprise: training the CNN with transfer learning. Training the CNN can comprise: training the CNN using data augmentation. Training the CNN can comprise: training the CNN using a stochastic gradient descent (SGD) optimizer, an Adam optimizer, or a combination thereof.

In some embodiments, training the CNN comprises: training the CNN using a plurality of 2D training images, representing a plurality of 3D images of embryos, and associated annotated polarization labels (an annotated polarization label for each 2D training image or corresponding 3D training image) of before or after the onset of polarization. The associated annotated polarization labels can comprise the ground truth for each of the 2D training image or corresponding 3D training image. The plurality of 2D training images can comprise at least 1000 2D training images representing 1000 3D training images of embryos. The plurality of training images can comprise at least 20 2D training images representing 20 3D training images of each of at least 50 embryos. The embryos can comprise at least 50 embryos. In some embodiments, at least 50% of the plurality of 2D training images comprise 2D images representing 3D images of embryos before the onset of polarization. At least 50% of the plurality of 2D training images can comprise 2D images representing 3D images of embryos after the onset of polarization. In some embodiments, the plurality of 2D training images represents a plurality of 3D training images of a plurality of embryos captured between the 2-cell-stage and the 16-cell-stage. In some embodiments, the method comprises: receiving the associated annotated polarization labels. In some embodiments, the processor is programmed by the executable instructions to perform: receiving the associated annotated polarization labels.

In some embodiments, the processor is programmed by the executable instructions to perform: receiving a 3D fluorescent image of the embryo corresponding to the 3D image of the embryo. The processor can be programmed by the executable instructions to perform: generating a 2D fluorescent image representing the 3D fluorescent image of the embryo. The associated annotated polarization label of the 2D image of the embryo can be determined using the 2D corresponding fluorescent image.

In some embodiments, wherein generating the 2D fluorescent image representing the 3D fluorescent image comprises: determining a value of each pixel of the 2D fluorescent image from one, one or more, or each pixel corresponding to the pixel in the 3D fluorescent image of the embryo. In some embodiments, generating the 2D fluorescent image representing the 3D fluorescent image comprises: generating the 2D image fluorescent representing the 3D fluorescent image using an z-projection algorithm, optionally wherein the z-projection algorithm comprises a minimum intensity, an average intensity, a medium intensity, and/or a maximum intensity z-projection algorithm.

In some embodiments, the plurality of embryos are fluorescently labeled on or after the 2-cell-stage. One or more markers of cell polarization in the plurality of embryos can be fluorescently labeled. The one or more markers of cell polarization can comprise Ezrin. The one or more markers for cell polarization can be labeled with red fluorescence protein (RFP). mRNA for the one or more markers of cell polarization can be injected into the plurality of embryos. mRNA for fluorescently labeled Ezrin can be injected into the plurality of embryos.

In some embodiments, determining the label of the embryo as being before or after the onset of polarization in the 3D image comprises: determining the before-onset probability is smaller than the after-onset probability. Determining the label of the embryo as being before or after the onset of polarization in the 3D image can comprise: determining the label of the embryo as being after the onset of polarization in the 3D image. In some embodiments, determining the label of the embryo is before or after the onset of polarization in the 3D image comprises: determining the before probability is greater than the after probability. Determining the label of the embryo is before or after the onset of polarization in the 3D image can comprise: determining the label of the embryo as being before the onset of polarization in the 3D image. In some embodiments, determining the label of the embryo as being before or after the onset of polarization in the 3D image comprises: determining the before-onset probability is between 0.45 and 0.55 and/or the after-onset probability is between 0.55 and 0.45. Determining the label of the embryo as being before or after the onset of polarization in the 3D image can comprise: determining the label of the embryo as being undetermined.

In some embodiments, the processor is programmed by the executable instructions to perform: using the label of the embryo for embryo selection, accessing embryo health, or a combination thereof. In some embodiments, the processor is programmed by the executable instructions to perform: generating a user interface (UI) comprising a UI element representing, or a file comprising, the label of the embryo as being before or after the onset of polarization in the 3D image determined.

In some embodiments, receiving the 3D image of an embryo comprises: receiving a plurality of 3D images of the embryo comprising time-lapsed 3D images of the embryo. The time-lapsed 3D images of the embryo can comprise at least 16 time-lapsed 3D images of the embryo. Two consecutive time-lapsed 3D images (or any two consecutive time-lapsed 3D images) of the embryo are captured at least 1 hour apart. Generating the 2D image representing the 3D image of the embryo can comprise: generating a 2D image representing each of the plurality of 3D images of the embryo. In some embodiments, determining the before-onset probability and the after-onset probability comprises: determining a before-onset probability that the embryo is before onset of polarization and an after-onset probability that the embryo is before or after, respectively, the onset of polarization in each of the plurality of 3D images using the CNN with the 2D image representing the 3D image of the plurality of 3D images an input. In some embodiments, determining the label of the embryo comprises: determining a label of the embryo as being before or after the onset of polarization in each of the plurality of 3D images using the before-onset probability and the after-onset probability determined for the 3D image of the plurality of 3D images. The processor can be programmed by the executable instructions to perform: performing majority voting of the labels determined for the plurality of 3D images, optionally wherein performing majority voting comprises: performing majority voting using a window of three. In some embodiments, The processor is programmed by the executable instructions to perform: updating the label of each 3D image subsequent to a 3D image, with the label of the embryo being after the onset of polarization, to the label of the embryo being after the onset of polarization.

Disclosed herein include systems of training a convolutional neural network for determining embryo polarization. In some embodiments, a system of training a convolutional neural network for determining embryo polarization comprises: non-transitory memory configured to store executable instructions. The system can comprise: a processor (e.g., a hardware processor or a virtual processor) in communication with the non-transitory memory. The processor can be programmed by the executable instructions to perform: receiving a plurality of three-dimensional (3D) training images of embryos and associated annotated polarization labels. The associated annotated polarization label of each 3D training image can be determined using a corresponding 3D or 2D fluorescent image of the 3D training image. The processor can be programmed by the executable instructions to perform: generating a plurality of 2D training images representing the plurality of 3D images of embryos. The processor can be programmed by the executable instructions to perform: training a machine learning model, e.g., a convolutional neural network (CNN). The CNN can comprise two output nodes which output a before-onset probability and an after-onset probability using the plurality of 2D training images and the associated annotated polarization labels of the corresponding 3D images.

In some embodiments, the embryos comprise a mammalian embryo, e.g., a human embryo. In some embodiments, receiving the plurality of 3D images comprises: capturing the plurality of 3D images of the embryos. In some embodiments, a 3D image comprises a 3D image stack comprising a plurality of z-slice 2D images of an embryo. The 3D image can comprise at least 8 z-slice 2D images of the embryo. In some embodiments, a 3D image has a size of at least 512 pixels in a x-dimension and/or at least 512 pixels a y-dimension. The 2D image has a size of at least 512 pixels in a x-dimension and/or at least 512 pixels in a y-dimension.

In some embodiments, a 3D image comprises a bright-field 3D image of the embryo, a differential interference contrast (DIC) 3D image of the embryo, or a combination thereof. In some embodiments, generating a 2D image representing a 3D image comprises: determining a value of each pixel of the 2D image from one, one or more, or each pixel corresponding to the pixel in the 3D image of an embryo. In some embodiments, the 2D image comprises an informative 2D representation of the 3D image. The 2D image can comprise a maximally informative 2D representation of the 3D image. In some embodiments, generating the 2D image representing the 3D image comprises: generating the 2D image representing the 3D image using a variance metric algorithm or an all-in-focus (AIF) algorithm. The AIF algorithm can be based on wavelet transform. The wavelet transform can comprise complex wavelet transform. The complex wavelet transform can comprise dual-tree complex wavelet transform (DTCWT).

In some embodiments, the CNN comprises a deep CNN. The CNN can comprise one or more convolutional layers, one or more batch normalization layers, one or more activation layers (e.g., ReLu layers), and/or one or more pooling layers (e.g., max pooling, min pooling, or average pooling). The CNN can comprise at least 50 convolutional layers. In some embodiments, the CNN comprises a plurality of dense layers. The CNN can comprise two dense layers. A first dense layer of the plurality of dense layers can be connected to a last layer of the CNN that is not a dense layer. A first dense layer of the plurality of dense layers can be connected to a last convolutional layer of the CNN or a layer subsequent to the last convolutional layer of the CNN. A (or any) dense layer other than the last dense layer can be connected with an immediate subsequent dense layer. A (or any) dense layer other than a first dense layer can be connected with an immediate prior dense layer. A last dense layer of the plurality of dense layers can comprise the two output nodes. In some embodiments, the CNN comprises a dense convolutional network (DenseNet), a squeeze-and-excitation network (SENet), a residual neural network (ResNet), or a combination thereof.

In some embodiments, the trained CNN uses inter-blastomere angle as a cue. The trained CNN can use compaction as a cue. The trained CNN can be based on more than the inter-blastomere angle. The CNN can be based on more than the compaction. The CNN can have a higher accuracy, sensitivity, and/or specificity for determining the embryo as being before or after the onset of polarization in the 3D image than that determined using the inter-blastomere angle and/or compaction. In some embodiments, the CNN has an accuracy of at least 80%. The CNN can have a sensitivity of at least 80%. The CNN can have a specificity of at least 80%. The CNN can have an area under the receiver operating characteristic curve is at least 0.8.

In some embodiments, training the CNN comprises: training an ensemble model, e.g., a plurality of CNNs. In some embodiments, the plurality of CNNs comprises 6 CNNs. At least two of the plurality of CNNs can comprise an identical architecture with different weights. In some embodiments, two of the plurality of CNNs are trained using different initializations and/or different optimizers. Two of the plurality of CNNs can be trained using identical initializations and/or identical optimizers. The optimizers can comprise a stochastic gradient descent (SGD) optimizer, an Adam optimizer, or a combination thereof. Half of the plurality of CNNs can be trained with one optimizer. The other half of the plurality of CNNs can be trained with another optimizer. In some embodiments, two or more of the plurality of CNNs are trained for an identical number of epochs (or iterations), e.g., 40 epochs.

In some embodiments, training the CNN comprises: training the CNN for at least 20 epochs. Training the CNN can comprise: training the CNN with transfer learning. Training the CNN can comprise: training the CNN using data augmentation. In some embodiments, training the CNN can comprise: training the CNN using a stochastic gradient descent (SGD) optimizer, an Adam optimizer, or a combination thereof.

In some embodiments, training the CNN comprises: training the CNN using a plurality of 2D training images, representing a plurality of 3D images of embryos, and associated annotated polarization labels (an annotated polarization label for each 2D training image or corresponding 3D training image) of before or after the onset of polarization. The associated annotated polarization labels can comprise the ground truth for each of the 2D training image or corresponding 3D training image. The plurality of 2D training images can comprise at least 1000 2D training images representing 1000 3D training images of embryos. The plurality of training images can comprise at least 20 2D training images representing 20 3D training images of each of at least 50 embryos. The embryos can comprise at least 50 embryos. In some embodiments, at least 50% of the plurality of 2D training images comprise 2D images representing 3D images of embryos before the onset of polarization. At least 50% of the plurality of 2D training images can comprise 2D images representing 3D images of embryos after the onset of polarization. In some embodiments, the plurality of 2D training images represents a plurality of 3D training images of a plurality of embryos captured between the 2-cell-stage and the 16-cell-stage In some embodiments, the processor is programmed by the executable instructions to perform: receiving a 3D fluorescent image of the embryo corresponding to a 3D image of an embryo. The processor can be programmed by the executable instructions to perform: generating a 2D fluorescent image representing the 3D fluorescent image of the embryo. Generating the 2D fluorescent image representing the 3D fluorescent image can comprise: determining a value of each pixel of the 2D fluorescent image from one, one or more, or each pixel corresponding to the pixel in the 3D fluorescent image of the embryo. Generating the 2D fluorescent image representing the 3D fluorescent image can comprise: generating the 2D image fluorescent representing the 3D fluorescent image using an z-projection algorithm, optionally wherein the z-projection algorithm comprises a minimum intensity, an average intensity, a medium intensity, and/or a maximum intensity z-projection algorithm.

In some embodiments, the plurality of embryos captured in the plurality of 3D training images are fluorescently labeled on or after the 2-cell-stage. One or more markers of cell polarization in the plurality of embryos can be fluorescently labeled. The one or more markers of cell polarization can comprise Ezrin. The one or more markers for cell polarization can be labeled with red fluorescence protein (RFP). mRNA for the one or more markers of cell polarization can be injected into the plurality of embryos. mRNA for fluorescently labeled Ezrin can be injected into the plurality of embryos.

Disclosed herein include embodiments of a computer readable medium. In some embodiments, a computer readable medium comprising executable instructions, when executed by a processor (e.g., a hardware processor or a virtual processor) of a computing system or a device, cause the processor, to perform any method disclosed herein.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 1A-FIG. 1D depict non-limiting exemplary embodiments for a method to track and annotate polarity. FIG. 1A shows an overview of mouse pre-implantation development, from the zygote stage at embryonic day 0 to the late blastocyst stage at embryonic day 4.5. At the late 8-cell stage, polarization takes place, as each blastomere gains a defined apical-basal axis of polarity indicated by the presence of an apical. FIG. 1B shows data preprocessing of dual-channel 3D mouse embryo videos, each of which is a 5D tensor with the dimension of x, y, z, c (channel), and t (time). First, each video was split into a fluorescence (Ezrin-RFP) and DIC channel. Then, each channel was compressed along the z dimension by different algorithms. The maximum intensity z-projection algorithm was applied for the fluorescence channel and DTCWT based AIF algorithm for the DIC channel to get the frame sequences. FIG. 1C depicts expert annotation on fluorescence frame sequences, where the time point of polarity onset is pinpointed. In the time sequence, the onset of polarization was defined as the frame in which the blastomere had a clear polarity ring or cap (closed) which took up at least ⅓ of the visible surface, or ⅓ of the cell surface curve if displayed side-on. Frames before this point were defined as before-onset, whilst frames including and after this point are defined as after-onset. FIG. 1D depicts supervised learning of a single DCNN model. The DIC frame sequences paired with the class labels from fluorescence annotation were permuted and used as the input and target of the supervised learning. Transfer learning from pre-trained weights on ImageNet database and data augmentation are utilized in the training of all DCNN models. Scale bar=30 μm.

FIG. 2A depicts class distribution in the training/testing/whole dataset. FIG. 2B shows ensemble learning on six DCNN models. The predicted probability vectors for two classes on a single testing frame by six DCNN models were averaged element—wisely and the class corresponding to the larger probability was used as the final predicted label. FIG. 2C depicts temporal smoothing on the predicted labels for each testing embryo's DIC frame sequence. The majority voting based smoothing window slid over the chronologically ordered binary labels. The window length is 3 and the label at both ends was kept untouched. Finally, the time index of first after-onset prediction was taken as the final prediction of polarity onset time point. Scale bar=20 μm.

FIG. 3A depicts the receiver operating characteristic (ROC) curve of the performance of the ensemble deep learning (DL) model on testing frames. The 95% confidence intervals (CIs) of the ROC curve are indicated by the shaded area. The solid star represents the performance of the ensemble DL model with the default probability threshold of 0.5 to binarize its output and the solid circle represents the performance of the average human (AH), which is an aggregate result of six human volunteers' prediction. Majority voting was applied to the six predictions on each testing frame to obtain the average human performance. If each prediction received three votes, a prediction of before or after onset was randomly assigned. FIG. 3B shows confusion matrices of image classification on testing frames by the ensemble DL model with the binarization threshold of 0.5 and the average human. FIG. 3C depicts a bar chart of testing accuracy of the ensemble DL model and the average human compared with no skill (random predictions), where the error bars represent the 95% CI. The ensemble DL model significantly outperforms the average human, and the no skill predictions. *$p<0.05$, $p<0.01$, *$p<0.001$, ****$p<0.0001$, NS, not significant, two-sided z-test. All the 95% CIs are estimated by bootstrapping the testing dataset with 1000 replicates.

FIG. 4A-FIG. 4D depict visualization of the decision-making by the ensemble deep learning model. Heat maps obtained by the class activation mapping (CAM) technique highlight how the ensemble deep learning model attends the discriminative regions in the testing frame when giving the predicted class label. The darker regions marked with a dotted circle in the "DIC+CAM" panels indicate positive focus of the model (in alignment with the predicted label) and the dark regions that are unmarked are negative focus (in opposition to the predicted label). FIG. 4A-FIG. 4D correspond to four cases in confusion matrix, true negatives (TN), false positives (FP), false negative (FN), and true positives (TP), respectively. In each figure, from left to right are the testing DIC image, its overlay with the focus heat map, and its corresponding fluorescence channel image. On top of the test DIC image is the predicted label of the ensemble DL model with its confidence (from 0 to 100%). On top of the fluorescence image is the annotated label by the expert. All the heat maps show that the DL model either attends to the individual blastomeres or the inter-blastomere angles. For example, TP heat map in FIG. 4D focuses on the truly polarized blastomeres. At a certain time-point, some blastomeres have started polarization but the others have not, as shown in the FN case (FIG. 4C). This resulted in the DL model making a Type II error with low confidence in the case given. Scale bar=20 μm.

FIG. 5A depicts the chronological order of compaction and polarization events during the 8-cell stage for a normal mouse embryo. FIG. 5B shows correlation analysis between time points of DL model polarity prediction and compaction. The x and y coordinates are the predicted polarity onset time index of testing embryos (marked in solid balls) by the ensemble DL model and the annotated compaction time index, respectively. Their pairwise relationship shows a Pearson correlation coefficient (p) of 0.75. FIG. 5C depicts a violin plot to visualize the time discrepancy between the annotated and the predicted polarity onset time index on 19 testing embryos by ensemble DL model and compaction proxy. The plot is overlaid with a slopegraph showing each testing embryo prediction time discrepancy by pair. From the kernel density estimate (shade) of violin plot and the connection line trends of slopegraph, the prediction time discrepancy of the DL model is found to be significantly lower than the one of compaction proxy. The p-value is specified in the figure for *$p<0.05$, $p<0.01$, *$p<0.001$, ****$p<0.0001$, NS not significant, two-sided Wilcoxon matched-pairs signed-rank test.

FIG. 9A shows the receiver operating characteristic (ROC) curve of the performance of the ensemble DL model on testing frames. The 95% confidence intervals (CIs) of the ROC curve are indicated by the shaded area. The solid star represents the performance of the ensemble DL model with the default probability threshold (thld) of 0.5 to binarize its output and the other markers with different shapes and saturation represent the performance of six human volunteers and their average (AH). Majority voting was applied to the six predictions on each testing frame to obtain an average human performance. In the case of a tie, the prediction of before or after onset was randomly assigned. FIG. 9B depicts a bar chart of testing accuracy of the ensemble DL model, six human volunteers and their average (AH), where the error bars represent the 95% CI. The ensemble DL model significantly outperforms each individual human and the average human. *$p<0.05$, $p<0.01$, *$p<0.001$, ****$p<0.0001$, NS, not significant, two-sided z-test used in all cases. All the 95% CIs are estimated by bootstrapping the testing dataset with 1000 replicates

In FIG. 11A, six human volunteers were given the randomized testing frames without any time information. Their predicted labels were then chronologically ordered for each testing embryo and temporally smoothened to extract the polarity onset time point prediction, as shown in FIG. 2C. Their average result was processed in the same way. In FIG. 11B, six humans were given the chronologically ordered frames for each testing embryo. They directly estimated the polarity onset time point. Their average result was the arithmetic mean of predicted time indexes for each testing embryo. Comparison between the ensemble DL model and each human is given in the figure. *$p<0.05$, $p<0.01$, *$p<0.001$, ****$p<0.0001$, NS, not significant, two-sided Wilcoxon matched-pairs signed-rank test.

Figure 1A:
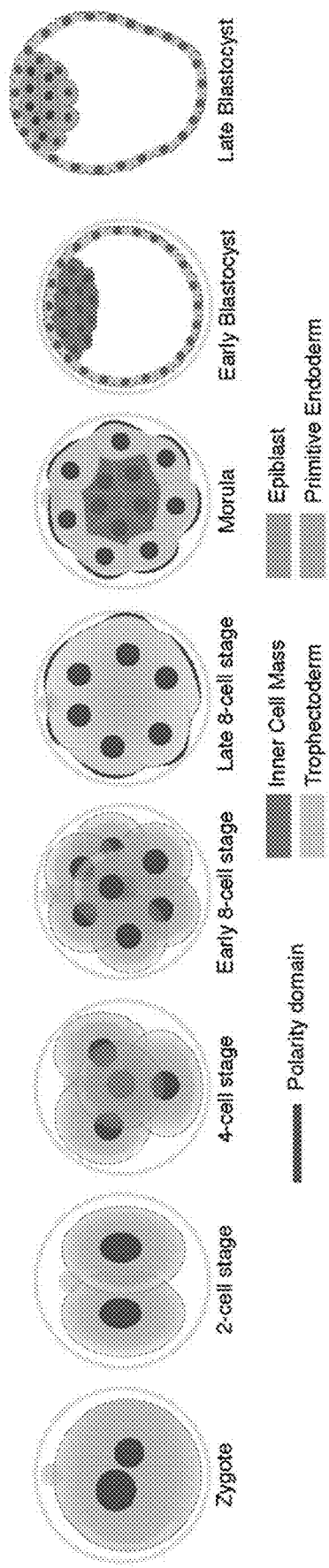

Throughout the drawings, reference numbers may be re-used to indicate correspondence between referenced elements. The drawings are provided to illustrate example embodiments described herein and are not intended to limit the scope of the disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

Polarization is the process by which all individual cells of the embryo establish an apical domain on the cell-cell contact-free surface (FIG. 1A). In the mouse embryo, this process occurs at the 8-cell stage, on the third day of development after fertilization. When polarized cells divide, the apical domain becomes inherited by cells that will become specified as trophectoderm (TE), which ultimately forms the placenta. In contrast, those cells that do not inherit the apical domain will form the inner cell mass (ICM), which will give rise to all fetal tissues and the yolk sac. Thus, embryo polarization is key to the first bifurcation of cell fates in the mammalian embryo, and establishment of cell lineages in the blastocyst, which is crucial for implantation and a successful pregnancy.

It would be invaluable to be able to predict embryo polarization status when embryos are alive, as this would enable the determination of embryo developmental potential. However, existing methods allowing for this are invasive as they rely on embryos having to express fluorescently tagged proteins that mark the apical domains of the polarized cells. The imaging of such fluorophores is associated with phototoxicity unless light exposure is limited, which in itself creates imaging challenges. In any event, human embryos meant for implantation simply cannot be fluorescently tagged for ethical reasons. This has prevented clinical embryologists from employing blastomere polarization as a way of tracking the quality of human embryo development, to select the best embryo for transfer to the mother-to-be.

There is a need for solving the problem of tracking of polarization without the use of fluorescence by, e.g., deep learning methods, which have the capability to discern some salient features hard to interpret for the human visual system. Deep learning has been recently applied on single time point images to assess a human embryo's implantation potential. Subsequent studies have limited their use of deep learning to outputting only directly interpretable intermediate morphological quantifications, including cell number, cell centroid localization, and cell size. These parameters are then fed into a non-neural-network based morphological grading system to rank cleavage-stage embryos for transfer in the IVF clinic.

Disclosed herein includes use of artificial intelligence to automate polarization detection on differential interference contrast (DIC) time-lapse images of embryos, thereby leveraging the capabilities of deep learning for embryo study in several ways. The detection model can be trained to recognize patterns in DIC images using, e.g., expert-annotated labels on corresponding fluorescent images. The single time point analysis can be extended for the evaluation of time-lapse image series in order to utilize temporal information.

A method for compressing three-dimensional time-lapsed embryonic image data into two-dimensions to reduce data size without significantly sacrificing machine learning performance is disclosed herein. The resulting model can have an accuracy of 85% and that significantly outperform humans trained for the same task on the same data.

Disclosed herein include methods of determining (or detecting) embryo polarization. In some embodiments, a method of determining embryo polarization can be under control of a processor (e.g., a hardware processor or a virtual processor). The method can comprise: receiving a three-dimensional (3D) image of an embryo (e.g., an embryo with markers of cell polarization not strained). The method can comprise: generating a two-dimensional (2D) image representing the 3D image of the embryo. The method can comprise: determining a before-onset probability that the embryo is before onset of polarization in the 3D image and an after-onset probability that the embryo is after onset of polarization in the 3D image using a machine learning model, such as a convolutional neural network (CNN), e.g., a CNN binary classification model, with the 2D image as input. The CNN can comprise two output nodes. The two output nodes can output the before-onset probability and the after-onset probability. For example, the two output nodes can output a probability vector comprising the before-onset probability and the after-onset probability. For example, a before-onset probability output node of the two output nodes of the CNN outputs the before-onset probability, and an after-onset probability output node of the two output nodes outputs the after-onset probability. The method can comprise: determining a label (or status) of the embryo as being before or after the onset of polarization in the 3D image using the before-onset probability and the after-onset probability.

Disclosed herein include systems of determining embryo polarization. In some embodiments, a system of determining embryo polarization, for example, of an embryo that is unstained or an embryo with markers for cell polarization unstained. The system can comprise: non-transitory memory configured to store executable instructions. The non-transitory memory can be configured to store a machine learning model, e.g., a convolutional neural network (CNN). The CNN can comprise two output nodes which output a before-onset probability and an after-onset probability. The CNN can be trained using a plurality of 2D training images, representing a plurality of 3D training images of embryos, and associated annotated polarization labels. The associated annotated polarization label of each 2D training image can be determined using a corresponding 2D fluorescent image. The system can comprise: a processor (e.g., a hardware processor or a virtual processor) in communication with the non-transitory memory. The processor can be programmed by the executable instructions to perform: receiving a 3D image (e.g., a non-fluorescent image) of an embryo (e.g., an embryo that is unstained or an embryo with markers for cell polarization unstained). The processor can be programmed by the executable instructions to perform: generating a 2D image representing the 3D image of the embryo. The processor can be programmed by the executable instructions to perform: determining a before-onset probability that the embryo is before onset of polarization in the 3D image and an after-onset probability that the embryo is after onset of polarization in the 3D image using the CNN with the 2D image generated as input. The processor can be programmed by the executable instructions to perform: determining a label (or status) of the embryo as being before or after the onset of polarization in the 3D image using the before-onset probability and the after-onset probability.

Disclosed herein include systems of training a convolutional neural network for determining embryo polarization. In some embodiments, a system of training a convolutional neural network for determining embryo polarization comprises: non-transitory memory configured to store executable instructions. The system can comprise: a processor (e.g., a hardware processor or a virtual processor) in communication with the non-transitory memory. The processor can be programmed by the executable instructions to perform: receiving a plurality of three-dimensional (3D) training images of embryos and associated annotated polarization labels. The associated annotated polarization label of each 3D training image can be determined using a corresponding 3D or 2D fluorescent image of the 3D training image. The processor can be programmed by the executable instructions to perform: generating a plurality of 2D training images representing the plurality of 3D images of embryos. The processor can be programmed by the executable instructions to perform: training a machine learning model, e.g., a convolutional neural network (CNN). The CNN can comprise two output nodes which output a before-onset probability and an after-onset probability using the plurality of 2D training images and the associated annotated polarization labels of the corresponding 3D images.

Stain-Free Detection of Embryo Polarization Using Deep Learning

During embryo development, polarization is the process where all individual blastomere cells establish an apical domain on their cell-cell contact-free surface. When polarized cells divide, the cells which inherit apical domain will become trophectoderm and ultimately form the placenta, while those cells that do not will form the inner cell mass and finally all fetal tissues and the yolk sac. Thus, embryo polarization is key to the first bifurcation of cell fates in the mammalian embryo, and establishment of cell lineages in the blastocyst. The methods allow observation of embryo polarization status, and meet an unmet need to evaluate embryo developmental potential for implantation and a successful pregnancy.

However, currently all such methods are invasive as they rely on fluorescence techniques. The embryos have to be invasively fluorescently tagged, which cannot be ethically performed in live human embryos. In addition, the imaging of expressed fluorophore-tagged proteins is associated with phototoxicity issues due to the excitation light unless the exposure is limited, which in itself creates imaging challenges. There is a need for a non-invasive tool to study polarization status of live embryos.

Disclosed herein is a method for leveraging deep learning technology to detect embryo polarization non-invasively without the need for fluorescence techniques. In some embodiments, the method utilizes differential interference contrast (DIC) images of the mouse embryo. Detecting polarization from unstained DIC images is an extraordinarily difficult task, and trained human volunteers perform at nearly the level of random chance. However, using deep learning, polarization can be correctly detected at a performance level much higher than humans—enough to enable clinical use in live human embryos—while avoiding laborious and subjective manual interpretation.

Some advantages of the methods disclosed herein are described below. (1) Ensemble deep learning was used to develop a method for non-invasively detecting embryo polarization. The trained deep learning model can outperform all six recruited human volunteer with the STEM education background and self-learning on the same training dataset as the model does, even when they are provided additional information about the embryo time course that the model does not have access to. In some embodiments, (2) an efficient compression method was used to represent 3D DIC images in 2D to maximize the ratio of blastomere visual information to the data size. (3) Class activation mapping technique was used to interrogate which embryo regions influence detection. Notably, the model self-learns an important known polarization cue called the inter-blastomere angle. In some embodiments, the model outperforms the use of inter-blastomere angle alone to detect polarization, highlighting that it incorporates several cues in its prediction. In some embodiments, (4) single time-point image analysis was extended to time-sequence video analysis for precise timestamping of polarization.

Provided herein is a non-invasive deep learning based solution for detecting the polarization status of embryos, which is interpretable and superior to the average human performance. This deep learning solution can provide a viable automated approach to screen live human embryos for suitability of implantation in mothers-to-be for in vitro fertilization procedures.

Polarization of the mammalian embryo enables the first cell fate decision and is a predictor of a successful pregnancy. However, tracking polarization currently requires invasive and clinically impermissible fluorescence staining. Provided herein is a deep learning model for the difficult task of detecting polarization from unstained mouse embryos, avoiding fluorescence. Human volunteers trained to distinguish before versus after polarization perform marginally better than flipping a coin, while the disclosed model achieves 5.7 correct classifications per misclassification using identical data (61% vs. 85% accuracy). The model self-learns inter-blastomere angle as a cue for decision-making. In some embodiments, the model outperforms the use of compaction alone. The analysis of single time-point images was extended to time-sequence video recordings, exploiting temporally dependent information overlooked by existing methods. In conclusion, there is provided a computational method for non-invasive detection of embryo polarization that solves an unmet need for the quantitative screening of embryo viability for implantation in the clinic.

The ensemble deep learning model described herein can identify polarization in unstained embryo images using AIF DIC microscopy with an accuracy surpassing humans by a wide margin. When classifying 583 test DIC 8-cell stage frames, the model yielded an accuracy of 85% [95% confidence interval (CI): 82.2%-88.2%] compared to corresponding average human accuracy of 61% [95% CI: 57.1%-65.0%].

It is important to note the difficulty of the polarization detection task using unstained embryo images. The observed human accuracy of 61% represents a performance level barely higher than random chance. Expressed as odds, the odds of a human volunteer correctly differentiating polarization were 1.5—that is, humans were right 1.5 times for every time they were wrong. In contrast, the deep learning model was correct 5.7 times for every time it was wrong.

Possible reasons for the successes and failures of the model were investigated using the CAM technique and, without being bound by any particular theory, it was concluded that inter-blastomere angle, an indicator of compaction, was one of the model's cues for prediction. However, compaction alone was an inferior predictor of polarization compared to the model, suggesting that the model learned additional features informative of polarization. Moreover, the deep learning model was able to predict the exact time point of polarization onset amongst temporally sequenced image frames better than all the human volunteers, even when the humans were given additional time information not available to the model.

The disclosed model leverages the power of deep learning in several ways. Deep neural networks are known to be able to recognize subtle features that are difficult for humans to identify. Here, fluorescently stained embryo images were manually annotated and used to train a neural network that identifies polarization events in completely unstained DIC images of the same embryos. The resulting model detects blastomere polarization accurately without requiring the fluorescent staining of embryos that currently limits polarity identification in living human embryos and in the clinical setting.

Figure 8C:
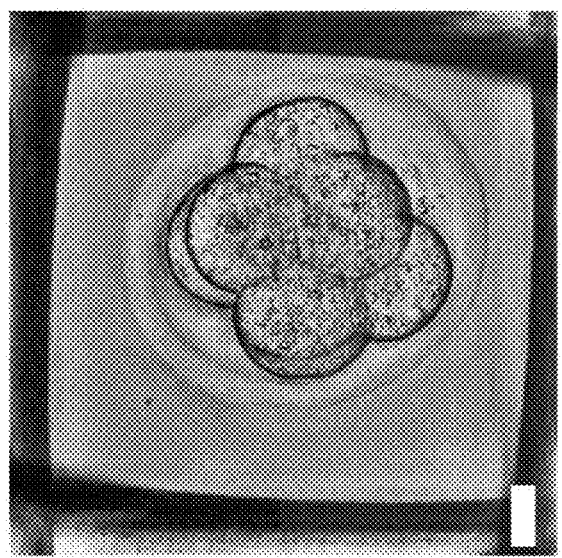
FIG. 8A-FIG. 8C depict comparisons among different input image formats. Previous deep learning studies on embryo development used a single z slice image, in most cases the middle plane (FIG. 8A). However, this resulted in some blastomeres being highly defocused and blurred. The traditional all-in-focus algorithm based on variance metric (FIG. 8B) can bring all the blastomeres into focus in a single 2D image but also result in some artifacts. Thus, the all-in-focus algorithm based on dual tree complex wavelet transform was utilized (FIG. 8C). Scale bar=20 μm.

Additionally, the methods described herein enabled successful transition from 3D image stack analysis to 2D AIF image analysis. This problem was overcome through the use of a state-of-the-art all-in-focus algorithm, which allowed for the efficient collapse of 3D optical data to 2D. Prior studies that applied deep learning to embryo development generally used single z slice DIC images as input, which obscures important three-dimensional blastomere features. The disclosed method of compressing multiple z slices into a single maximally informative 2D representation reduces data size, allowing a full range of published 2D neural network models to become accessible for embryo analysis. AIF algorithms select the most informative components of each slice for retention in a final image. This was done in the wavelet domain rather than in the spatial domain like using local variance to identify in-focus regions as the latter is sensitive to noise. The AIF images based on variance (FIG. 8B) have some artifacts at the periphery, while the AIF image based on DTCWT is clean (FIG. 8C). To demonstrate the superiority of the disclosed DTCWT method over the variance method and the single z slice images, the deep learning training and testing was repeated on each of three cases (Table 1).

Figure 12:
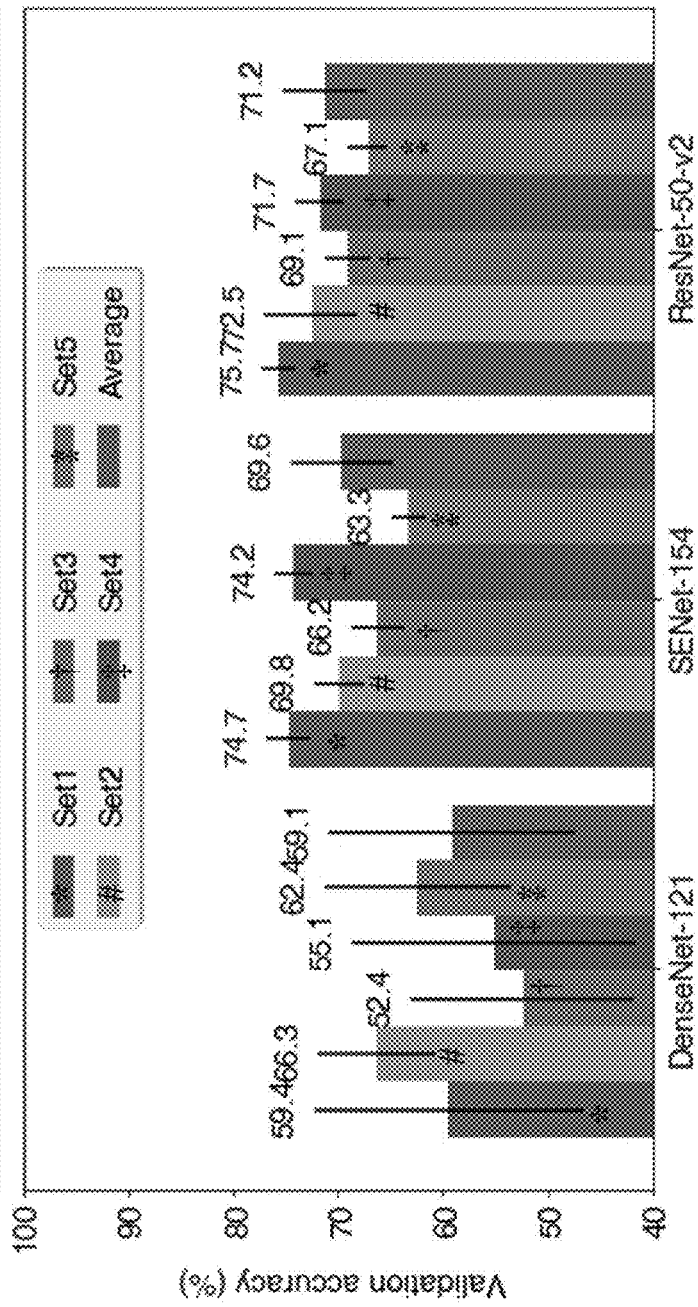
FIG. 12 shows comparisons among the performance of different image classification DCNN backbones. Five-fold cross validation was adopted here to make model selection. The training dataset was evenly split into 5 folds. Then, three backbone models learnt on four folds and were validated on the remaining one. To minimize the variance brought by the optimization setting, each numerical experiment was repeated 5 times. The validation accuracy of three models on each fold and the total average validation accuracy are summarized in the bar chart, where the error bars represent their standard deviation. Both validation accuracy and their standard deviation shows that ResNet-50-v2 is the optimal backbone for the task.

Several possibilities for the design of the ensemble deep learning model were considered. Many DCNN architectures have been used for image classification, including dense convolutional network (DenseNet), squeeze-and-excitation network (SENet) and residual neural network (ResNet). Cross validation was used to select a final candidate architecture from among DenseNet-121, SENet-154 and ResNet-50-v2 (FIG. 12). ResNet-50-v2 was the best model for the task, possessing the highest average validation accuracy and a low variance. This model became the basis for individual DCNN modules, of which six were ensembled to form the final polarization classifier.

Previously known methods for determining the polarity status of mammalian embryos require using fluorescently tagged proteins that localize to the apical surface of a blastomere during embryo polarization. This process is essential for the first segregation of cell fates—a critical indicator of embryo health. The disclosed deep learning model represents a novel method to identify polarization from unstained embryo images, in a significantly more accurate and less labor-intensive way compared to manual analysis. In some embodiments, the method can be used for stainless tracking of polarization in live human embryos, therefore allowing IVF clinics to assess human embryo polarity status and its precise timing using computational instead of invasive methods, and to move away from empirical embryo grading to a system grounded in established developmental milestones of embryogenesis.

Provided herein is a deep learning model that can detect embryo polarization from stainless images and surpasses human performance. This system can save time, reduce labor and bypass invasive imaging techniques currently limiting the quantitative screening of embryo viability for implantation in the clinical setting.

Overview

Polarization of the mammalian embryo at the right developmental time is critical for its development to term and would be valuable in assessing the potential of human embryos. However, tracking polarization requires invasive fluorescence staining, impermissible in the in vitro fertilization clinic. Described herein is the use of artificial intelligence to detect polarization from unstained time-lapse movies of mouse embryos. A dataset was assembled of bright-field movie frames from 8-cell-stage embryos, side-by-side with corresponding images of fluorescent markers of cell polarization. An ensemble learning model was used to detect whether any bright-field frame showed an embryo before or after onset of polarization. The resulting model has an accuracy of 85% for detecting polarization, significantly outperforming human volunteers trained on the same data (61% accuracy). The disclosed self-learning model focuses upon the angle between cells as one known cue for compaction, which precedes polarization, but it outperforms the use of this cue alone. By compressing three-dimensional time-lapsed image data into two-dimensions, the data can be reduced to an easily manageable size for deep learning processing. Described herein is a method for detecting a key developmental feature of embryo development that advantageously avoids clinically impermissible fluorescence staining.

Mammalian embryo polarization is the process by which all individual cells of the embryo establish an apical domain on the cell—cell contact-free surface. In the mouse embryo, this process occurs at the late 8-cell stage, on the third day of development after fertilization, (FIG. 1A) and in humans on the fourth day at the 8-16 cell stage. The apical domain is composed of the PAR complex and ERM proteins (Ezrin, Radixin, Moesin), enclosed by an actomyosin ring. The cells which inherit this apical domain after division will become specified as trophectoderm (TE), which ultimately forms the placenta. In contrast, those cells that do not inherit the apical domain will form the inner cell mass (ICM), which will give rise to all fetal tissues and the yolk sac. Thus, embryo polarization provides the first critical bifurcation of cell fates in the mammalian embryo, and establishment of cell lineages in the blastocyst, which is crucial for implantation and a successful pregnancy. In agreement with this, preventing cell polarization of the mouse and human embryo prevents its successful development.

Given the importance of polarization, an ability to detect this developmental feature non-invasively would be beneficial, for example, for the screening of viable human embryos for implantation. However, all previously known methods for detecting polarization are invasive as they rely on modifying embryos to express fluorescently tagged proteins that mark the apical domains. Such fluorescent tagging of human embryos meant for implantation is impermissible, which prevents clinical embryologists from utilizing polarization to evaluate the quality of human embryos for transfer to mothers-to-be.

As described herein, tracking polarization without the use of fluorescence can be solved using deep learning, which is able to discern salient features that may be unintuitive for humans. Indeed, deep learning has been used successfully to automate detection of an embryo's morphological features and applied on single time-point images to assess implantation potential of human embryos. These deep learning approaches either provide a means of accurately counting cell numbers with developmental time; relate embryo morphology to subjective developmental criteria assessed by embryologists; or provide independent assessment of morphological features. For example, preimplantation morphology has been related with successful development of fetal heartbeat. However, the morphological features being assessed by the existing deep learning algorithms are generally not clear. In addition, these approaches do not rely upon known critical developmental milestones in the molecular cell biology of preimplantation development. Here, time lapse movies of fluorescent markers of polarization in the developing mouse embryo were used to train a deep learning system to recognize the polarization events in the corresponding bright field movie frames with a high degree of success. Described herein is the advantageous application of deep learning to recognize a specific molecular cell biological process in an embryo that is key for developmental success.

Results

Collection and Annotation of Embryo Images

Figure 1B:
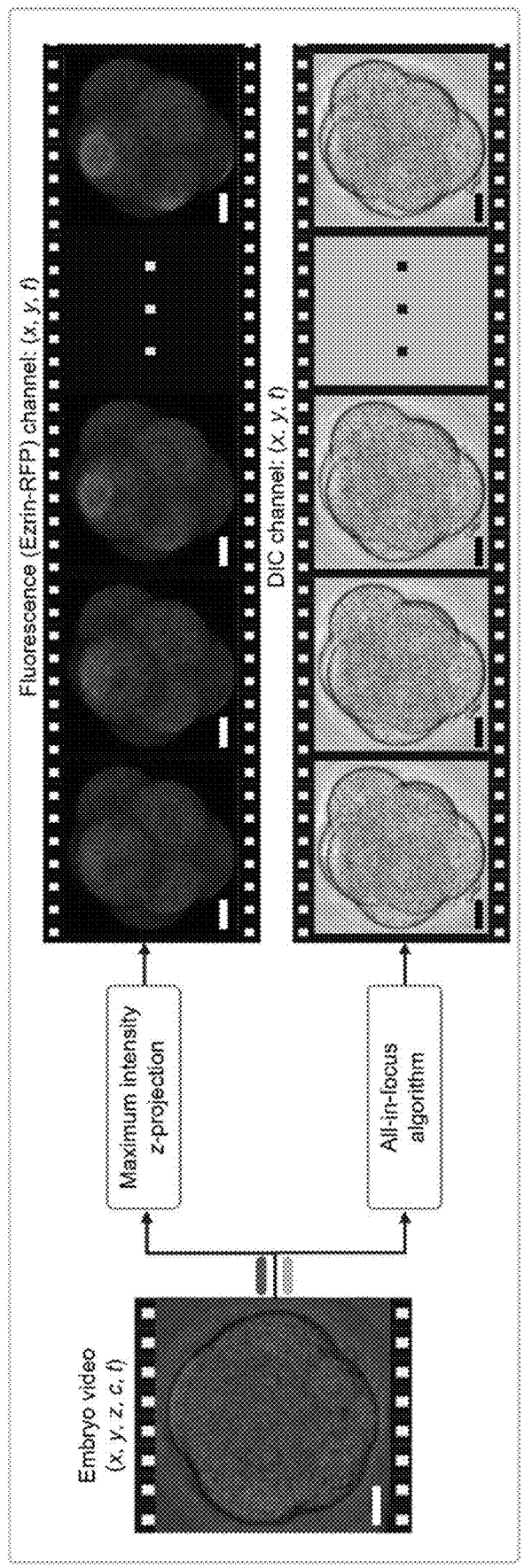
Figure 7:
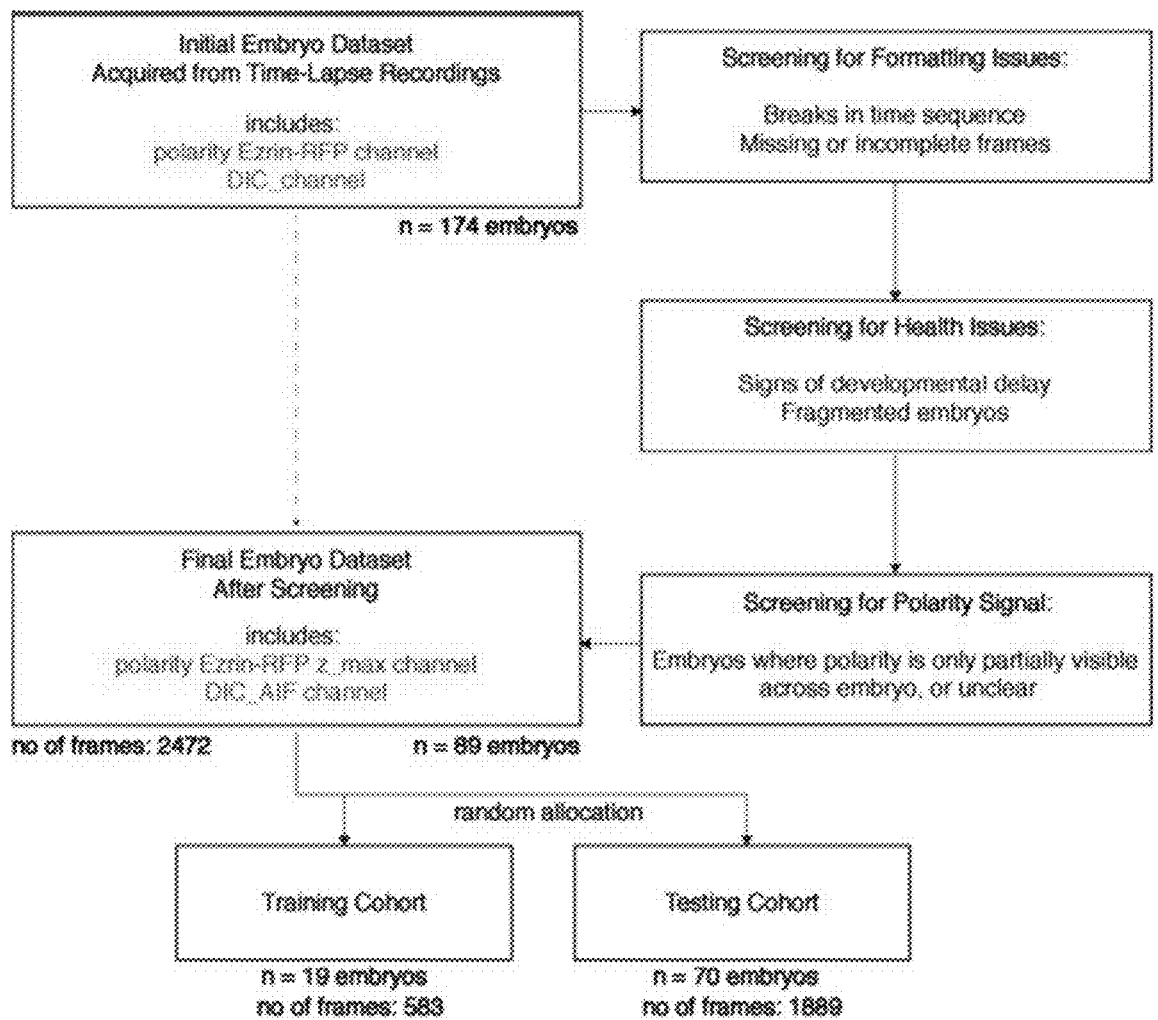
FIG. 7 depicts a flowchart indicating initial cleaning and pre-processing of data. 174 mouse embryo time-lapse recordings from dual-modal confocal microscope imaging, containing a DIC channel and a fluorescent polarity-indicating channel, were analyzed. After screening for image and embryo development quality, 89 embryos were left, with each channel compressed along the z axis using different algorithms and then randomly split into a training and testing cohort.

In order to develop a deep learning model for detecting the polarization status of live and unstained embryos, a large dataset of DIC embryo frames for which the polarization is unambiguously evident was required. Generating this dataset required each DIC image to have a corresponding channel that uses fluorescently tagged proteins to indicate polarization for each embryo clearly. The polarization of a single blastomere in the embryo can be determined by the localization of apical proteins, which are enclosed by an actomyosin ring. A large dataset composed of synchronized DIC and fluorescence channels of mouse embryos during polarization was built by collecting mouse embryo time-lapse recordings, each containing a fluorescence channel to indicate embryo polarization, and a DIC channel for model training and testing (FIG. 1B). For time-lapse recordings, embryos were injected at the 2-cell stage with synthetic mRNA for Ezrin tagged with red fluorescence protein (RFP), and cultured in vitro to the 16-cell stage. Ezrin was used as a marker for blastomere polarization, as Ezrin localizes to the apical surface during the formation of an apical polarity domain. Using the Ezrin-RFP fluorescent channel, the time point at which the first blastomere of the embryo polarized was determined for each time-lapse recording, indicated by formation of a clear apical polarity cap (FIG. 1C, FIG. 7). Using this annotation, each DIC frame was labelled as either before or after the onset of polarization (FIG. 1D). In total, a dataset containing 89 embryo time-lapse recordings of the 8-cell stage embryo during their polarization was produced.

Compression of 3D Embryo Image Sequences

A single slice image along the z axis has been used for model input due to the use of existing deep learning models designed for a two-dimensional (2D) image input. However, a single z-slice image does not capture 3D embryo structural information. Analysis of a 3D image stack with deep learning requires a re-designed model architecture that dramatically increases the complexity and time required for model development. Moreover, adapting existing pre-trained deep learning networks for 3D analysis through transfer learning would not be straightforward as these networks are predominantly designed for 2D image recognition tasks. To resolve this problem, a state-of-the-art all-in-focus (AIF) algorithm based on dual-tree complex wavelet transform (DTCWT) was utilized to compress the optically sectioned z stack of each DIC frame in the dataset. The result was a single 2D AIF DIC image capturing the majority of relevant but sparsely distributed 3D embryo information at each time point (FIG. 1B).

Figure 8B:
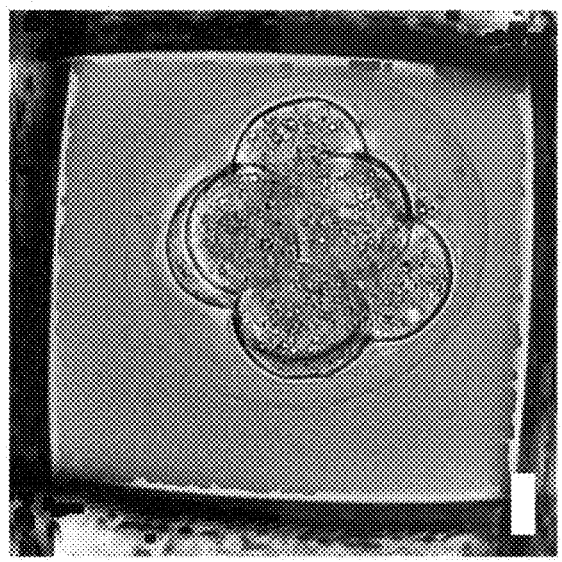
Figure 8A:
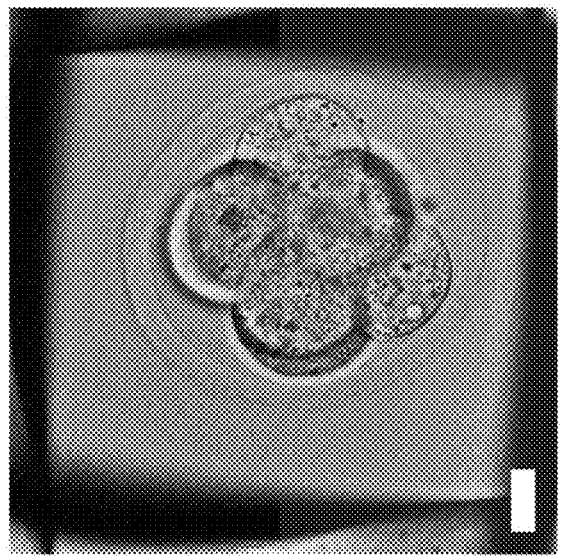

AIF images based on DTCWT revealed all blastomeres of a 3D embryo in a single 2D image (FIG. 8A-FIG. 8C). In contrast, the median z slice typically contained several blastomeres that were optically out of focus, resulting in lost information. AIF images also resembled standard images, allowing for straightforward transfer learning using open-source 2D image classification models pre-trained on ImageNet as initialization. To demonstrate the superiority of the disclosed DTCWT method over the variance method and the single z slice images, the deep learning training and testing was repeated on each of three cases (Table 1).

TABLE 1

TESTING ACCURACY FOR DIFFERENT INPUTS

| Testing Accuracy | z-mid | AIF-variance | AIF-DTCWT |
|---|---|---|---|
| Average | 80.1% (±1.0%) | 80.7% (±1.6%) | 82.6% (±1.3%) |

Model Architecture

Figure 2A:
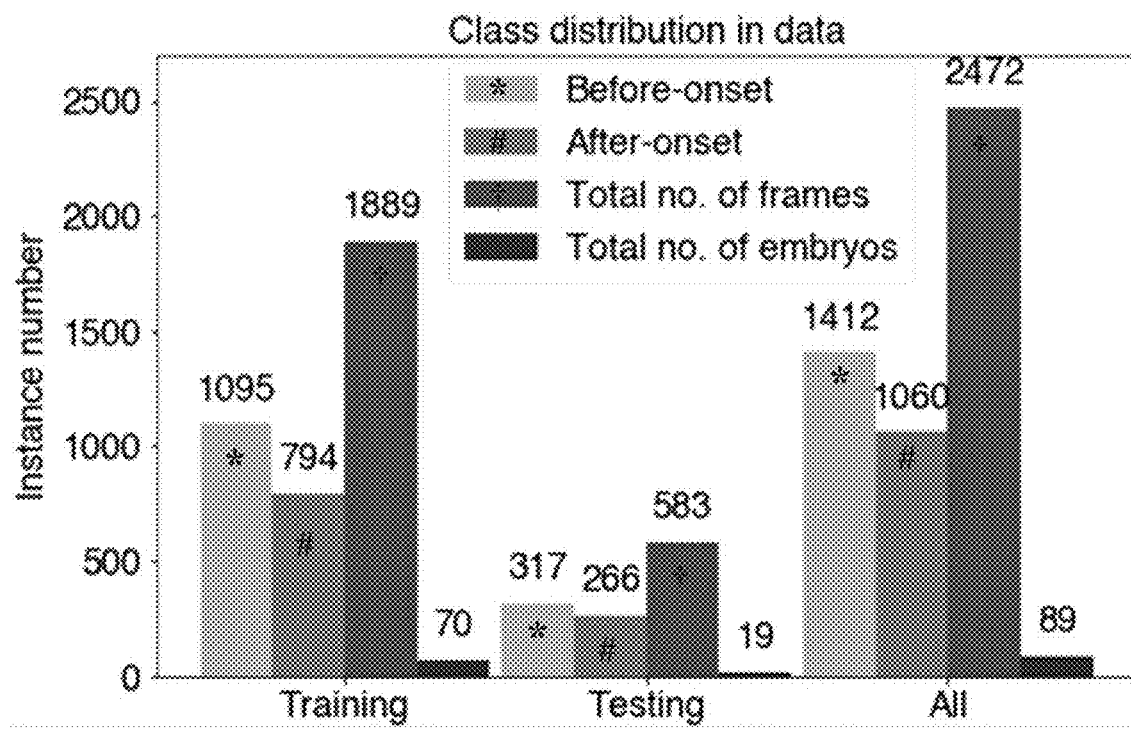
FIG. 2A-FIG. 2C show data related to an ensemble deep learning approach to predict embryo polarization from DIC images.
Figure 2B:
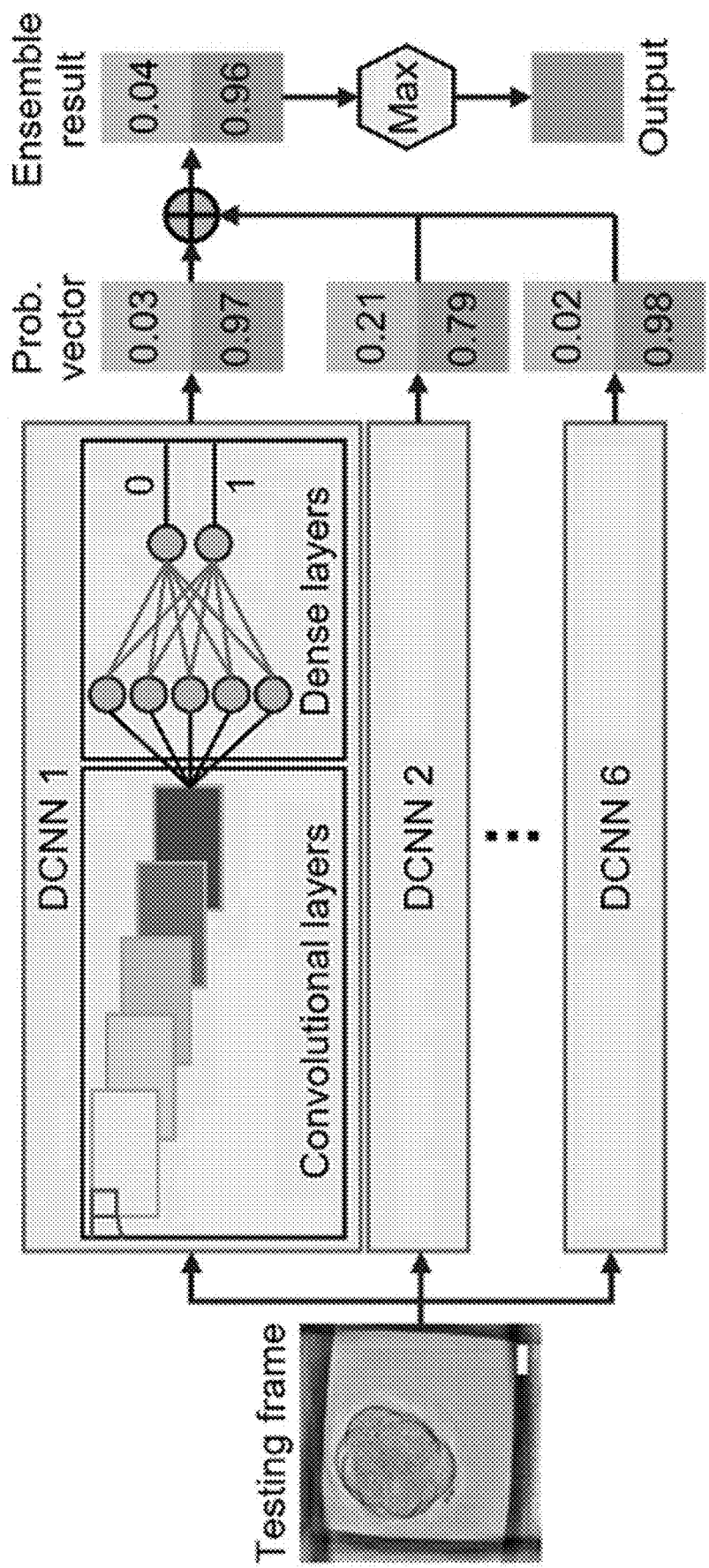

The dataset consisting of AIF DIC images paired with corresponding annotated polarization labels was randomly split into a training cohort of 70 embryos (1889 frames) and a testing cohort of 19 embryos (583 frames) (FIG. 2A). These were used as learning and evaluation datasets, respectively, for a single deep convolutional neural network (DCNN) binary classification model. For supervised learning of DCNN models, only information about whether a frame was before or after onset was retained and other time information was stripped away (FIG. 1D, FIG. 2B). Exemplary codes for creating the DCNN are shown below.

```
ResNetV2(
  (features): HybridSequential(
    (0): BatchNorm(axis=1, eps=1e-05, momentum=0.9, fix_gamma=True, use_global_stats=False, in_channels=3)
    (1): Conv2D(3 -> 64, kernel_size=(7, 7), stride=(2, 2), padding=(3, 3), bias=False)
    (2): BatchNorm(axis=1, eps=1e-05, momentum=0.9, fix_gamma=False, use_global_stats=False, in_channels=64)
    (3): Activation(relu)
    (4): MaxPool2D(size=(3, 3), stride=(2, 2), padding=(1, 1), ceil_mode=False, global_pool=False, pool_type=max, layout=NCHW)
    (5): HybridSequential(
      (0): BottleneckV2(
        (bn1): BatchNorm(axis=1, eps=1e-05, momentum=0.9, fix_gamma=False, use_global_stats=False, in_channels=64)
        (conv1): Conv2D(64 -> 64, kernel_size=(1, 1), stride=(1, 1), bias=False)
        (bn2): BatchNorm(axis=1, eps=1e-05, momentum=0.9, fix_gamma=False, use_global_stats=False, in_channels=64)
        (conv2): Conv2D(64 -> 64, kernel_size=(3, 3), stride=(1, 1), padding=(1, 1), bias=False)
        (bn3): BatchNorm(axis=1, eps=1e-05, momentum=0.9, fix_gamma=False, use_global_stats=False, in_channels=64)
        (conv3): Conv2D(64 -> 256, kernel_size=(1, 1), stride=(1, 1), bias=False)
        (downsample): Conv2D(64 -> 256, kernel_size=(1, 1), stride=(1, 1), bias=False)
      )
      (1): BottleneckV2(
        (bn1): BatchNorm(axis=1, eps=1e-05, momentum=0.9, fix_gamma=False, use_global_stats=False, in_channels=256)
        (conv1): Conv2D(256 -> 64, kernel_size=(1, 1), stride=(1, 1), bias=False)
        (bn2): BatchNorm(axis=1, eps=1e-05, momentum=0.9, fix_gamma=False, use_global_stats=False, in_channels=64)
        (conv2): Conv2D(64 -> 64, kernel_size=(3, 3), stride=(1, 1), padding=(1, 1), bias=False)
        (bn3): BatchNorm(axis=1, eps=1e-05, momentum=0.9, fix_gamma=False, use_global_stats=False, in_channels=64)
        (conv3): Conv2D(64 -> 256, kernel_size=(1, 1), stride=(1, 1), bias=False)
      )
      (2): BottleneckV2(
        (bn1): BatchNorm(axis=1, eps=1e-05, momentum=0.9, fix_gamma=False, use_global_stats=False, in_channels=256)
        (conv1): Conv2D(256 -> 64, kernel_size=(1, 1), stride=(1, 1), bias=False)
        (bn2): BatchNorm(axis=1, eps=1e-05, momentum=0.9, fix_gamma=False, use_global_stats=False, in_channels=64)
        (conv2): Conv2D(64 -> 64, kernel_size=(3, 3), stride=(1, 1), padding=(1, 1), bias=False)
        (bn3): BatchNorm(axis=1, eps=1e-05, momentum=0.9, fix_gamma=False, use_global_stats=False, in_channels=64)
        (conv3): Conv2D(64 -> 256, kernel_size=(1, 1), stride=(1, 1), bias=False)
      )
    )
    (6): HybridSequential(
      (0): BottleneckV2(
        (bn1): BatchNorm(axis=1, eps=1e-05, momentum=0.9, fix_gamma=False, use_global_stats=False, in_channels=256)
        (conv1): Conv2D(256 -> 128, kernel_size=(1, 1), stride=(1, 1), bias=False)
        (bn2): BatchNorm(axis=1, eps=1e-05, momentum=0.9, fix_gamma=False, use_global_stats=False, in_channels=128)
        (conv2): Conv2D(128 -> 128, kernel_size=(3, 3), stride=(2, 2), padding=(1, 1), bias=False)
        (bn3): BatchNorm(axis=1, eps=1e-05, momentum=0.9, fix_gamma=False, use_global_stats=False, in_channels=128)
        (conv3): Conv2D(128 -> 512, kernel_size=(1, 1), stride=(1, 1), bias=False)
```

```
            (downsample): Conv2D(256 -> 512, kernel_size=(1, 1), stride=(2, 2), bias=False)
          )
          (1): BottleneckV2(
            (bn1): BatchNorm(axis=1, eps=1e-05, momentum=0.9, fix_gamma=False,
   use_global_stats=False, in_channels=512)
            (conv1): Conv2D(512 -> 128, kernel_size=(1, 1), stride=(1, 1), bias=False)
            (bn2): BatchNorm(axis=1, eps=1e-05, momentum=0.9, fix_gamma=False,
   use_global_stats=False, in_channels=128)
            (conv2): Conv2D(128 -> 128, kernel_size=(3, 3), stride=(1, 1), padding=(1, 1), bias=False)
            (bn3): BatchNorm(axis=1, eps=1e-05, momentum=0.9, fix_gamma=False,
   use_global_stats=False, in_channels=128)
            (conv3): Conv2D(128 -> 512, kernel_size=(1, 1), stride=(1, 1), bias=False)
          )
          (2): BottleneckV2(
            (bn1): BatchNorm(axis=1, eps=1e-05, momentum=0.9, fix_gamma=False,
   use_global_stats=False, in_channels=512)
            (conv1): Conv2D(512 -> 128, kernel_size=(1, 1), stride=(1, 1), bias=False)
            (bn2): BatchNorm(axis=1, eps=1e-05, momentum=0.9, fix_gamma=False,
   use_global_stats=False, in_channels=128)
            (conv2): Conv2D(128 -> 128, kernel_size=(3, 3), stride=(1, 1), padding=(1, 1), bias=False)
            (bn3): BatchNorm(axis=1, eps=1e-05, momentum=0.9, fix_gamma=False,
   use_global_stats=False, in_channels=128)
            (conv3): Conv2D(128 -> 512, kernel_size=(1, 1), stride=(1, 1), bias=False)
          )
          (3): BottleneckV2(
            (bn1): BatchNorm(axis=1, eps=1e-05, momentum=0.9, fix_gamma=False,
   use_global_stats=False, in_channels=512)
            (conv1): Conv2D(512 -> 128, kernel_size=(1, 1), stride=(1, 1), bias=False)
            (bn2): BatchNorm(axis=1, eps=1e-05, momentum=0.9, fix_gamma=False,
   use_global_stats=False, in_channels=128)
            (conv2): Conv2D(128 -> 128, kernel_size=(3, 3), stride=(1, 1), padding=(1, 1), bias=False)
            (bn3): BatchNorm(axis=1, eps=1e-05, momentum=0.9, fix_gamma=False,
   use_global_stats=False, in_channels=128)
            (conv3): Conv2D(128 -> 512, kernel_size=(1, 1), stride=(1, 1), bias=False)
          )
        )
        (7): HybridSequential(
          (0): BottleneckV2(
            (bn1): BatchNorm(axis=1, eps=1e-05, momentum=0.9, fix_gamma=False,
   use_global_stats=False, in_channels=512)
            (conv1): Conv2D(512 -> 256, kernel_size=(1, 1), stride=(1, 1), bias=False)
            (bn2): BatchNorm(axis=1, eps=1e-05, momentum=0.9, fix_gamma=False,
   use_global_stats=False, in_channels=256)
            (conv2): Conv2D(256 -> 256, kernel_size=(3, 3), stride=(2, 2), padding=(1, 1), bias=False)
            (bn3): BatchNorm(axis=1, eps=1e-05, momentum=0.9, fix_gamma=False,
   use_global_stats=False, in_channels=256)
            (conv3): Conv2D(256 -> 1024, kernel_size=(1, 1), stride=(1, 1), bias=False)
            (downsample): Conv2D(512 -> 1024, kernel_size=(1, 1), stride=(2, 2), bias=False)
          )
          (1): BottleneckV2(
            (bn1): BatchNorm(axis=1, eps=1e-05, momentum=0.9, fix_gamma=False,
   use_global_stats=False, in_channels=1024)
            (conv1): Conv2D(1024 -> 256, kernel_size=(1, 1), stride=(1, 1), bias=False)
            (bn2): BatchNorm(axis=1, eps=1e-05, momentum=0.9, fix_gamma=False,
   use_global_stats=False, in_channels=256)
            (conv2): Conv2D(256 -> 256, kernel_size=(3, 3), stride=(1, 1), padding=(1, 1), bias=False)
            (bn3): BatchNorm(axis=1, eps=1e-05, momentum=0.9, fix_gamma=False,
   use_global_stats=False, in_channels=256)
            (conv3): Conv2D(256 -> 1024, kernel_size=(1, 1), stride=(1, 1), bias=False)
          )
          (2): BottleneckV2(
            (bn1): BatchNorm(axis=1, eps=1e-05, momentum=0.9, fix_gamma=False,
   use_global_stats=False, in_channels=1024)
            (conv1): Conv2D(1024 -> 256, kernel_size=(1, 1), stride=(1, 1), bias=False)
            (bn2): BatchNorm(axis=1, eps=1e-05, momentum=0.9, fix_gamma=False,
   use_global_stats=False, in_channels=256)
            (conv2): Conv2D(256 -> 256, kernel_size=(3, 3), stride=(1, 1), padding=(1, 1), bias=False)
            (bn3): BatchNorm(axis=1, eps=1e-05, momentum=0.9, fix_gamma=False,
   use_global_stats=False, in_channels=256)
            (conv3): Conv2D(256 -> 1024, kernel_size=(1, 1), stride=(1, 1), bias=False)
          )
          (3): BottleneckV2(
            (bn1): BatchNorm(axis=1, eps=1e-05, momentum=0.9, fix_gamma=False,
   use_global_stats=False, in_channels=1024)
            (conv1): Conv2D(1024 -> 256, kernel_size=(1, 1), stride=(1, 1), bias=False)
            (bn2): BatchNorm(axis=1, eps=1e-05, momentum=0.9, fix_gamma=False,
   use_global_stats=False, in_channels=256)
            (conv2): Conv2D(256 -> 256, kernel_size=(3, 3), stride=(1, 1), padding=(1, 1), bias=False)
            (bn3): BatchNorm(axis=1, eps=1e-05, momentum=0.9, fix_gamma=False,
```

```
use_global_stats=False, in_channels=256)
      (conv3): Conv2D(256 -> 1024, kernel_size=(1, 1), stride=(1, 1), bias=False)
    )
    (4): BottleneckV2(
      (bn1): BatchNorm(axis=1, eps=1e-05, momentum=0.9, fix_gamma=False,
use_global_stats=False, in_channels=1024)
      (conv_): Conv2D(1024 -> 256, kernel_size=(1, 1), stride=(1, 1), bias=False)
      (bn2): BatchNorm(axis=1, eps=1e-05, momentum=0.9, fix_gamma=False,
use_global_stats=False, in_channels=256)
      (conv2): Conv2D(256 -> 256, kernel_size=(3, 3), stride=(1, 1), padding=(1, 1), bias=False)
      (bn3): BatchNorm(axis=1, eps=1e-05, momentum=0.9, fix_gamma=False,
use_global_stats=False, in_channels=256)
      (conv3): Conv2D(256 -> 1024, kernel_size=(1, 1), stride=(1, 1), bias=False)
    )
    (5): BottleneckV2(
      (bn1): BatchNorm(axis=1, eps=1e-05, momentum=0.9, fix_gamma=False,
use_global_stats=False, in_channels=1024)
      (conv1): Conv2D(1024 -> 256, kernel_size=(1, 1), stride=(1, 1), bias=False)
      (bn2): BatchNorm(axis=1, eps=1e-05, momentum=0.9, fix_gamma=False,
use_global_stats=False, in_channels=256)
      (conv2): Conv2D(256 -> 256, kernel_size=(3, 3), stride=(1, 1), padding=(1, 1), bias=False)
      (bn3): BatchNorm(axis=1, eps=1e-05, momentum=0.9, fix_gamma=False,
use_global_stats=False, in_channels=256)
      (conv3): Conv2D(256 -> 1024, kernel_size=(1, 1), stride=(1, 1), bias=False)
    )
  )
  (8): HybridSequential(
    (0): BottleneckV2(
      (bn1): BatchNorm(axis=1, eps=1e-05, momentum=0.9, fix_gamma=False,
use_global_stats=False, in_channels=1024)
      (conv1): Conv2D(1024 -> 512, kernel_size=(1, 1), stride=(1, 1), bias=False)
      (bn2): BatchNorm(axis=1, eps=1e-05, momentum=0.9, fix_gamma=False,
use_global_stats=False, in_channels=512)
      (conv2): Conv2D(512 -> 512, kernel_size=(3, 3), stride=(2, 2), padding=(1, 1), bias=False)
      (bn3): BatchNorm(axis=1, eps=1e-05, momentum=0.9, fix_gamma=False,
use_global_stats=False, in_channels=512)
      (conv3): Conv2D(512 -> 2048, kernel_size=(1, 1), stride=(1, 1), bias=False)
      (downsample): Conv2D(1024 -> 2048, kernel_size=(1, 1), stride=(2, 2), bias=False)
    )
    (1): BottleneckV2(
      (bn1): BatchNorm(axis=1, eps=1e-05, momentum=0.9, fix_gamma=False,
use_global_stats=False, in_channels=2048)
      (conv1): Conv2D(2048 -> 512, kernel_size=(1, 1), stride=(1, 1), bias=False)
      (bn2): BatchNorm(axis=1, eps=1e-05, momentum=0.9, fix_gamma=False,
use_global_stats=False, in_channels=512)
      (conv2): Conv2D(512 -> 512, kernel_size=(3, 3), stride=(1, 1), padding=(1, 1), bias=False)
      (bn3): BatchNorm(axis=1, eps=1e-05, momentum=0.9, fix_gamma=False,
use_global_stats=False, in_channels=512)
      (conv3): Conv2D(512 -> 2048, kernel_size=(1, 1), stride=(1, 1), bias=False)
    )
    (2): BottleneckV2(
      (bn1): BatchNorm(axis=1, eps=1e-05, momentum=0.9, fix_gamma=False,
use_global_stats=False, in_channels=2048)
      (conv1): Conv2D(2048 -> 512, kernel_size=(1, 1), stride=(1, 1), bias=False)
      (bn2): BatchNorm(axis=1, eps=1e-05, momentum=0.9, fix_gamma=False,
use_global_stats=False, in_channels=512)
      (conv2): Conv2D(512 -> 512, kernel_size=(3, 3), stride=(1, 1), padding=(1, 1), bias=False)
      (bn3): BatchNorm(axis=1, eps=1e-05, momentum=0.9, fix_gamma=False,
use_global_stats=False, in_channels=512)
      (conv3): Conv2D(512 -> 2048, kernel_size=(1, 1), stride=(1, 1), bias=False)
    )
  )
  (9): BatchNorm(axis=1, eps=1e-05, momentum=0.9, fix_gamma=False, use_global_stats=False,
in_channels=2048)
  (10): Activation(relu)
  (11): GlobalAvgPool2D(size=(1, 1), stride=(1, 1), padding=(0, 0), ceil_mode=True,
global_pool=True, pool_type=avg, layout=NCHW)
  (12): Flatten
  )
  (output): Dense(2048 -> 2, linear)
)
```

On individual testing frames, each DCNN model outputs whether or not polarization was detected as a vector containing two probabilities—one for each class (before or after onset, FIG. 2B). To mitigate over-fitting, six DCNN models trained using different initializations and different optimizers but trained over the same number of epochs were ensembled. The final polarization status prediction for a single input image is the class (before or after onset) having the highest average probability across all six contributing models. Overall, the model accuracy increased from an average of 82.6% for a single DCNN to 85.2% with ensemble learning.

Ensemble Deep Learning Model Outperforms Human Volunteers

Six volunteers were recruited following the criteria outlined in the Methods section below, to compare polarization detection accuracy against the model. Human volunteers were recruited from a STEM background, who would be motivated to benefit from the technology in a clinical setting and who might compare favorably with the machine learning system. The volunteers were self-trained using the same annotated training dataset used by the model. They were then given the same AIF DIC testing dataset and asked to determine the polarization status for each test image (before or after onset).

Figure 3A:
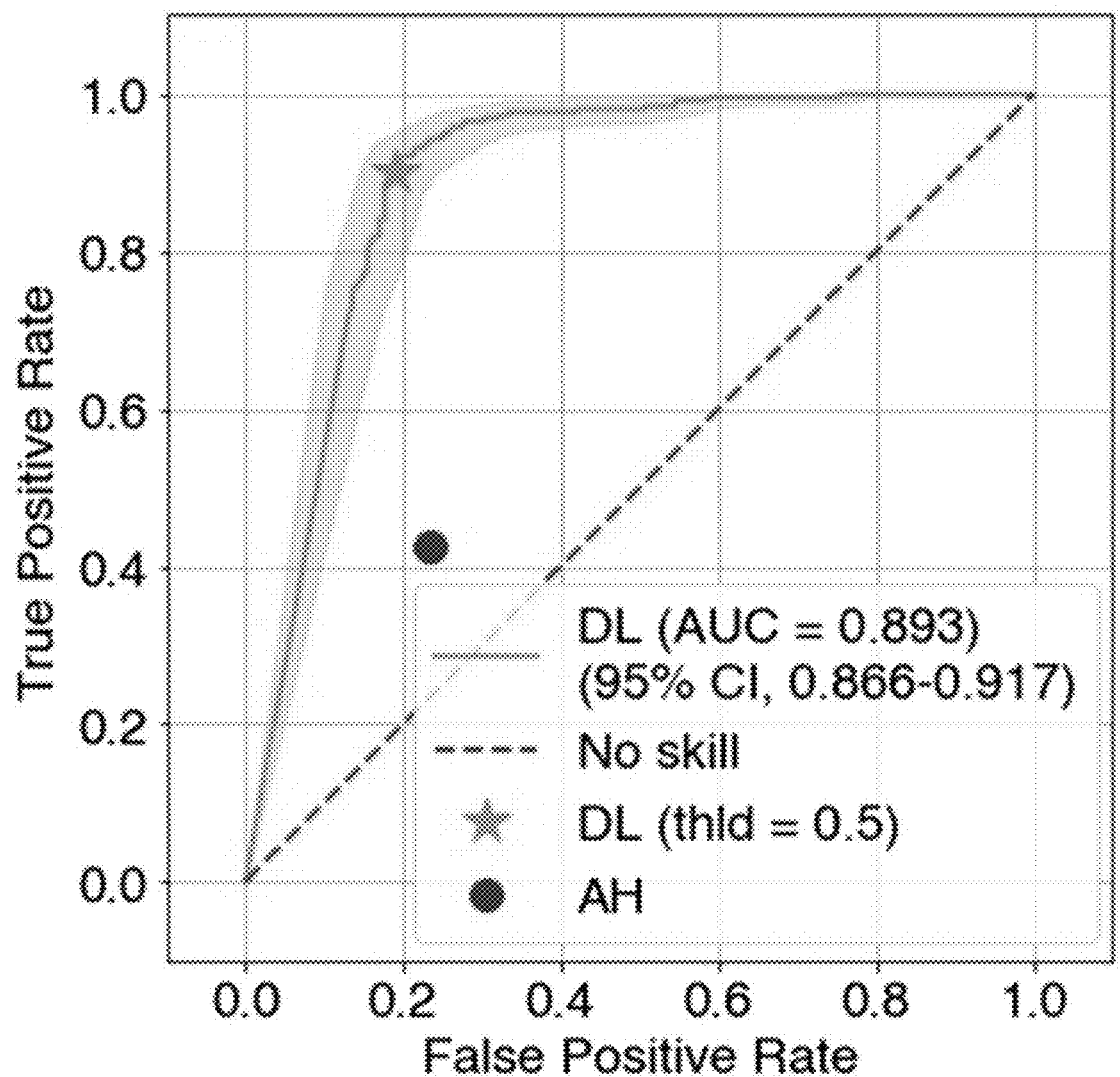
FIG. 3A-FIG. 3C show results of image classification task by the ensemble deep learning model and the average human.
Figure 3B:
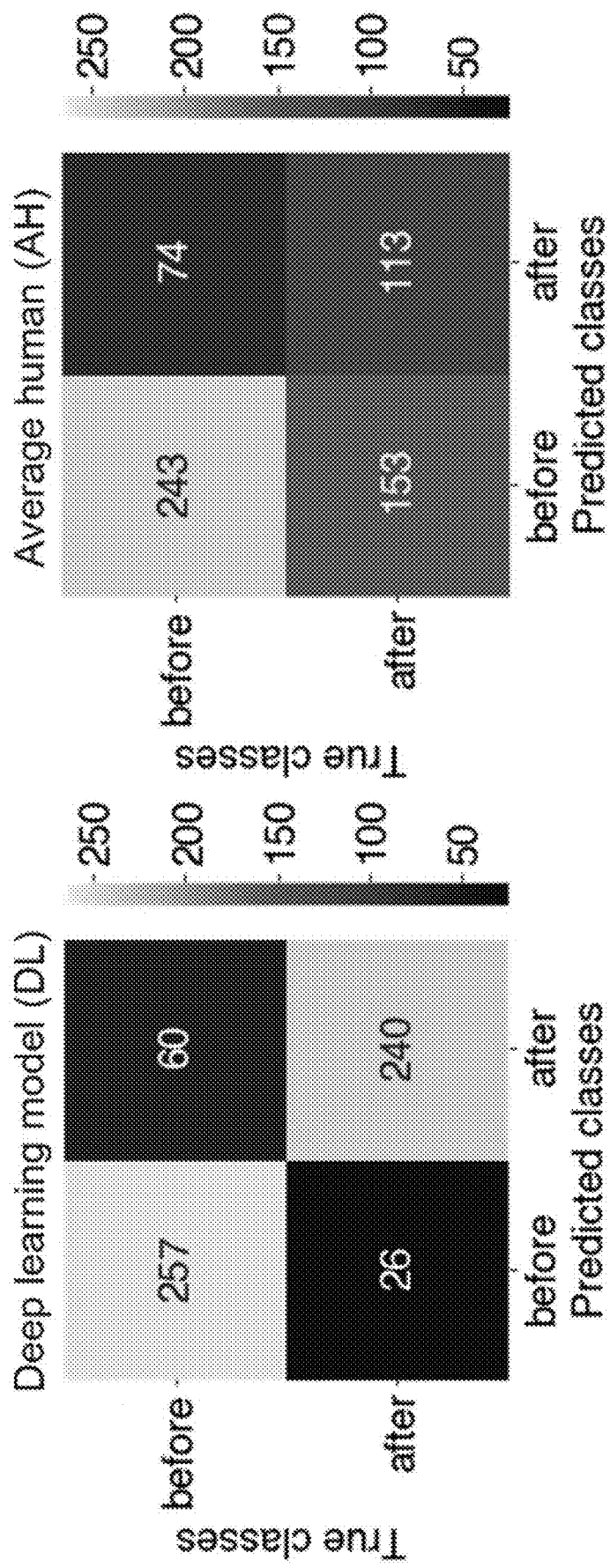
Figure 9A:
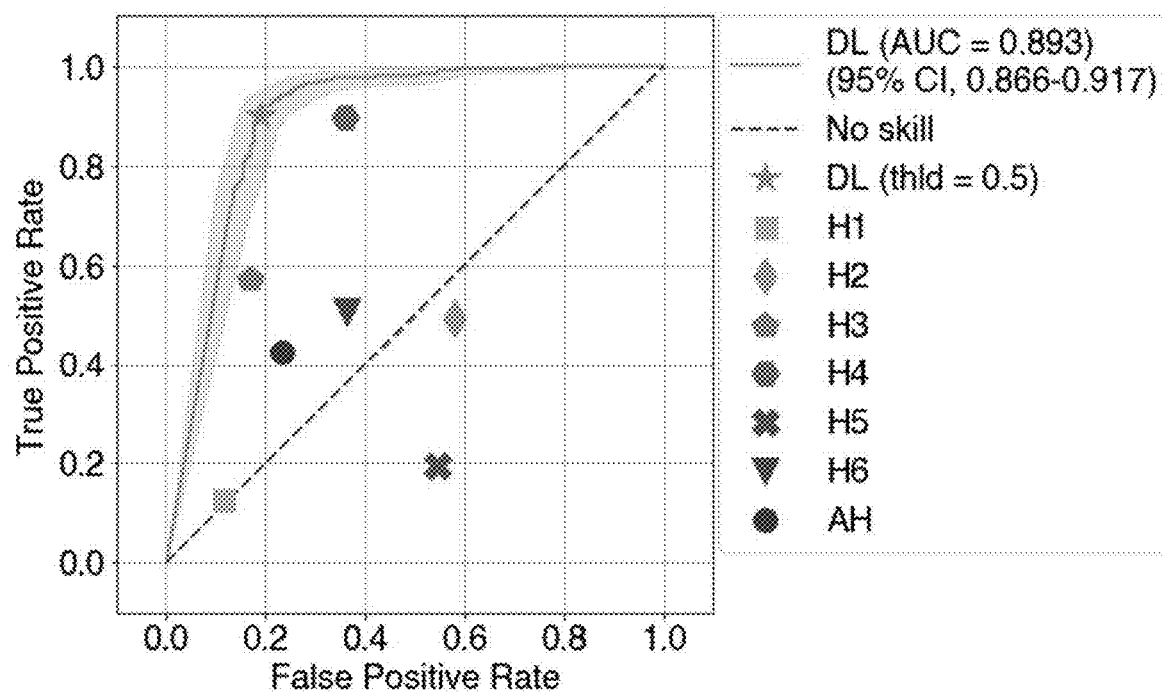
FIG. 9A-FIG. 9B show results of image classification task by the ensemble deep learning model, six human volunteers, and their average.
Figure 9B:
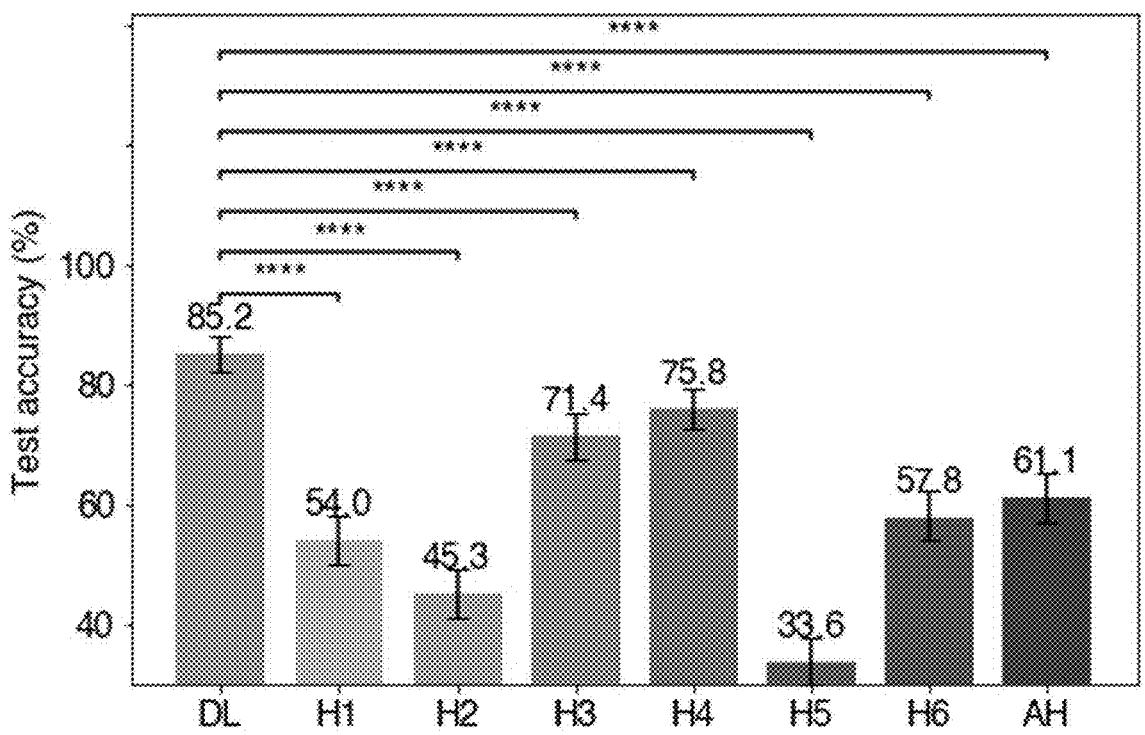

The model established herein here yielded a classification sensitivity of 90.2% (95% confidence interval (CI): 86.1%-93.8%) and specificity of 81.1% (95% CI: 76.2%-85.4%) for single image inputs, with areas under the receiver operating characteristic curve of 0.893 (95% CI: 0.866-0.917) (FIG. 3A and Table 2). Deep learning achieved both a higher true positive rate and lower false positive rate than the average human volunteer. FIG. 3B shows the confusion matrix for predictions. The model correctly classified 497 out of 583 frames, resulting in a classification accuracy of 85.2% (95% CI: 82.2%-88.2%). In comparison, the average human accuracy on the same testing frames was 61.1% (95% CI: 57.1%-65.0%) (FIG. 3B). The model outperformed humans on average (FIG. 3C, two-tailed z-test, p<0.0001) as well as individually (FIG. 9A-FIG. 9B).

bound by any particular theory, misclassifications tended to result from mismatched polarity between individual blastomeres and the overall embryo, producing weak prediction probabilities for both classes near 50% while the model was forced to choose one class (FIG. 4C). In some embodiments, predictions in this probability range are more reasonably interpreted as "not sure" or "cannot tell", but these were not options for the model.

Model Outperforms Compaction Alone for Discrimination

Figure 2C:
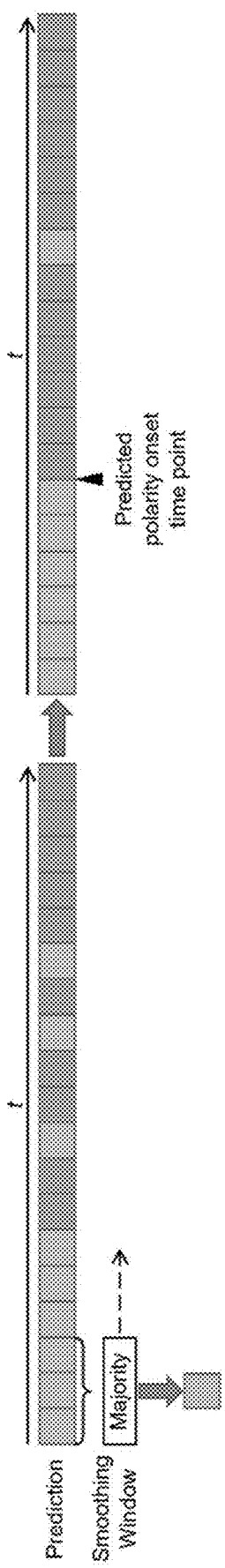
Figure 5A:
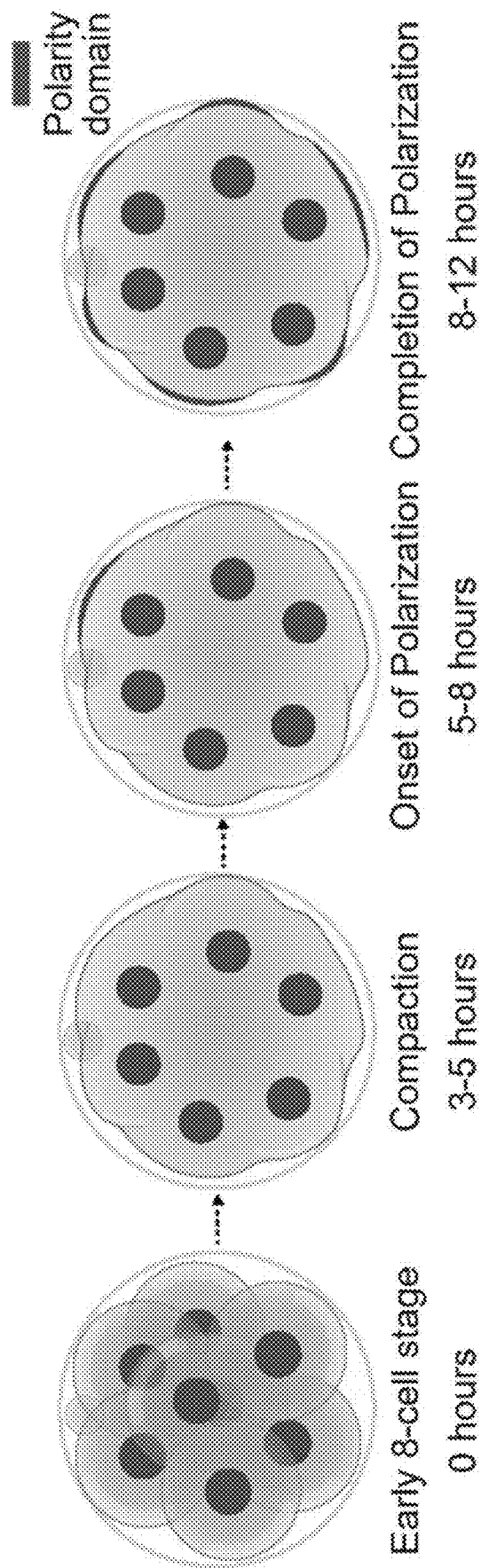
FIG. 5A-FIG. 5C depict comparative analysis of the ensemble deep learning model prediction and the compaction-based prediction for polarization.
Figure 10:
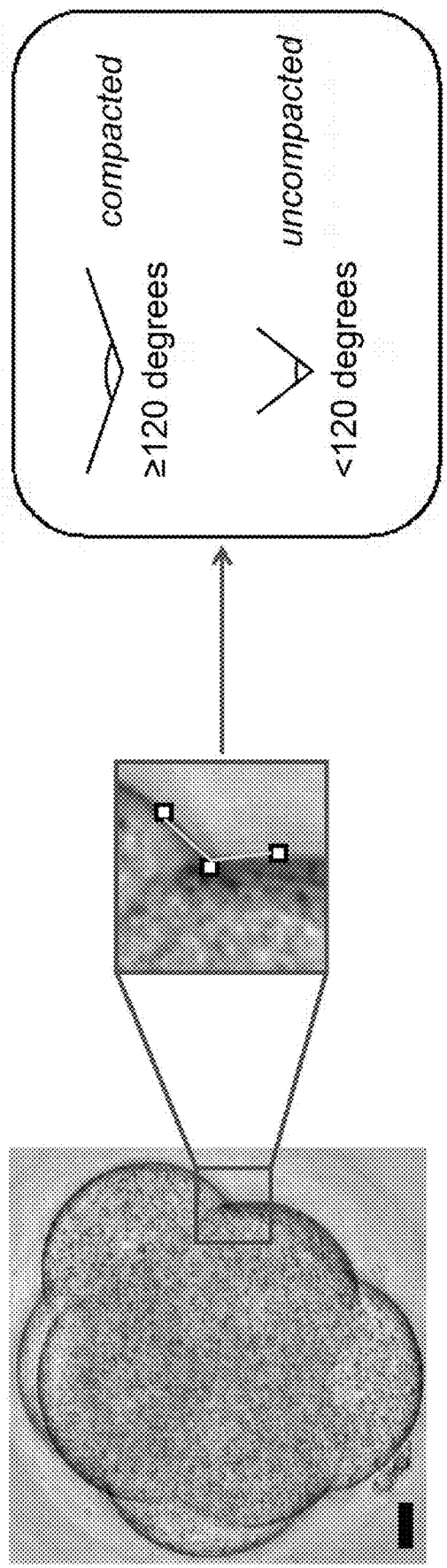
FIG. 10 shows criteria for annotating compaction. Compaction was measured using the inter-blastomere angle. The first time point at which the minimal inter-blastomere angle was ≥120 degrees was defined as the compaction point. All frames including and succeeding this point were defined as compacted, whilst all frames prior to this point were defined as uncompacted. Scale bar=10 µm.

The use of inter-blastomere angle as a cue by the model to determine embryo polarization (FIG. 4A) was not surprising. Inter-blastomere angle is an indicator of embryo compaction, a morphological change during development that typically precedes polarization (FIG. 5A). To assess the extent to which the deep learning model uses just compaction for its polarization prediction, each embryo's AIF DIC frame sequence was annotated with the time point of compaction. The time of compaction was defined as the first frame at which the smallest inter-blastomere angle of the embryo is over 120 degrees, in agreement with previous research (FIG. 10). To find the model's predicted time point of polarization, embryo frames were re-aligned in their original time sequence and temporal smoothing was applied on the predicted label sequence for each testing embryo based on majority voting to output a single time point for polarization (FIG. 2C).

The Pearson correlation coefficient between compaction time point and the model's predicted time point of polar-

TABLE 2

THE PERFORMANCE OF THE ENSEMBLE DEEP LEARNING (DL) MODEL, SIX HUMAN VOLUNTEERS (H1-H6) AND THEIR AVERAGE (AH) ON THE TESTING DATASET

| Metrics | DL | H1 | H2 | H3 | H4 | H5 | H6 | AH |
|---|---|---|---|---|---|---|---|---|
| Sensitivity (%) | 90.2 (86.1, 93.8) | 12.8 (8.8, 16.8) | 49.2 (43.3, 55.0) | 57.1 (51.0, 63.1) | 89.8 (85.9, 93.4) | 19.5 (14.6, 24.3) | 50.8 (44.5, 56.7) | 42.5 (36.4, 48.5) |
| Specificity (%) | 81.1 (76.2, 85.4) | 88.6 (85.0, 92.2) | 42.0 (36.8, 47.3) | 83.3 (79.0, 87.2) | 64.0 (59.0, 69.3) | 45.4 (40.3, 50.8) | 63.7 (58.4, 69.2) | 76.7 (71.9, 81.1) |
| PPV (%) | 80.0 (75.1, 84.5) | 48.6 (36.2, 60.9) | 41.6 (35.7, 46.9) | 74.1 (68.1, 79.9) | 23.1 (17.7, 28.9) | 23.1 (17.7, 28.9) | 54.0 (48.2, 60.1) | 60.4 (53.6, 67.2) |
| NPV (%) | 90.8 (87.2, 94.2) | 54.8 (50.4, 58.9) | 49.6 (43.7, 55.6) | 69.8 (65.4, 74.5) | 40.2 (35.1, 45.4) | 40.2 (35.1, 45.4) | 60.7 (55.4, 66.1) | 61.4 (56.3, 66.2) |
| Accuracy (%) | 85.2 (82.2, 88.2) | 54.0 (49.9, 58.0) | 45.3 (41.0, 49.2) | 71.4 (67.4, 75.0) | 33.6 (30.0, 37.6) | 33.6 (30.0, 37.6) | 57.8 (54.0, 62.1) | 61.1 (57.1, 65.0) |

95% confidence intervals are included in parentheses. They are estimated by bootstrapping the testing dataset with 1000 replicates. The highest value of each metric achieved by all predictors is marked in bold. PPV, positive predictive value; NPV negative predictive value. H1-H3 are females and H4-H6 are males.

Understanding Image Features of Interest to the Model

Figure 5B:
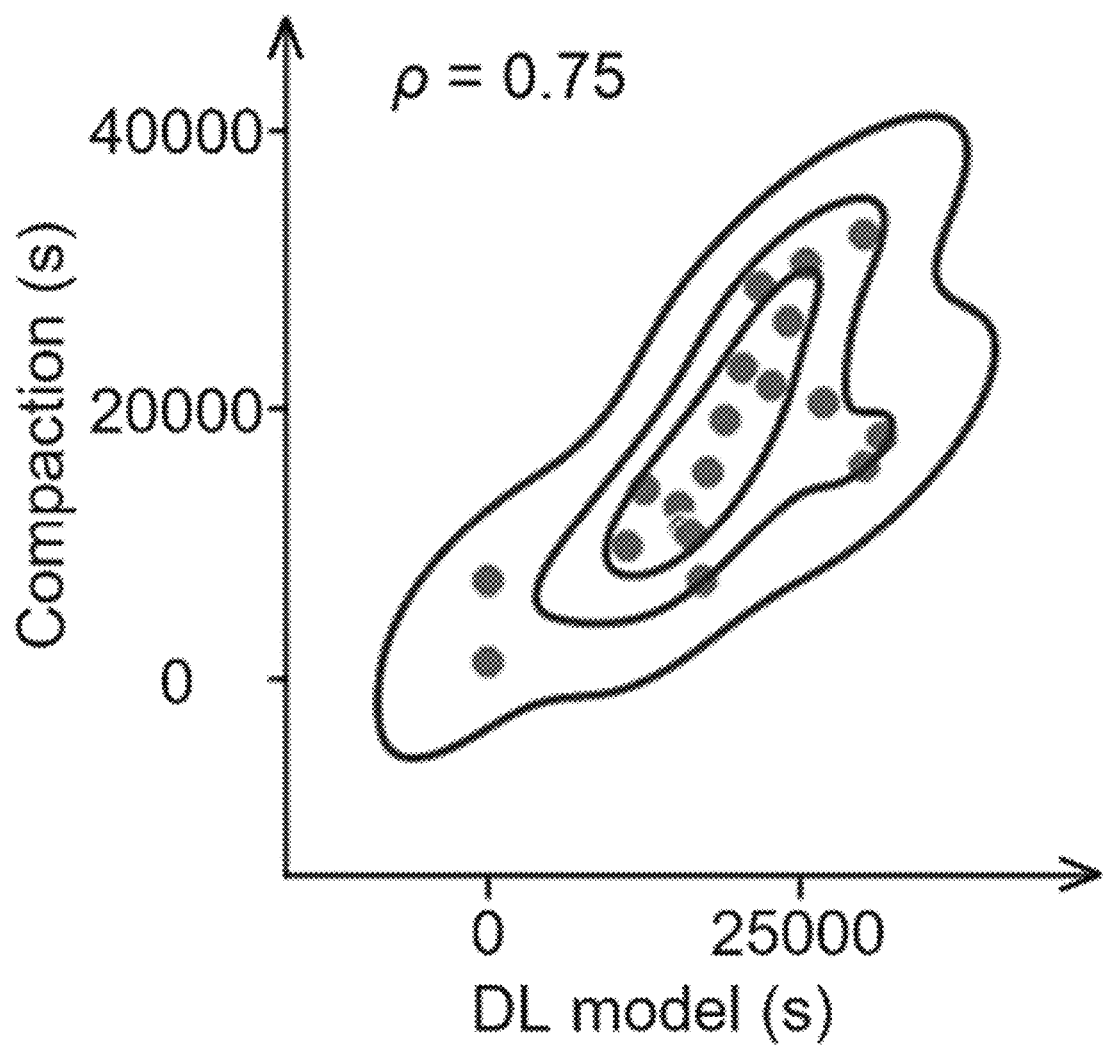
Figure 5C:
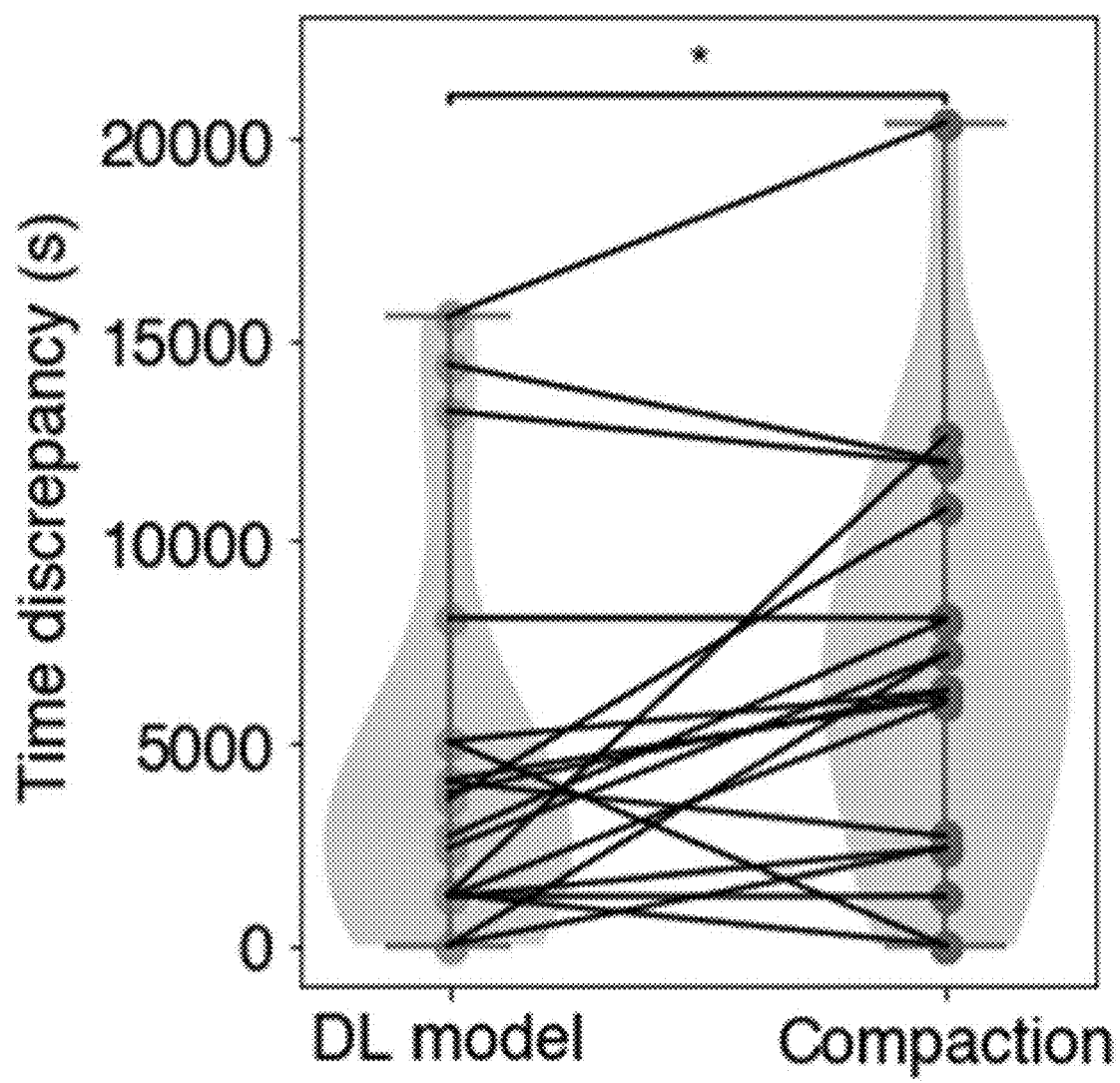

The model was interrogated for embryo regions that most strongly affected the model's predictions, using class activation maps (CAM). CAM relies on a heat map representation to highlight pixels that trigger a model to associate an image with a particular class (before or after onset). In FIG. 4A-FIG. 4D, the CAM heat map is overlaid with the input testing AIF DIC image. In each heat map, darker pixels outlined by a dotted circle indicate regions of the embryo containing features that correlate positively with the predicted polarization class, while unmarked darker pixels indicate regions containing features that correlate negatively (e.g., correlate positively with the opposing class). To understand which regions of an embryo influence the model most, each possible prediction outcome was evaluated: true negative (TN) (FIG. 4A), false positive (FP) (FIG. 4B), false negative (FN) (FIG. 4C), and true positive (TP) (FIG. 4D). When, in some embodiments, the model classified image frames as after polarization, it appeared to use inter-blastomere angle as a cue (See, Discussion below). Without being ization onset was 0.75 across the 19 embryos used for testing (FIG. 5B), indicating that whilst compaction is indeed a utilized cue, in some embodiments, it is not the only factor used by the model. The model was evaluated to determine whether it was superior to using compaction alone as a proxy for polarization, by calculating the time discrepancies between annotated polarization time indexes (ground truth) and predicted time indexes by either the model or the compaction proxy. The model had significantly smaller time point prediction errors compared to the latter (two-tailed Wilcoxon matched-pairs signed-rank test, p<0.05, FIG. 5C). That is, the model was superior to the use of compaction alone for predicting polarization and, without being bound by any particular theory, has managed to learn additional cues.

Distinguishing Exact Polarization Onset Time

Figure 6:
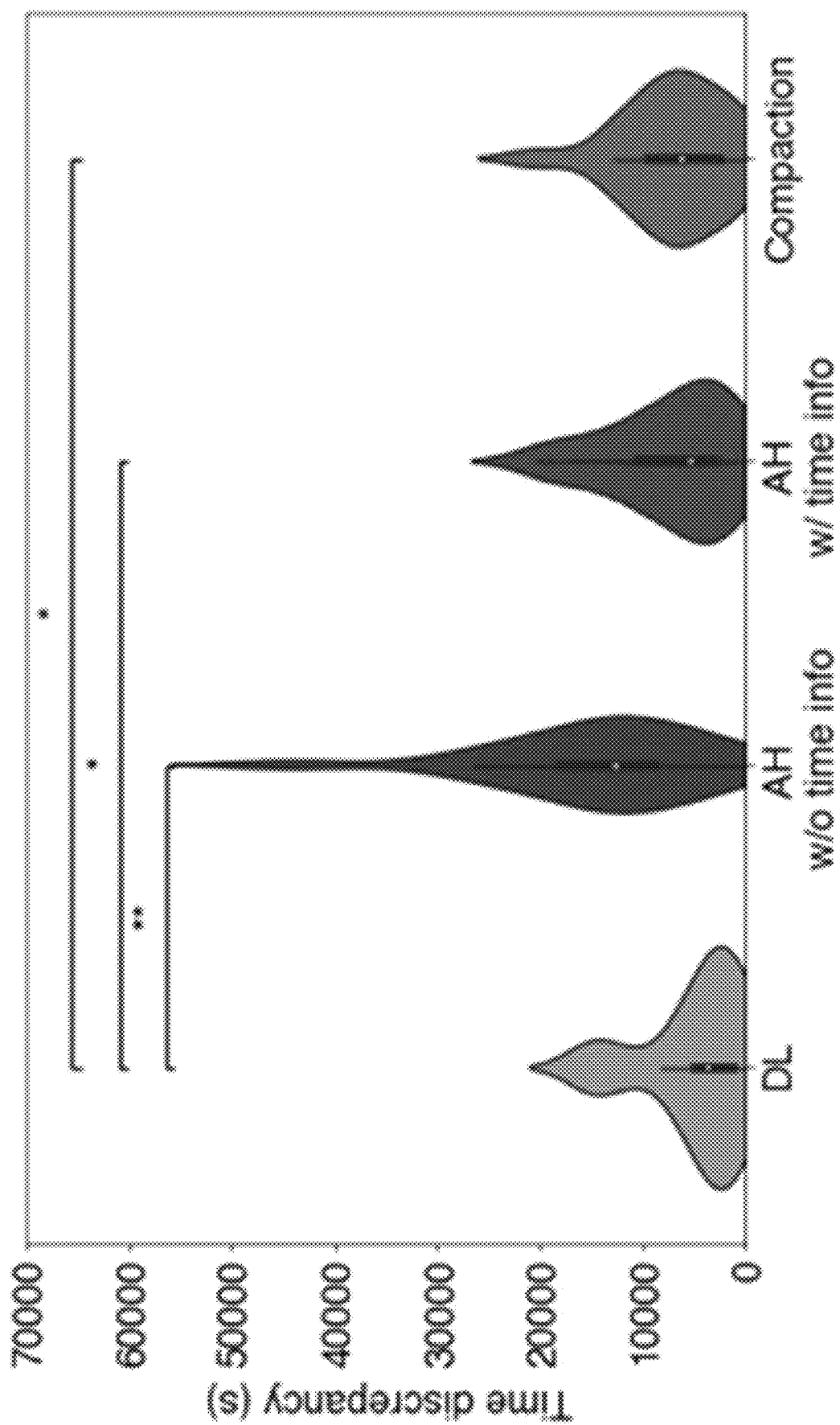
FIG. 6 depicts comparative analysis of the polarity onset time point prediction by the ensemble deep learning model, the average human and the compaction proxy. A violin plot of time discrepancy between the annotated and the predicted polarity onset time index of 19 testing embryos by the ensemble DL model, the average human (AH) without/with time information and compaction proxy is shown. AH without (w/o) time information (info) means that six human volunteers were given the randomized testing frames without any time information. Their predicted labels were then chronologically ordered for each testing embryo and temporally smoothened in the same manner as the ensemble DL model predictions. The mean discrepancy was taken from the six volunteers. AH with (w/) time information indicates that six human volunteers were given the chronologically ordered frames for each testing embryo. They directly estimated the polarity onset time point from these time sequences. Statistical analysis uses the ensemble DL model result as the reference to test their difference significance and the p-values are specified in the figure for *$p<0.05$, $p<0.01$, *$p<0.001$, ****$p<0.0001$, NS not significant, two-sided Wilcoxon matched-pairs signed-rank test.
Figure 11A:
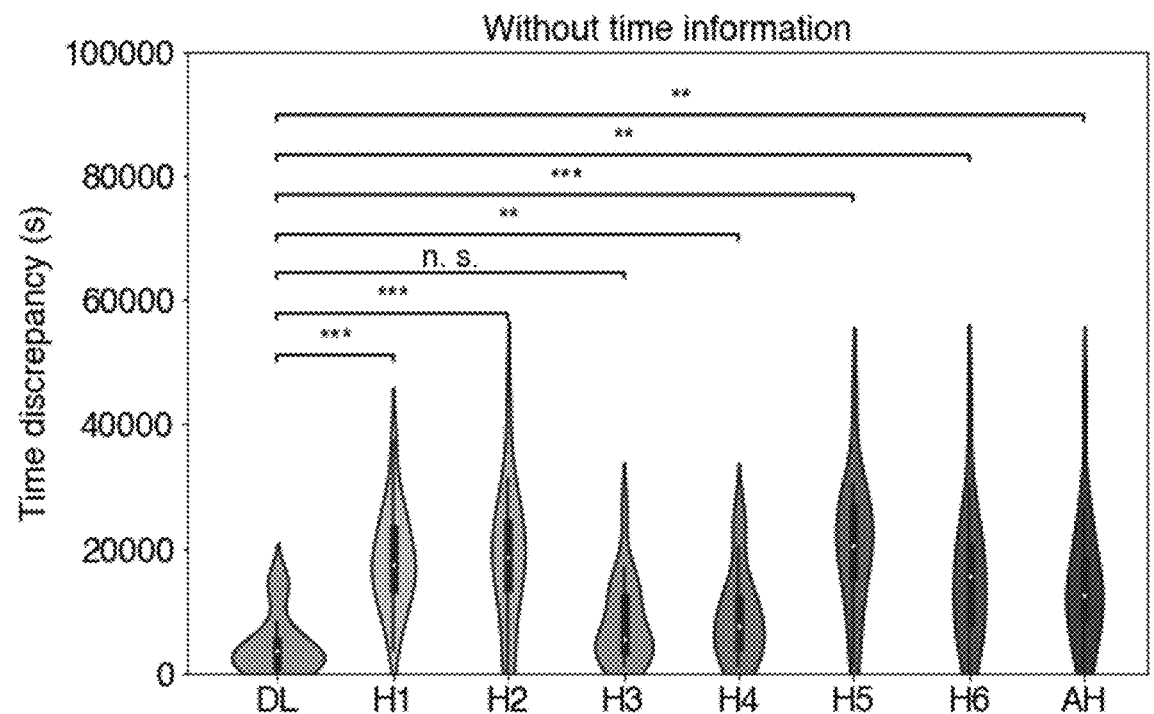
FIG. 11A-FIG. 11B show comparative analysis of the polarity onset time point prediction by the ensemble deep learning model, six human volunteers, their average, and the compaction proxy. The violin plots represent time discrepancies between the annotated and the predicted polarity onset time index of the 19 testing embryos by the ensemble DL model, each of six human volunteers (H1-H6), their average (AH), and the compaction proxy (Comp.).

The deep learning model was extended to identify the exact point at which polarization occurs in time-sequence videos. To this end, polarization onset time point predictions from the classification results of both the model and human volunteers were evaluated, using a temporal smoothing method (FIG. 2C). Timestamp errors between predicted and annotated time points were calculated as was done previously for compaction time point analysis. The model had significantly smaller timestamp prediction errors than the average human volunteer by pairwise comparison (two-tailed Wilcoxon matched-pairs signed-rank test, p<0.01, FIG. 6; FIG. 11A).

Figure 11B:
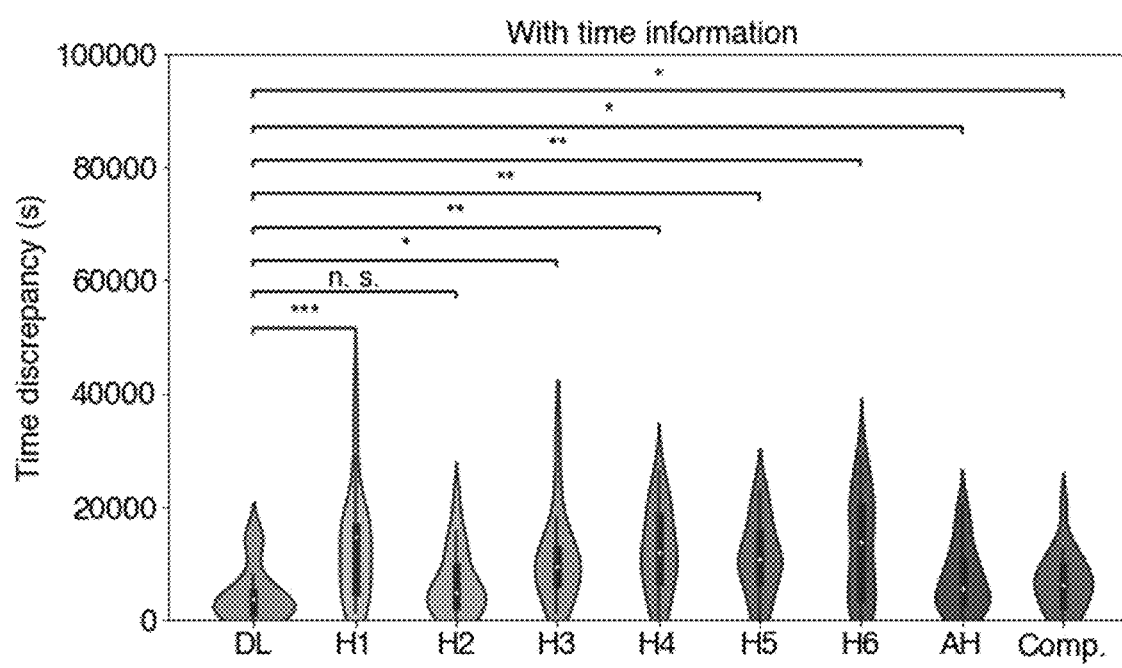

It was next investigated whether smoothened results from the ensemble classification model could outperform even human volunteers who are given access to temporal information during testing that the model does not use. To this end, each volunteer was provided with the complete AIF DIC videos in frame-by-frame time sequence for each embryo and asked for their estimate of the polarization onset time point. Compared with the smoothened model classification results performed on individual unordered images, the average human timestamp discrepancy was significantly larger than that of the model (two-tailed Wilcoxon signed-rank test, p<0.05, FIG. 6; FIG. 11B). The model identified exact polarization time points more precisely than the human volunteers, even when the volunteers utilized temporally ordered full video frames that the model did not have access to during training.

Discussion

Provided herein is an ensemble deep learning model that can identify polarization in unstained embryo images from the DIC microscope with an accuracy surpassing that of humans by a wide margin. When classifying 583 test DIC 8-cell stage frames, the model yielded an accuracy of 85% [95% confidence interval (CI): 82.2%-88.2%] compared to corresponding average human accuracy of 61% [95% CI: 57.1%-65.0%].

It is important to note the difficulty of the polarization detection task using unstained embryo images, since to the naked human eye, unstained images do not have any clear features which allow identification of the cellular apical domain. This is reflected in the observed human accuracy of 61%, which represents a performance level barely higher than random chance. Expressed as odds, the odds of a human volunteer correctly differentiating polarization were 1.5—that is, humans were right 1.5 times for each time they were wrong. In contrast, the deep learning model was right 5.7 times for each time it was wrong.

Current embryo selection in IVF clinics relies on crude and qualitative expert inspection of live embryos under plain microscopy that equates to an educated guess. Deep learning is an unusually well-suited solution to providing a more accurate assessment of embryo health for IVF, since deep neural networks recognize subtle features that are difficult for humans to identify. Prior research in this field limited itself only to features that are obvious on bright field or DIC imaging such as cell count and size, or to directly predict implantation potential without investigating underlying biological processes. The model described herein can enable embryo quality assessment using an important developmental milestone and thereby overcome some limitations of these prior deep learning studies. The model provided herein meets a previously unmet need to adequately evaluate the developmentally critical polarization milestone for embryo health screening prior to selection for implantation. By detecting an underlying developmental feature of the embryo using unstained embryo images, the methods disclosed herein provide a platform for a future solutions to improve IVF technology.

Reasons for the successes and failures of the model were investigated using the CAM technique and, without being bound by any particular theory, it was found that inter-blastomere angle, an indicator of compaction, was one of the model's cues for prediction. However, in some embodiments, compaction alone was an inferior predictor of polarization compared to the model, suggesting that the model learned additional features informative of polarization. Moreover, the deep learning model was able to identify the exact time point of polarization onset amongst temporally sequenced video frames better than all human volunteers, even with a severe disadvantage in data.

3D image stack analysis was circumvented through the use of a state-of-the-art all-in-focus algorithm, which allowed for the efficient collapse of 3D optical data to 2D. Prior studies that apply deep learning to embryo development have used single z slice DIC images as input, which obscures important 3D blastomere features. The disclosed DTCWT-based method of compressing multiple z slices into a single maximally informative 2D representation reduces data size, allowing a full range of published 2D neural network models to become accessible for analysis.

Several possibilities during the design of the model architecture were considered. Extant DCNN architectures for image classification include dense convolutional network (DenseNet), squeeze-and-excitation network (SENet) and residual neural network (ResNet). Cross validation was used to select a final candidate architecture among them these networks and ResNet was found to have the highest average validation accuracy and a low variance (FIG. 12). This model became the basis for individual DCNN modules, of which six were combined to form the final ensemble polarization classifier. Here the number six is to match the number of recruited human volunteers for fair comparison.

The deep learning-based approach advantageously presents a significantly more accurate and less laborious way to evaluate mammalian embryo polarization compared to manual analysis. This approach can be used to predict other features that indicate the quality of developing embryos, which can be measured by blastocyst implantation success rate. Furthermore, it can be useful for stainless tracking of polarization in live human embryos, allowing IVF clinics to assess embryo polarity status and its precise timing using non-invasive methods, and to move away from empirical embryo grading to a system grounded in established developmental milestones of embryogenesis. In some embodiments, in order to further enhance the generalization ability of the trained model, more diverse data can be utilized e.g., from different institutes and clinics.

In conclusion, provided herein is a powerful non-invasive deep learning method to detect embryo polarization from images without the use of fluorescence, while surpassing human performance. This method provides a novel example of detecting an underlying developmental feature of the mammalian embryo from unstained images, which can improve IVF technology as compared to methods using, e.g., the rate of increase in cell number or assessment of morphological features independently of developmental events.

Methods

Assembling the Embryo Dataset

All mouse experimental data were obtained in accordance with the Animals (Scientific Procedures) Act 1986 Amendment Regulations 2012, under project license by the University of Cambridge Animal Welfare and Ethical Review Body (AWERB). Reporting of animal experiments followed ARRIVE guidelines. Embryos were collected at the 2-cell stage from F1 females (C57Bl6xCBA) mated with F1 studs, following super ovulation of the female: injection of 7.5 IU of pregnant mares' serum gonadotropin (PMSG; Intervet), followed by injection of 7.5 IU of human chorionic gonadotropin (HCG; Intervet) after 48 h and immediately prior to mating.

Embryos were microinjected with Ezrin—red fluorescent protein (RFP) mRNA as a polarity marker before imaging, in each blastomere at the 2-cell stage. Images were collected on confocal Leica SP5 or SP8 microscopes. The interval between each frame on the time (t) axis was 1200 s-2400 s for each embryo, and z frames were taken at 4 µm intervals on the z axis. Time-lapse recordings were converted into TIFF files for analysis and processed on Fiji software. Recordings that were incorrectly formatted, visually unclear, or which showed grossly defective embryos were excluded. From an initial 174 embryo recordings, 89 were used for deep learning and human testing (FIG. 7). Only 8-cell stage frames were included in deep learning and analysis (defined as frames from the first frame where 8 distinct blastomeres are visible, to the frame immediately prior to the moment at which the final blastomere starts dividing). The DIC channel images were converted into an AIF DIC frame for each time point as described in the Results section above, and the Ezrin-RFP channel images were converted into maximum intensity z projection frames, prior to annotation.

Embryo Annotation (Polarization and Compaction)

Each embryo time-lapse recording was marked with a polarization onset time by a human expert annotator, corresponding to the first frame in which a polarized blastomere is clearly visible. This was achieved using the maximum intensity z projection Ezrin-RFP frame: the polarization onset frame is one in which the first apical ring or cap is completely and clearly formed (closed) on any blastomere, and which takes up greater than or equal to ⅓ of the surface of the cell as visible in the recording. All frames after and including this polarization onset point were classified as after-onset. All frames prior to this point were classified as before-onset. Compaction time was indicated when smallest inter-blastomere angle was greater than 120 degrees. All frames after and including this point were considered compacted, and all frames prior to this point were considered uncompacted.

Ensemble Deep Learning Framework

Two types of effective machine learning techniques, DCNN and ensemble learning, were adopted and combined together for prediction of polarity onset. Multiple (6 here to match the number of human volunteers) DCNNs learnt on the training cohort and then their output predictions were averaged to predict the class label of each testing image. Specifically, the ResNet backbone was chosen as the main part of each DCNN model. A dense layer with two output nodes is added on top of the ResNet backbone. The pretrained weights on ImageNet database were used as the initialization for each DCNN model. Three of them were trained with SGD optimizer and the other three were trained with Adam optimizer. All of them were trained for 40 epochs. At the end of 40 epochs, all the models converge to nearly 100% in terms of the training accuracy. Different training settings made the six trained CNNs a bit more diverse from each other, where the diversity among CNNs would improve the generalization ability of the ensemble model. To investigate ensemble learning, the cross-validation (CV) technique was first adopted to compare different CNN backbones, including DenseNet, SENet and ResNet. Based on the results of fivefold CV experiments (FIG. 12), ResNet was found to be the optimal choice in both prediction performance and computational load. Then, different ensemble techniques were tried and their results are summarized in Table 3. From this table, it can be seen that ensemble on six ResNet models using all the training data by varying the optimization initials and then applying majority voting on the output labels achieved the best testing accuracy. However, in some embodiments, its advantage over averaging the output probability is 0.4%. In some embodiments, the latter is more intuitive and common considering the number of ensemble members is even. In some embodiments, there is a limit on ensemble learning improvement over a single classifier, which, without being bound by any particular theory is mainly bottlenecked by the classifier architecture rather than ensemble techniques.

TABLE 3

RESULT SUMMARY OF DIFFERENT ENSEMBLE TECHNIQUES.

| Varied element | Different techniques | Testing accuracy |
|---|---|---|
| Training data | raw training data | 85.2% [82.2%, 88.2%] |
| | 6-fold cross-validation on training data | 83.4% [80.3%, 86.4%] |
| | bootstrapping training data 6 times | 82.2% [78.7%, 85.4%] |
| Model | varying optimization initials | 85.2% [82.2%, 88.2%] |
| | three SENet-154 models + three ResNet-50-v2 models | 83.4% [80.1%, 86.4%] |
| Combination method | averaging the output probability from ensemble members | 85.2% [82.2%, 88.2%] |
| | applying majority voting on the output labels from ensemble members* | 85.6% [82.5%, 88.3%] |

95% confidence intervals are included in square brackets. They are estimated by bootstrapping the testing dataset with 1000 replicates. The highest testing accuracy in each category is marked in bold.
*If there is a tie, the averaged probability will be used to make a judgement instead.

Human Trial

In order to evaluate the performance of the DL model, comparative trials on human volunteers to identify polarity onset were conducted as well. Six human volunteers (3 males, 3 females for gender equality) with a bachelor's degree in a STEM subject but without prior experience of mouse embryo development studies were recruited from the Caltech community, as representatives for competent STEM-trained but inexperienced volunteers who would benefit from the technology in a clinical setting. Volunteers were sent an email with clear instructions and a link to the training and testing data. Each was asked to learn on the training dataset first and then apply their learnt patterns to the testing images, to predict their polarity onset status by filling in an Excel table with predicted labels. After the test, they each returned their Excel file for evaluation.

All participants provided informed consent before taking part in our study. They consented to allow their data to be used in the final analysis and all individuals received reward for participation. The study was approved by Caltech Institutional Review Board.

Evaluation of Model and Human Performance

Results from the testing data—for each of the model and human predictions—were processed as follows: In classification analysis, classified frames from the model/prediction were automatically sorted into one of four categories visible in the confusion matrix (polarized or non-polarized annotated true class, versus polarized or non-polarized predicted class). Cases in which the true class matched the predicted class were scored as an accurate prediction, and cases where the two classes did not match were scored as an inaccurate prediction. Population proportions of accurate results represent the proportion of accurate frames in the total population of frames. For time-smoothened data, the frames were first returned to time-order, after which the polarity onset point was determined by finding the point at which the prediction switched from an unpolarized majority to a polarized majority (See, the Results section above). All frames after this polarity onset point were then classified as polarized, and all frames before this point were classified as unpolarized, therefore 'smoothening' out any anomalous predictions using time point information. For time point analysis, the polarity onset point (as determined from the smoothening process) was used. For each testing embryo time-lapse recording, the time discrepancy for the model/volunteer was calculated as the actual time difference (to the nearest second) between the predicted polarity onset frame and the annotated polarity onset frame, using the knowledge of the frame-to-frame time difference for each recording. Where no predicted onset frame was given within the allocated recording, for this analysis the frame immediately after the final frame of the time-lapse recording was used as the predicted onset of polarization. These time discrepancies for each embryo were used in pairwise comparisons.

CAM Attention Map Generation

Figure 3C:
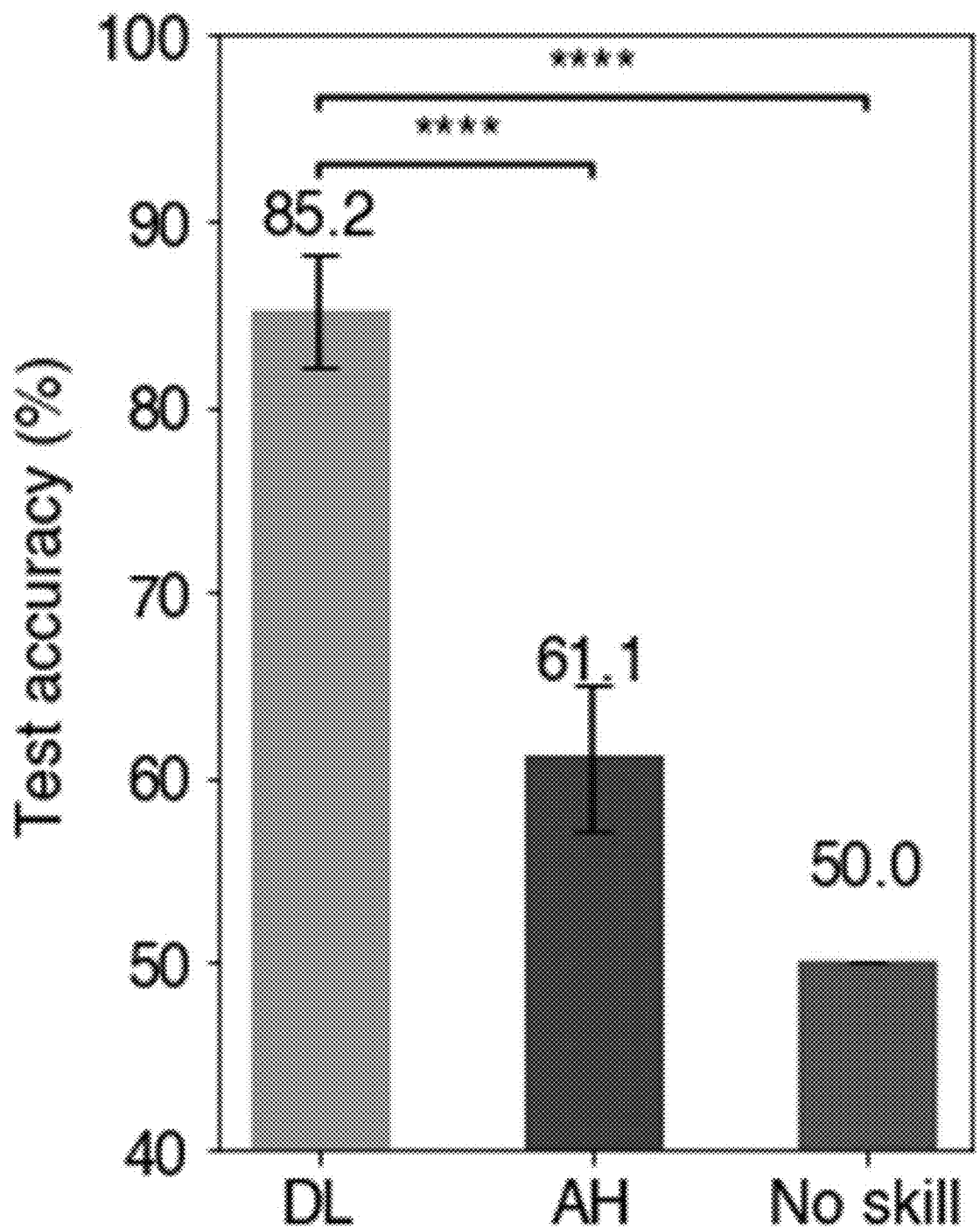

To identify focus areas of the ensemble model, attention heat maps were generated using the class activation mapping technique. To be specific, each feature map passing through the global average pooling (GAP) layer of ResNet backbone was multiplied with their corresponding weight connecting the GAP layer and the fully-connected layer. Then the weighted feature maps were added in an element-wise manner. Each weight informs how much importance needs to be given to individual feature maps. The final weighted sum provides a heat map of a particular class (in the present case, the before/after polarity onset class), which indicates what pixels the model favors or dislikes to make the final prediction. The heat map size is the same as the one of feature maps. Therefore, to impose it on the input AIF DIC image, it was scaled to the size of the input image and results are shown in FIG. 3A-FIG. 3C.

Statistical Analysis

Image classification results were compared using a two-tailed z-test of two population proportions with significance classified for p-values as: *$p<0.05$, $p<0.01$, *$p<0.001$, ****$p<0.0001$ and not significant (NS). Time prediction discrepancies were compared using two-sided Wilcoxon matched-pairs signed-rank test since the testing data size is small and not guaranteed as normal. Significance was given for p-values as provided above. Further details are given with each result. Statistical analyses were performed using the statistics module in SciPy package with Python (docs.scipy.org/doc/scipy/reference/tutorial/stats.html, the content of which is incorporated herein by reference in its entirety). All the 95% confidence intervals were estimated by bootstrapping the testing dataset with 1000 replicates.

Institutional Review Board Statement

All mouse experimental data was obtained in accordance with the Animals (Scientific Procedures) Act 1986 Amendment Regulations 2012, under project license by the University of Cambridge Animal Welfare and Ethical Review Body (AWERB). Reporting of animal experiments follows ARRIVE guidelines. Embryos were collected at the 2-cell stage from F1 females (C57Bl6xCBA) mated with F1 studs, following super ovulation of the female: injection of 7.5 IU of pregnant mares' serum gonadotropin (PMSG; Intervet), followed by injection of 7.5 IU of human chorionic gonadotropin (HCG; Intervet) after 48 h and immediately prior to mating. All participants in the human trial provided informed consent before taking part in the study. They consented to allow their data to be used in the final analysis and all individuals received reward for participation. The human trial was approved by Caltech Institutional Review Board.

Data Availability

The testing dataset is available on github.com/Scott-Sheen/AI4Embryo, the content of which is incorporated herein by reference in its entirety.

Code Availability

The training code for the single DCNNs and the testing code for the ensemble DL model are available at github.com/Scott-Sheen/AI4Embryo, the content of which is incorporated herein by reference in its entirety.

Determining Embryo Polarization

Figure 13:
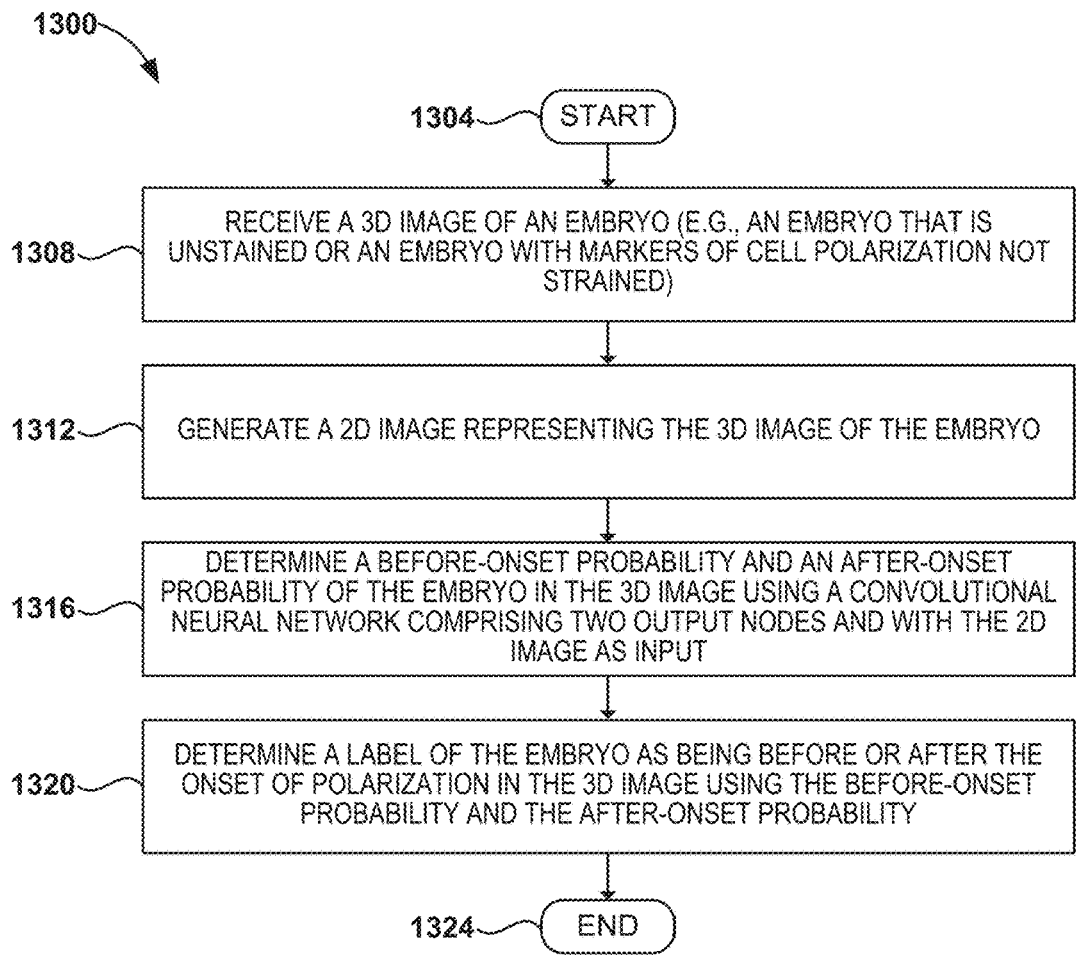
FIG. 13 is a flow diagram showing an exemplary method of determining cell polarization.

FIG. 13 is a flow diagram showing an exemplary method 1300 of determining embryo polarization. The method 1300 may be embodied in a set of executable program instructions stored on a computer-readable medium, such as one or more disk drives, of a computing system. For example, the computing system 1400 shown in FIG. 14 and described in greater detail below can execute a set of executable program instructions to implement the method 1300. When the method 1300 is initiated, the executable program instructions can be loaded into memory, such as RAM, and executed by one or more processors of the computing system 1400. Although the method 1300 is described with respect to the computing system 1400 shown in FIG. 14, the description is illustrative only and is not intended to be limiting. In some embodiments, the method 1300 or portions thereof may be performed serially or in parallel by multiple computing systems.

After the method 1300 begins at block 1304, the method 1300 proceeds to block 1308, where a computing system (e.g., the computing system 1400) receives a three-dimensional (3D) image of an embryo (e.g., an unstained embryo or an embryo without staining of markers of cell polarization). The computing system can receive the 3D image of the embryo from a data store. The computing system can store the 3D image of the embryo, for example, in its memory. Alternatively or additionally, the computing system can retrieve the 3D image of the embryo from its memory. The 3D image can, for example, comprises a bright-field 3D image of the embryo, a differential interference contrast (DIC) 3D image of the embryo, or a combination thereof. In some embodiments, the embryo is unstained. Alternatively, the embryo does not have any markers of polarization stained.

The embryo can be a 8-cell-stage embryo, a 8-16-cell-stage embryo, a 16-cell stage embryo, or a combination thereof. The embryo can comprise, comprise about, comprise at least, comprises at least about, comprises at most, or comprises at most about 8 cells, 9 cells, 10 cells, 11 cells, 12 cells, 13 cells, 14 cells, 15 cells, 16 cells, 17 cells, 18 cells, 19 cells, 20 cells, 21 cells, 22 cells, 23 cells, 24 cells, or a number or a range between any two of these values. A size (e.g., radius, diameter, diameter, length, or width) of the embryo can vary. For example, a size of the embryo can be, be about, be at least, be at least about, be at most, or be at most about, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, or a number or a range between any two of these values.

The embryo can be, for example, an embryo of a mammal (a mammalian embryo, such as a human embryo). Non-limiting examples of mammals include mice; rats; rabbits;

guinea pigs; dogs; cats; sheep; goats; cows; horses; primates, such as monkeys, chimpanzees and apes, and, in particular, humans. In some embodiments, the mammal is a primate. In some embodiments, the mammal is a human. In some embodiments, the mammal is not a human.

To receive the 3D image, the computing system can capture the 3D image of the embryo or cause the 3D image of the embryo to be captured. The 3D image can comprise a plurality of 2D images. The 3D image can be a 3D image stack comprising a plurality of z-slice 2D images of the embryo. The 3D image can comprise, comprise about, comprise at least, comprise at least about, comprise at most, or comprise at most about, 5, 6, 7, 8, 9, 10, 15, 20, 25, 30, 40, 50, 60, 70, 80, 90, 100, 200, 300, 400, 500, 1000, or a number or a range between any two of these values, 2D images of the embryo (or z-slice 2D images of the embryo). The 3D image can have a size of, of about, of at least, of at least about, of at most, or of at most about, 64, 128, 256, 512, 1024, 2048, 4096, or a number or a range between any two of these values, pixels in a dimension, such as the x-dimension or the y-dimension. The 3D image can have a size of, of about, of at least, of at least about, of at most, or of at most about, 100, 200, 300, 400, 500, 600, 700, 800, 900, 1000, 1500, 2000, 2500, 3000, 3500, 4000, 4500, 5000, or a number or a range between any two of these values, pixels in a dimension, such as the x-dimension or the y-dimension. For example, the 3D image has a size of at least 512 pixels in the x-dimension and/or at least 512 pixels the y-dimension.

The method 1300 proceeds from block 1308 to block 1312, where the computing system generates a two-dimensional (2D) image representing the 3D image of the embryo. The 2D image can have a size of, of about, of at least, of at least about, of at most, or of at most about, 64, 128, 256, 512, 1024, 2048, 4096, or a number or a range between any two of these values, pixels in a dimension, such as the x-dimension or the y-dimension. The 2D image can have a size of, of about, of at least, of at least about, of at most, or of at most about, 100, 200, 300, 400, 500, 600, 700, 800, 900, 1000, 1500, 2000, 2500, 3000, 3500, 4000, 4500, 5000, or a number or a range between any two of these values, pixels in a dimension, such as the x-dimension or the y-dimension. For example, the 2D image has a size of at least 512 pixels in the x-dimension and/or at least 512 pixels in the y-dimension.

In some embodiments, to generate the 2D image representing the 3D image, the computing system can determine a value of each pixel of the 2D image from one, one or more, or each pixel corresponding to the pixel in the 3D image of the embryo (e.g., the corresponding pixel in each of the plurality of z-slice 2D images of the embryo). In some embodiments, the 2D image comprises an informative 2D representation of the 3D image. The 2D image can comprise a maximally informative 2D representation of the 3D image. In some embodiments, to generate the 2D image representing the 3D image, the computing system can generate the 2D image representing the 3D image using an all-in-focus (AIF) algorithm. The AIF algorithm can be based on wavelet transform. The wavelet transform can comprise complex wavelet transform. The complex wavelet transform can comprise dual-tree complex wavelet transform (DTCWT).

The method 1300 proceeds from block 1312 to block 1316, where the computing system determines a before-onset probability that the embryo is before onset of polarization in the 3D image and an after-onset probability that the embryo is after onset of polarization in the 3D image using a machine learning model, such as a convolutional neural network (CNN), e.g., a CNN binary classification model, with the 2D image as input. The CNN can be a 2D CNN. The CNN can comprise two output nodes. The two output nodes can output the before-onset probability and the after-onset probability. For example, the two output nodes can output a probability vector comprising the before-onset probability and the after-onset probability. For example, a before-onset probability output node of the two output nodes of the CNN outputs the before-onset probability, and an after-onset probability output node of the two output nodes outputs the after-onset probability.

CNN

In some embodiments, the CNN comprises a deep CNN. The CNN can comprise one or more convolutional layers, one or more batch normalization layers, one or more activation layers (e.g., ReLu layers), and/or one or more pooling layers (e.g., max pooling, min pooling, or average pooling). The CNN can comprise, comprise about, comprise at least, comprise at least about, comprise at most, or comprise at most about, 10, 15, 20, 25, 30, 35, 40, 45, 50, 55, 60, 65, 70, 75, 80, 85, 90, 95, 100, or a number or a range between any two of these values, of one type of layers, such as convolutional layers. The CNN can comprise, comprise about, comprise at least, comprise at least about, comprise at most, or comprise at most about, 40, 50, 60, 70, 80, 90, 100, 110, 120, 130, 140, 150, 200, 250, 300, 350, 400, 450, 500, or a number or a range between any two of these values, layers in total. In some embodiments, the CNN comprises a plurality of dense layers (e.g., 2, 3, 4, 5, 6, 7, 8, 9, or 10 dense layers). The CNN can comprise two dense layers. A first dense layer of the plurality of dense layers can be connected to a last layer of the CNN that is not a dense layer. A first dense layer of the plurality of dense layers can be connected to a last convolutional layer of the CNN or a layer subsequent to the last convolutional layer of the CNN. A (or any) dense layer other than the last dense layer can be connected with an immediate subsequent dense layer. A (or any) dense layer other than a first dense layer can be connected with an immediate prior dense layer. A last dense layer of the plurality of dense layers can comprise the two output nodes. In some embodiments, the CNN comprises a dense convolutional network (DenseNet), a squeeze-and-excitation network (SENet), a residual neural network (ResNet), or a combination thereof.

In some embodiments, the CNN uses inter-blastomere angle as a cue. The CNN can use compaction as a cue. The CNN can be based on more than the inter-blastomere angle. The CNN can be based on more than the compaction. The CNN can have a higher accuracy, sensitivity, and/or specificity for determining the embryo as being before or after the onset of polarization in the 3D image than that determined using just the inter-blastomere angle and/or compaction. In some embodiments, the CNN has an accuracy of, of about, of at least, of at least about, of at most, or of at most about, 80%, 81%, 82%, 83%, 84%, 85%, 86%, 87%, 88%, 89%, 90%, 91%, 92%, 93%, 94%, 95%, 96%, 96%, 97%, 98%, 99%, or a number or a range between any two of these values. The CNN can have a sensitivity of, of about, of at least, of at least about, of at most, or of at most about, 80%, 81%, 82%, 83%, 84%, 85%, 86%, 87%, 88%, 89%, 90%, 91%, 92%, 93%, 94%, 95%, 96%, 96%, 97%, 98%, 99%, or a number or a range between any two of these values. The CNN can have a specificity of, of about, of at least, of at least about, of at most, or of at most about, 80%, 81%, 82%, 83%, 84%, 85%, 86%, 87%, 88%, 89%, 90%, 91%, 92%, 93%, 94%, 95%, 96%, 96%, 97%, 98%, 99%, or a number or a range between any two of these values. The CNN can have an area under the receiver operating characteristic curve is, is about, is at least, is at least about, is at most, or is at most about, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or a number or a range between any two of these values.

Ensemble Model of CNNs

In some embodiments, the computing system can determine the before-onset probability and the after-onset probability using an ensemble model, e.g., a plurality of CNNs (e.g., 2, 3, 4, 5, 6, 7, 8 9, 10, 11, 12, 13, 14, 15, 16, 17, 18, 19, 20, 25, 30, or more). In some embodiments, the computing system can determine a first before-onset probability that the embryo is before the onset of polarization in the 3D image and a first after-onset probability that the embryo is after the onset of polarization in the 3D image using each of the plurality of CNNs. To determine the before-onset probability and the after-onset probability using the plurality of CNNs, the computing system can determine a measure of the first before-onset probabilities and a measure of the first after-onset probabilities as the before-onset probability that the embryo is before onset of polarization in the 3D image and the after-onset probability that the embryo is after onset of polarization in the 3D image, respectively. The measure can comprise a minimum, an average, a medium, a maximum, or a combination thereof.

At least two of the plurality of CNNs can comprise an identical architecture with different weights. Two of the plurality of CNNs can be trained using different initializations and/or different optimizers. Two of the plurality of CNNs can be trained using identical initializations and/or identical optimizers. The optimizers can comprise a stochastic gradient descent (SGD) optimizer, an Adam optimizer, or a combination thereof. Half (or about half) of the plurality of CNNs can be trained with one optimizer. The other half (or the remaining) of the plurality of CNNs can be trained with another optimizer. Two or more (such as all) of the plurality of CNNs are trained for an identical number of epochs (or iterations), e.g., 20, 25, 30, 35, 40, 45, 50, 60, 70, 80, 90, 100, or more epochs.

Training

The computing system can receive the CNN. The computing system can train the CNN. The computing system can train the CNN (or the CNN can be trained) for, for about, for at least, for at least about, for at most, or for at most about, 20, 25, 30, 35, 40, 45, 50, 60, 70, 80, 90, 100, or more epochs. The computing system can train the CNN (or the CNN can be trained) with transfer learning. The computing system can train the CNN (or the CNN can be trained) using data augmentation. The computing system can train the CNN (or the CNN can be trained) using a stochastic gradient descent (SGD) optimizer, an Adam optimizer, or a combination thereof.

The computing system can train the CNN using a plurality of 2D training images, representing a plurality of 3D images of embryos, and associated annotated polarization labels (an annotated polarization label for each 2D training image or corresponding 3D training image) of before or after the onset of polarization. The computing system can receive the annotated polarization labels. The associated annotated polarization labels can comprise the ground truth for each of the 2D training image or corresponding 3D training image. The plurality of 2D training images can comprise, comprise about, comprise at least, comprise at least about, comprise at most, or comprise at most about, 500, 600, 700, 800, 900, 1000, 1100, 1200, 1300, 1400, 1500, 2000, 2500, 3000, 4000, 5000, 6000, 7000, 8000, 9000, 10000, or a number or a range between any two of these values, 2D training images representing corresponding 3D training images of embryos. The plurality of training images can comprise, comprise about, comprise at least, comprise at least about, comprise at most, or comprise at most about, 10, 20, 30, 40, 50, 60, 70, 80, 90, 100, 110, 120, 130, 140, 150, 160, 170, 180, 190, 200, or a number or a range between any two of these values, 2D training images of each of one or more embryos. The number of embryos with images captured to generate the training images can be, be about, be at least, be at least about, be at most, or be at most about, 5, 6, 7, 8, 9, 10, 20, 30, 40, 50, 60, 70, 80, 90, 100, 110, 120, 130, 140, 150, 160, 170, 180, 190, 200, or a number or a range between any two of these values. In some embodiments, the plurality of 3D images (or the corresponding 2D images) comprises, comprises about, comprises at least, comprises at least about, comprises at most, or comprises at most about, 30%, 35%, 40%, 45%, 50%, 55%, 60%, 65%, 70%, or a number or a range between any two of these values, of images of embryos before the onset of polarization (e.g., captured before the onset of polarization and/or with the polarization label of before the onset of polarization). The plurality of 3D images (or the corresponding 2D images) can comprise, comprise about, comprise at least, comprise at least about, comprises at most, or comprise at most about, 30%, 35%, 40%, 45%, 50%, 55%, 60%, 65%, 70%, or a number or a range between any two of these values, of images of embryos after the onset of polarization (e.g., captured after the onset of polarization and/or with the polarization label of after the onset of polarization).

In some embodiments, the plurality of 2D training images represents a plurality of 3D training images of a plurality of embryos captured between the 2-cell-stage, 3-cell-stage, 4-cell-stage, 5-cell-stage, 6-cell-stage, 7-cell-stage, 8-cell-stage, 9-cell-stage, 10-cell-stage, 11-cell-stage, 12-cell-stage, 13-cell-stage, 14-cell-stage, 15-cell-stage, 16-cell-stage, 17-cell-stage, 18-cell-stage, 19-cell-stage, or 20-cell-stage.

In some embodiments, the plurality of embryos captured in the training images are fluorescently labeled on or after the 2-cell-stage. One or more markers of cell polarization in the plurality of embryos can be fluorescently labeled. The one or more markers of cell polarization can comprise Ezrin. The one or more markers for cell polarization can be labeled with red fluorescence protein (RFP). mRNA for the one or more markers of cell polarization can be injected into the plurality of embryos. mRNA for fluorescently labeled Ezrin can be injected into the plurality of embryos.

The parameters of the CNN can be set in a process referred to as training. For example, the CNN can be trained using training data that includes input data (e.g., 2D training images) and the correct or preferred output (the polarization labels) of the CNN for the corresponding input data. Sets of individual input vectors ("mini-batches") can be processed at the same time by using an input matrix instead of a single input vector, which may speed up training. The CNN can repeatedly process the input data, and the parameters (e.g., the weight matrices) of the CNN can be modified in what amounts to a trial-and-error process until the model produces (or "converges" on) the correct or preferred output. The modification of weight values may be performed through a process referred to as "back propagation." Back propagation includes determining the difference between the expected CNN output and the obtained CNN output, and then determining how to modify the values of some or all parameters of the model to reduce the difference between the expected CNN output and the obtained CNN output.

In some embodiments, the computing system can receive a 3D fluorescent image of the embryo corresponding to the 3D image of the embryo. The computing system can generate a 2D fluorescent image representing the 3D fluorescent image of the embryo. The 2D (or 3D) fluorescent image can be used to determine a polarization label, such as an annotated polarization label. The computing system can receive the polarization label. To generate the 2D fluorescent image representing the 3D fluorescent image, the computing system can determine a value of each pixel of the 2D fluorescent image from one, one or more, or each pixel corresponding to the pixel in the 3D fluorescent image of the embryo. To generate the 2D fluorescent image representing the 3D fluorescent image, the computing system can generate the 2D image fluorescent representing the 3D fluorescent image using an z-projection algorithm. The z-projection algorithm can comprise a minimum intensity, an average intensity, a medium intensity, and/or a maximum intensity z-projection algorithm.

The method 1300 proceeds from block 1316 to block 1320, where the computing system determines whether the embryo is before or after the onset of polarization in the 3D image using the before-onset probability and the after-onset probability. For example, the computing system can determine a label (or status) of the embryo as being before or after the onset of polarization in the 3D image using the before-onset probability and the after-onset probability. In some embodiments, the label of the embryo can be used for embryo selection, accessing embryo health, or a combination thereof.

To determine the label of the embryo as being before or after the onset of polarization in the 3D image, the computing system can determine the before-onset probability is smaller than the after-onset probability. The computing system can determine the label of the embryo as being after the onset of polarization in the 3D image. To determine the label of the embryo is before or after the onset of polarization in the 3D image, the computing system can determine the before probability is greater than the after probability. The computing system can determine the label of the embryo as being before the onset of polarization in the 3D image. To determine the label of the embryo as being before or after the onset of polarization in the 3D image, the computing system can determine the before-onset probability (and/or the after-onset probability) is within a range, with a lower bound of 0.4, 0.41, 0.42, 0.43, 0.44, 0.45, 0.46, 0.47, 0.48, or 0.49 and a lower bound of 0.51, 0.52, 0.53, 0.54, 0.55, 0.56, 0.57, 0.58, 0.59, or 0.6. The computing system can determine the label of the embryo as being undetermined.

In some embodiments, the computing system can generate a user interface (UI), such as a graphical UI, comprising a UI element comprising or representing the label of the embryo as being before or after the onset of polarization in the 3D image determined. The UI can include, for example, a dashboard. The UI can include one or more UI elements. A UI element can comprise or represent the status of the label of the embryo as being before or after the onset of polarization in the 3D image determined. A UI element can be a window (e.g., a container window, browser window, text terminal, child window, or message window), a menu (e.g., a menu bar, context menu, or menu extra), an icon, or a tab. A UI element can be for input control (e.g., a checkbox, radio button, dropdown list, list box, button, toggle, text field, or date field). A UI element can be navigational (e.g., a breadcrumb, slider, search field, pagination, slider, tag, icon). A UI element can informational (e.g., a tooltip, icon, progress bar, notification, message box, or modal window). A UI element can be a container (e.g., an accordion). The computing system can generate a file comprising or representing the label of the embryo as being before or after the onset of polarization in the 3D image determined.

In some embodiments, the computing system can receive a plurality of 3D images of the embryo comprising time-lapsed 3D images of the embryo. The time-lapsed 3D images of the embryo can comprise, comprise about, comprise at least, comprise at least about, comprise at most, or comprise at most about, 10, 11, 12, 13, 14, 15, 16, 17, 18, 19, 20, 25, 30, 40, 50, or a number or a range between any two of these values, time-lapsed 3D images of the embryo. Two (or every two) consecutive time-lapsed 3D images (or any two consecutive time-lapsed 3D images) of the embryo are captured at, at about, at least, at least about, at most, or at most about, 1 hour, 2 hours, 3 hours, 4 hours, 5 hours, or a number or a range between any two of these values, apart. The computing system can generate a 2D image representing each of the plurality of 3D images of the embryo. The computing system can determine a before-onset probability that the embryo is before onset of polarization and an after-onset probability that the embryo is before or after, respectively, the onset of polarization in each of the plurality of 3D images using the CNN with the 2D image representing the 3D image of the plurality of 3D images an input. The computing system can determine a label of the embryo as being before or after the onset of polarization in each of the plurality of 3D images using the before-onset probability and the after-onset probability determined for the 3D image of the plurality of 3D images. The computing system can performing majority voting of the labels determined for the plurality of 3D images using a window of, for example, 2, 3, 4, 5, 6, 7, 8, 9, or 10. The computing system can update the label of each 3D image subsequent to a 3D image, with the label of the embryo being after the onset of polarization, to the label of the embryo being after the onset of polarization.

The method 1300 ends at block 1324.

Machine Learning Model

A machine learning model can be, for example, a neural network (NN), a convolutional neural network (CNN), or a deep neural network (DNN). The computing device 141400 described with reference to FIG. 14 can train and/or use a machine learning model.

A layer of a neural network (NN), such as a deep neural network (DNN), can apply a linear or non-linear transformation to its input to generate its output. A neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

A convolutional neural network (CNN) can be a NN with one or more convolutional layers, such as, 5, 6, 7, 8, 9, 10, or more. The convolutional layer can apply a set of kernels that convolve its input to generate its output. The softsign layer can apply a softsign function to its input. The softsign function (softsign(x)) can be, for example, (x/(1+|x|)). The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in a NN can be 10, 20, 30, 40, or more. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. Outputs of NNs of the plurality of NNs can be computed to determine an output of the NN. For example, an output of a NN of the plurality of NNs can include a likelihood score. The output of the NN including the plurality of NNs can be determined based on the likelihood scores of the outputs of different NNs of the plurality of NNs.

Execution Environment

Figure 14:
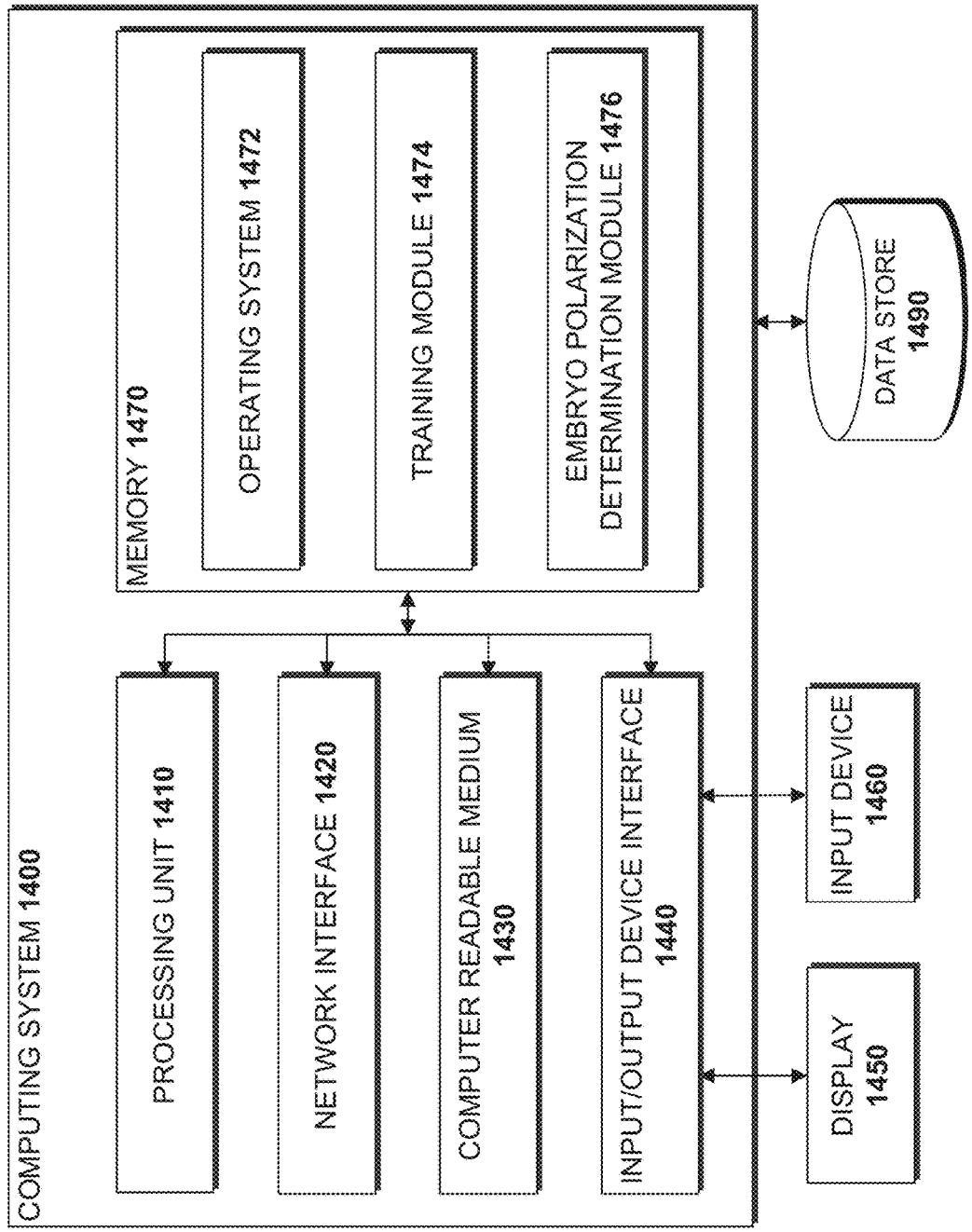
FIG. 14 is a block diagram of an illustrative computing system configured to implement cell polarization determination.

FIG. 14 depicts a general architecture of an example computing device 1400 configured to execute the processes and implement the features described herein. The general architecture of the computing device 1400 depicted in FIG. 14 includes an arrangement of computer hardware and software components. The computing device 1400 may include many more (or fewer) elements than those shown in FIG. 14. It is not necessary, however, that all of these generally conventional elements be shown in order to provide an enabling disclosure. As illustrated, the computing device 1400 includes a processing unit 1410, a network interface 1420, a computer readable medium drive 1430, an input/output device interface 1440, a display 1450, and an input device 1460, all of which may communicate with one another by way of a communication bus. The network interface 1420 may provide connectivity to one or more networks or computing systems. The processing unit 1410 may thus receive information and instructions from other computing systems or services via a network. The processing unit 1410 may also communicate to and from memory 1470 and further provide output information for an optional display 1450 via the input/output device interface 1440. The input/output device interface 1440 may also accept input from the optional input device 1460, such as a keyboard, mouse, digital pen, microphone, touch screen, gesture recognition system, voice recognition system, gamepad, accelerometer, gyroscope, or other input device.

The memory 1470 may contain computer program instructions (grouped as modules or components in some embodiments) that the processing unit 1410 executes in order to implement one or more embodiments. The memory 1470 generally includes RAM, ROM and/or other persistent, auxiliary or non-transitory computer-readable media. The memory 1470 may store an operating system 1472 that provides computer program instructions for use by the processing unit 1410 in the general administration and operation of the computing device 1400. The memory 1470 may further include computer program instructions and other information for implementing aspects of the present disclosure.

For example, in one embodiment, the memory 1470 includes a training module 1474 for training a machine learning model, such as a convolutional neural network (CNN) for determining embryo polarization. The memory 1470 may additionally or alternatively include a embryo polarization determining module 1476 for determining polarization of an embryo using a machine learning model, such as a NN. In addition, memory 1470 may include or communicate with the data store 1490 and/or one or more other data stores that store the machine learning model (e.g., a CNN), weights of the machine learning model (during one or more iterations of training or when trained), the 3D training images, the 2D training images, the polarization labels of the training images, the 3D image or the 2D image of the embryo for which the polarization label is being determined, and/or the polarization label determined.

Additional Considerations

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A and working in conjunction with a second processor configured to carry out recitations B and C. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

It will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of determining embryo polarization comprising:
under control of a hardware processor:
receiving a three-dimensional (3D) image of an embryo;
generating a two-dimensional (2D) image representing the 3D image of the embryo;
determining a before-onset probability that the embryo is before onset of polarization in the 3D image and an after-onset probability that the embryo is after onset of polarization in the 3D image using a convolutional neural network (CNN) with the 2D image as input, wherein the CNN comprises two output nodes, and wherein the two output nodes output the before-onset probability and the after-onset probability; and
determining a label of the embryo as being before or after the onset of polarization in the 3D image using the before-onset probability and the after-onset probability.

2. The method of claim 1, wherein the embryo is a 8-cell-stage embryo, a 8-16-cell-stage embryo, a 16-cell stage embryo, or a combination thereof, and/or wherein the embryo comprises about or at least 8 cells, 8-16 cells, 16 cells, or a combination thereof.

3. The method of claim 1, wherein the embryo is a mammalian embryo, optionally wherein the mammalian embryo is a human embryo.

4. The method of claim 1, wherein the embryo is unstained.

5. The method of claim 1, wherein the embryo is about 200 μm is diameter.

6. The method of claim 1, wherein the 3D image comprises a 3D image stack comprising a plurality of z-slice 2D images of the embryo, optionally wherein the 3D image comprises at least 8 z-slice 2D images of the embryo.

7. The method of claim 1, wherein the 3D image has a size of at least 512 pixels in a x-dimension and/or at least 512 pixels in a y-dimension, and/or wherein the 2D image has a size of at least 512 pixels in a x-dimension and/or at least 512 pixels in a y-dimension.

8. The method of claim 1, wherein the 3D image comprises a bright-field 3D image of the embryo, a differential interference contrast (DIC) 3D image of the embryo, or a combination thereof.

9. The method of claim 1, wherein generating the 2D image representing the 3D image comprises: determining a value of each pixel of the 2D image from one, one or more, or each pixel corresponding to the pixel in the 3D image of the embryo.

10. The method of claim 1, wherein the 2D image comprises an informative 2D representation of the 3D image, optionally wherein the 2D image comprises a maximally informative 2D representation of the 3D image.

11. The method of claim 1, wherein generating the 2D image representing the 3D image comprises: generating the 2D image representing the 3D image using a variance metric algorithm or an all-in-focus (AIF) algorithm, optionally wherein the AIF algorithm is based on wavelet transform, optionally wherein the wavelet transform comprises complex wavelet transform, and optionally wherein the complex wavelet transform comprises dual-tree complex wavelet transform (DTCWT).

12. The method of claim 1, wherein the CNN comprises a deep CNN.

13. The method of claim 1, wherein the CNN comprises a plurality of dense layers, optionally wherein the CNN comprises two dense layers, optionally wherein a first dense layer of the plurality of dense layers is connected to a last layer of the CNN that is not a dense layer, optionally wherein a first dense layer of the plurality of dense layers is connected to a last convolutional layer of the CNN or a layer subsequent to the last convolutional layer of the CNN, optionally wherein any dense layer other than the last dense layer is connected with an immediate subsequent dense layer, optionally wherein any dense layer other than a first dense layer is connected with an immediate prior dense layer, and wherein a last dense layer of the plurality of dense layers comprises the two output nodes.

14. The method of claim 1, wherein the CNN comprises a dense convolutional network (DenseNet), a squeeze-and-excitation network (SENet), a residual neural network (ResNet), or a combination thereof.

15. The method of claim 1, wherein the CNN uses inter-blastomere angle as a cue, wherein the CNN uses compaction as a cue, wherein the CNN is based on more than the inter-blastomere angle, wherein the CNN is based on more than the compaction, and/or wherein the CNN has a higher accuracy, sensitivity, and/or specificity for determining the embryo as being before or after the onset of polarization in the 3D image than that determined using just the inter-blastomere angle and/or compaction.

16. The method of claim 1, wherein the CNN has an accuracy of at least 80%, a sensitivity of at least 80%, a specificity of at least 80%, and/or an area under the receiver operating characteristic curve is at least 0.8.

17. The method of claim 1, wherein determining the before-onset probability and the after-onset probability using the CNN comprises: determining the before-onset probability and the after-onset probability using a plurality of CNNs.

18. The method of claim 1, further comprising: training the CNN.

19. The method of claim 1, wherein determining the label of the embryo as being before or after the onset of polarization in the 3D image comprises:
determining the before-onset probability is smaller than the after-onset probability; and
determining the label of the embryo as being after the onset of polarization in the 3D image.

20. The method of claim 1, wherein determining the label of the embryo is before or after the onset of polarization in the 3D image comprises:
determining the before probability is greater than the after probability; and
determining the label of the embryo as being before the onset of polarization in the 3D image.

21. The method of claim 1, wherein determining the label of the embryo as being before or after the onset of polarization in the 3D image comprises:
determining the before-onset probability is between 0.45 and 0.55 and/or the after-onset probability is between 0.55 and 0.45; and
determining the label of the embryo as being undetermined.

22. The method of claim 1, wherein receiving the 3D image of an embryo comprises: receiving a plurality of 3D images of the embryo comprising time-lapsed 3D images of the embryo, optionally wherein the time-lapsed 3D images of the embryo comprises at least 16 time-lapsed 3D images of the embryo, and optionally wherein two consecutive time-lapsed 3D images of the embryo are captured at least 1 hour apart.

23. The method of claim 1, further comprising: using the label of the embryo for embryo selection, accessing embryo health, or a combination thereof.

24. A system for determining embryo polarization comprising:
non-transitory memory configured to store executable instructions and a convolutional neural network (CNN) comprising two output nodes which output a before-onset probability and an after-onset probability, wherein the CNN is trained using a plurality of 2D training images, representing a plurality of 3D training images of embryos, and associated annotated polarization labels, and wherein the associated annotated polarization label of each 2D training image is determined using a corresponding 2D fluorescent image; and
a hardware processor in communication with the non-transitory memory, the hardware processor programmed by the executable instructions to perform:
receiving a 3D image of an embryo;
generating a 2D image representing the 3D image of the embryo;
determining a before-onset probability that the embryo is before onset of polarization in the 3D image and an after-onset probability that the embryo is after onset of polarization in the 3D image using the CNN with the 2D image generated as input; and
determining a label of the embryo as being before or after the onset of polarization in the 3D image using the before-onset probability and the after-onset probability.

25. A system for training a convolutional neural network for determining embryo polarization comprising:
non-transitory memory configured to store executable instructions; and
a hardware processor in communication with the non-transitory memory, the hardware processor programmed by the executable instructions to perform:
receiving a plurality of three-dimensional (3D) training images of embryos and associated annotated polarization labels, wherein the associated annotated polarization label of each 3D training image is determined using a corresponding 3D or 2D fluorescent image of the 3D training image;
generating a plurality of 2D training images representing the plurality of 3D images of embryos; and
training a convolutional neural network (CNN) comprising two output nodes which output a before-onset probability and an after-onset probability using the plurality of 2D training images and the associated annotated polarization labels of the corresponding 3D images.

* * * * *